US011809162B2

(12) United States Patent
Jacobs et al.

(10) Patent No.: US 11,809,162 B2
(45) Date of Patent: Nov. 7, 2023

(54) METHODS AND SOFTWARE FOR MANUFACTURING A DISCRETE OBJECT FROM AN ADDITIVELY MANUFACTURED BODY OF MATERIAL INCLUDING A PRECURSOR TO A DISCRETE OBJECT AND A REFERENCE FEATURE(S)

(71) Applicant: Protolabs, Inc., Maple Plain, MN (US)

(72) Inventors: James L. Jacobs, Rye Beach, NH (US); Arthur Richard Baker, Excelsior, MN (US)

(73) Assignee: Protolabs, Inc., Maple Plain, MN (US)

( * ) Notice: Subject to any disclaimer, the term of this patent is extended or adjusted under 35 U.S.C. 154(b) by 120 days.

(21) Appl. No.: 17/206,313

(22) Filed: Mar. 19, 2021

(65) Prior Publication Data

US 2021/0263500 A1 Aug. 26, 2021

Related U.S. Application Data

(63) Continuation-in-part of application No. 16/454,166, filed on Jun. 27, 2019, now Pat. No. 10,983,506.
(Continued)

(51) Int. Cl.
*G06T 15/00* (2011.01)
*G05B 19/4155* (2006.01)
(Continued)

(52) U.S. Cl.
CPC .......... *G05B 19/4155* (2013.01); *B33Y 30/00* (2014.12); *B33Y 50/02* (2014.12);
(Continued)

(58) Field of Classification Search
USPC ......................................................... 345/418
See application file for complete search history.

(56) References Cited

U.S. PATENT DOCUMENTS

| 8,480,754 B2 * | 7/2013 | Bojarski | A61F 2/5046 |
| | | | 623/20.14 |
| 10,790,322 B1 * | 9/2020 | Wang | H01L 27/1461 |
| (Continued) | | | |

OTHER PUBLICATIONS

Liu X, Yi H, Ni Z, Qiu X, Liu T. Recognizing 2.5 D manufacturing feature using neural network. In2008 15th International Conference on Mechatronics and Machine Vision in Practice Dec. 2, 2008 (pp. 311-316). IEEE.*

(Continued)

*Primary Examiner* — Phu K Nguyen
(74) *Attorney, Agent, or Firm* — CALDWELL INTELLECTUAL PROPERTY LAW

(57) ABSTRACT

An automated manufacturing system for generating a graphical representation of a discrete object to be manufactured from an additively manufactured body of material. Reference feature is used to place the precursor at a subtractive manufacturing machine; the reference feature may be based on a locating feature at the subtractive manufacturing machine. Manufacturing reference feature is accomplished by automatedly detecting one or more critical-to-quality features and manufacturing the reference feature based on the one or more detected critical-to-quality features.

18 Claims, 33 Drawing Sheets

Related U.S. Application Data which is a continuation-in-part of application No. 14/172,462, filed on Feb. 4, 2014, now Pat. No. 10,373,183.

(60) Provisional application No. 61/891,453, filed on Oct. 16, 2013.

(51) Int. Cl.
| | |
|---|---|
| *G06N 20/00* | (2019.01) |
| *B33Y 30/00* | (2015.01) |
| *B33Y 50/02* | (2015.01) |
| *G06F 30/10* | (2020.01) |
| *G06F 113/10* | (2020.01) |

(52) U.S. Cl.
CPC ... *G06N 20/00* (2019.01); *G05B 2219/31368* (2013.01); *G06F 30/10* (2020.01); *G06F 2113/10* (2020.01)

(56) References Cited

U.S. PATENT DOCUMENTS

| | | | |
|---|---|---|---|
| 11,332,793 B2* | 5/2022 | Rabinowitz | C12Q 1/6858 |
| 2018/0186082 A1* | 7/2018 | Randhawa | B23K 26/062 |
| 2018/0293592 A1* | 10/2018 | Gold | B22F 10/00 |
| 2019/0011903 A1* | 1/2019 | Jacobs, II | B22F 12/82 |

OTHER PUBLICATIONS

Amaitik, S.M., 2005. Development of a Step Feature-Based Intelligent Process Planning System for Prismatic Parts (Doctoral dissertation, Middle East Technical University).*

Autodesk Instructables, Taulman, Combination CNC Machine and 3D Printer, May 20, 2012; https://www.instructables.com/Combination-CNC-Machine-and-3D-Printer/.*

Tucci G, Bonora V. From real to . . . "real". A review of geomatic and rapid prototyping techniques for solid modelling in cultural heritage field. The International Archives of the Photogrammetry, Remote Sensing and Spatial Information Sciences. Sep. 10, 2012; 38:575-82.*

Su B, Dhara S, Wang L. Green ceramic machining: A top-down approach for the rapid fabrication of complex-shaped ceramics. Journal of the European Ceramic Society. Jan. 1, 2008;28(11):2109-15.*

Henderson MB, Arrell D, Larsson R, Heobel M, Marchant G. Nickel based superalloy welding practices for industrial gas turbine applications. Science and technology of welding and joining. Feb. 1, 2004;9(1):13-21.*

* cited by examiner

METHODS AND SOFTWARE FOR MANUFACTURING A DISCRETE OBJECT FROM AN ADDITIVELY MANUFACTURED BODY OF MATERIAL INCLUDING A PRECURSOR TO A DISCRETE OBJECT AND A REFERENCE FEATURE(S)

RELATED APPLICATION DATA

This application is a continuation in part of U.S. Nonprovisional patent application Ser. No. 16/454,166, filed on Jun. 27, 2019, and entitled "METHODS AND SOFTWARE FOR MANUFACTURING A DISCRETE OBJECT FROM AN ADDITIVELY MANUFACTURED BODY OF MATERIAL INCLUDING A PRECURSOR TO A DISCRETE OBJECT AND A REFERENCE FEATURE(S)," which claims priority to U.S. Nonprovisional patent application Ser. No. 14/172,462, filed on Feb. 4, 2014, and entitled "Automatic Firm Fabrication Price Quoting and Fabrication Ordering For Computer-Modeled Joining Features and Related Structures," which claims priority to U.S. Provisional Patent Application Ser. No. 61/891,453, filed on Oct. 16, 2013. Each of Ser. No. 16/454,166, 14/172,462 and 61/891,453 is incorporated by reference herein in its entirety.

FIELD OF THE INVENTION

The present invention generally relates to the field of subtractive manufacturing. In particular, the present invention is directed to methods and software for manufacturing a discrete object from an additively manufactured body of material including a precursor to a discrete object and reference feature(s).

BACKGROUND

Many types of objects are manufactured using rotary-tool milling and other types of subtractive manufacturing processes. Typically, a single object is made from a block or slab of steel or aluminum. For example, steel and aluminum parts for any of a wide variety of assemblies are often machined from individual bodies of material using one or more milling machines. However, making such machined parts can be labor intensive as operators load and unload individual bodies of material to and from milling machines. In addition, geometries are limited to those that can be manufactured economically by a subtractive manufacturing process.

SUMMARY OF THE DISCLOSURE

In one aspect, an automated manufacturing system for generating a graphical representation of a discrete object to be manufactured from an additively manufactured body of material, including a precursor to a discrete object and at least a reference feature, at a computing device, is presented. The automated manufacturing system is designed and configured to receive a graphical computer model of the at least a precursor to the discrete object and a graphical computer model of the discrete object, identify at least a first feature in the graphical computer model of the discrete object, automatedly determine, at a machine-learning model, that the at least a first feature includes at least a critical-to-quality feature in the graphical computer model of the discrete object, and automatedly generate, at the machine-learning model, a graphical representation of the at least a reference feature on the graphical model of the at least a precursor to the discrete object as a function of the at least a critical-to-quality feature.

In another aspect, a method of generating a graphical representation of a discrete object to be manufactured from an additively manufactured body of material including a precursor to a discrete object and at least a reference feature is presented. The method comprises receiving, at a computing device, a graphical computer model of the at least a precursor to the discrete object and a graphical computer model of the discrete object, identifying, at the computing device, at least a first feature in the graphical computer model of the discrete object, automatedly determining, at a machine-learning model operating on the computing device, that the at least a first feature includes at least a critical-to-quality feature in the graphical computer model of the discrete object, and automatedly generating, at the computing device, a graphical representation of the at least a reference feature on a graphical computer model of the precursor to the discrete object as a function of the at least a critical-to-quality feature.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
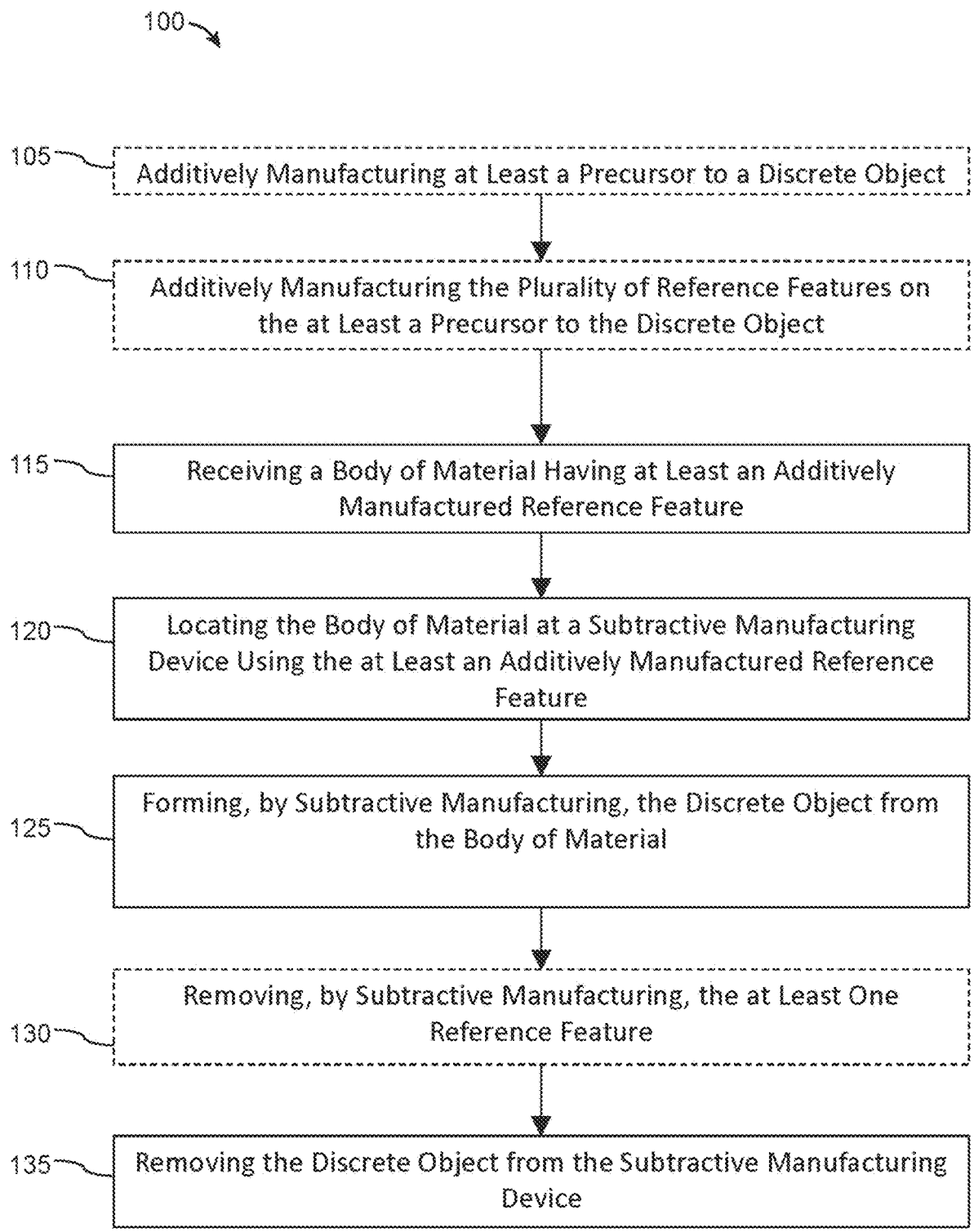
FIG. 1 is a flow diagram illustrating an exemplary method of manufacturing a discrete object from an additively manufactured body of material including a precursor to a discrete object and at least a reference feature in an embodiment.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In one aspect, the present disclosure is directed to methods of manufacturing a discrete object from an additively manufactured body of material including a precursor to the discrete object and at least a reference feature. The reference feature or reference features may enable the additively manufactured body of material to be located at a manufacturing device; the location may be precise so that manufacturing steps designed or generated by reference to an orientation or coordinate system of the manufacturing device are able to manufacture the discrete object precisely. In an embodiment, the additively manufactured body of material may be manufactured; the at least a reference feature, the precursor, or both may be additively manufactured.

Embodiments of this method include the performance of manufacturing processes. In some embodiments, a manufacturing process is a process used to form a product, which may be an end-product or a part used to assemble an end-product, by the performance of one or more manufacturing steps. As used herein, a workpiece is an object that will become a product when the one or more manufacturing steps been performed. One or more steps in the production of product may include physical modifications to workpiece or programming and modeling steps used to perform the modifications, such as modeling the workpiece or product, or computing toolpaths or other algorithms for the product's manufacture.

One or more steps may include a subtractive manufacturing process, which produces the product by removing material from a workpiece; the removal of material may be accomplished using abrasives, cutting tools or endmills, laser cutting or ablation, removal using heat, or any other method that removes material from the workpiece. Each subtractive manufacturing process used may be any suitable process, such as, but not limited to, rotary-tool milling, electronic discharge machining, ablation, etching, erosion, cutting, and cleaving, among others.

If rotary-tool milling is utilized, this milling may be accomplished using any suitable type of milling equipment, such as milling equipment having either a vertically or horizontally oriented spindle shaft. Examples of milling equipment include bed mills, turret mills, C-frame mills, floor mills, gantry mills, knee mills, and ram-type mills, among others. In some embodiments, the milling equipment used for removing material may be of the computerized numerical control (CNC) type that is automated and operates by precisely programmed commands that control movement of one or more parts of the equipment to effect the material removal. CNC machines, their operation, programming, and relation to CAM tools and CAD tools are well known and need not be described in detail herein for those skilled in the art to understand the scope of the present invention and how to practice it in any of its widely varying forms.

Subtractive manufacturing may be performed using spark-erosive devices; for instance, subtractive manufacturing may include removal of material using electronic discharge machining (EDM). EDM may include wire EDM, plunge EDM, immersive EDM, ram EDM, or any other EDM manufacturing technique. Subtractive manufacturing may be performed using laser-cutting processes. Subtractive manufacturing may be performed using water-jet or other fluid-jet cutting techniques. Fundamentally, any process for removal of material may be employed for subtractive manufacturing.

One or more steps may include an additive manufacturing process, in which material is deposited on the workpiece. In some embodiments, an additive manufacturing process is a process in which material is added incrementally to a body of material in a series of two or more successive steps. The material may be added in the form of a stack of incremental layers; each layer may represent a cross-section of the object to be formed upon completion of the additive manufacturing process. Each cross-section may, as a non-limiting example be modeled on a computing device as a cross-section of graphical representation of the object to be formed; for instance, a computer aided design (CAD) tool may be used to receive or generate a three-dimensional model of the object to be formed, and a computerized process may derive from that model a series of cross-sectional layers that, when deposited during the additive manufacturing process, together will form the object. The steps performed by an additive manufacturing system to deposit each layer may be guided by a computer aided manufacturing (CAM) tool. In other embodiments, a series of layers are deposited in a substantially radial form, for instance by adding a succession of coatings to the workpiece. Similarly, the material may be added in volumetric increments other than layers, such as by depositing physical voxels in rectilinear or other forms. Additive manufacturing, as used in this disclosure, may specifically include manufacturing done at the atomic and nano level. Additive manufacturing also includes bodies of material that are a hybrid of other types of manufacturing processes, e.g. forging and additive manufacturing as described above. As an example, a forged body of material may have welded material deposited upon it which then comprises an additive manufactured body of material.

Deposition of material in additive manufacturing process may be accomplished by any suitable means. Deposition may be accomplished using stereolithography, in which successive layers of polymer material are deposited and then caused to bind with previous layers using a curing process such as curing using ultraviolet light. Additive manufacturing processes may include "three-dimensional printing" processes that deposit successive layers of power and binder; the powder may include polymer or ceramic powder, and the binder may cause the powder to adhere, fuse, or otherwise join into a layer of material making up the body of material or product. Additive manufacturing may include metal three-dimensional printing techniques such as laser sintering including direct metal laser sintering (DMLS) or laser powder-bed fusion. Likewise, additive manufacturing may be accomplished by immersion in a solution that deposits layers of material on the body of material, by depositing and sintering materials having melting points such as metals, such as selective laser sintering, by applying fluid or paste-like materials in strips or sheets and then curing that material either by cooling, ultraviolet curing, and the like, any combination of the above methods, or any additional methods that involve depositing successive layers or other increments of material. Methods of additive manufacturing may include without limitation vat polymerization, material jetting, binder jetting, material extrusion, fuse deposition modeling, powder bed fusion, sheet lamination, and directed energy deposition. Methods of additive manufacturing may include adding material in increments of individual atoms, molecules, or other particles. An additive manufacturing process may use a single method of additive manufacturing, or combine two or more methods. Companies producing additive manufacturing equipment include 3D Systems, Stratasys, formLabs, Carbon3D, Solidscape, voxeljet, ExOne, envisiontec, SLM Solutions, Arcam, EOS, Concept Laser, Renishaw, XJET, HP, Desktop Metal, Trumpf, Mcor, Optomec, Sciaky, and MarkForged amongst others.

Additive manufacturing may include deposition of initial layers on a substrate. Substrate may include, without limitation, a support surface of an additive manufacturing device, or a removable item placed thereon. Substrate may include a base plate, which may be constructed of any suitable material; in some embodiments, where metal additive manufacturing is used, base plate may be constructed of metal, such as titanium. Base plate may be removable. One or more support features may also be used to support additively manufactured body of material during additive manufacture; for instance and without limitation, where a downward-facing surface of additively manufactured body of material is constructed having less than a threshold angle of steepness, support structures may be necessary to support the downward-facing surface; threshold angle may be, for instance 45 degrees. Support structures may be additively constructed, and may be supported on support surface and/or on upward-facing surfaces of additively manufactured body of material. Support structures may have any suitable form, including struts, buttresses, mesh, honeycomb or the like; persons skilled in the art, upon reviewing the entirety of this disclosure, will be aware of various forms that support structures may take consistently with the described methods and systems.

Referring now to FIG. 1, an exemplary method 100 of manufacturing a discrete object from an additively manufactured body of material including a precursor to a discrete object 304 and at least a reference feature is illustrated. Method 100 may include manufacturing additively manufactured body of material. For example, at optional step 105, additively manufactured body of material may be additively manufactured. Additive manufacture of additively manufactured body of material may be performed using any additive manufacturing process described above, or using any combination of additive manufacturing processes as described above. At optional step 110, method 100 may include additively manufacturing at least a reference feature on the additively manufactured body of material. At step 115, method 100 includes receiving an additively manufactured body of material including a precursor to a discrete object 304 and at least a reference feature; in some embodiments, this may be accomplished according to optional step 105, optional step 110, or both.

Still referring to FIG. 1, at step 120, the additively manufactured body of material is located within a subtractive manufacturing device using at least a reference feature. At step 125, discrete object is formed from additively manufactured body of material by subtractive manufacturing; subtractive manufacturing may include any process or combination of processes described above for subtractive manufacturing. At optional step 130, at least a reference feature is removed by subtractive manufacturing, which include any process or combination of processes described above for subtractive manufacturing. At step 135, discrete object is removed from subtractive manufacturing device.

Still referring to FIG. 1, embodiments of methods and systems presented in this disclosure involve identification, design, and/or manufacture of one or more critical-to-quality (CTQ) features of a discrete object to be manufactured. As used in this disclosure, a CTQ feature is a feature having structural or functional characteristics that must be met for a manufactured article to satisfy its intended use. CTQ features may include features where a high tolerance is necessary to achieve an intended result. In an embodiment, a discrete object to be manufactured may have a small number of points that require high tolerances, including without limitation locations where joins are to be made, mating features, or the like. Other features of discrete object may not require high tolerances; as a result, such features may be made according to molding, casting, additive manufacturing, and/or subtractive manufacturing processes that produce lower tolerances. This in turn may enable the manufacturing process to be more efficient, rapid, or effective. For instance, and without limitation, an overall body of a discrete object may be produced with less material and/or using geometries, such as infill geometries or the like, producing higher strength-to-weight ratios, if produced using one or more additive processes than would be possible using a subtractive process, but may not be able to generate tolerances needed for mating features and/or joint locations. Thus, identification of CTQ features may make possible a hybrid manufacturing process whereby all but the CTQ features of discrete object are produced additively, while CTQ parts are machined or otherwise subtractively manufactured after the additive process is complete. The resulting part may wed the material advantages of the additive process to the precision of machining.

Figure 2:
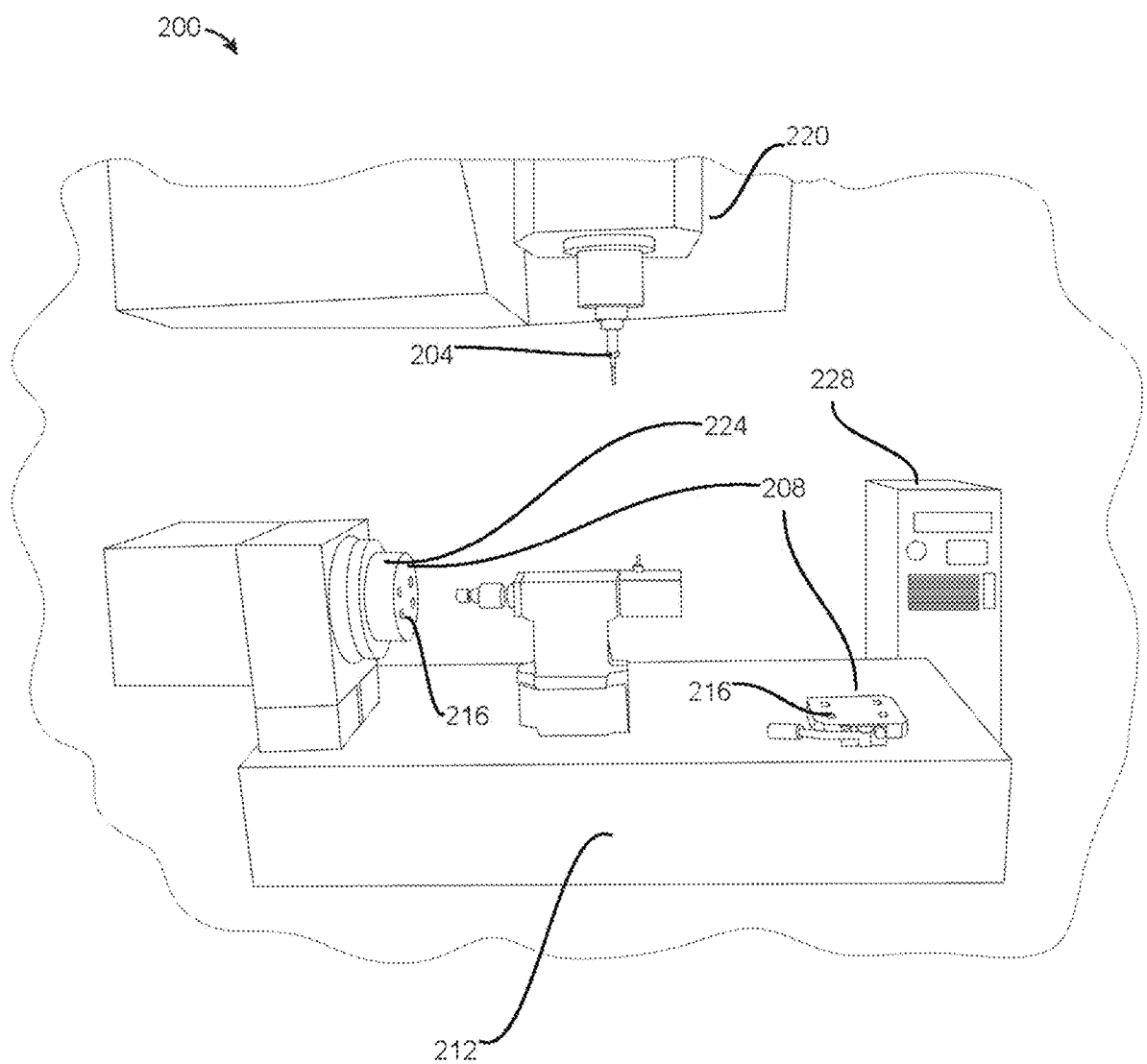
FIG. 2 is a perspective view of an exemplary subtractive manufacturing device in accordance with an embodiment.

Turning now to FIG. 2, an exemplary embodiment of a manufacturing system 200 that may be used in some embodiments to perform one or more manufacturing or computer modeling steps in embodiments of methods is illustrated. Manufacturing system 200 may include at least a manufacturing tool 204; in an embodiment, manufacturing tool 204 may be a component of manufacturing system 200 that performs one or more manufacturing steps as described above. Manufacturing tool 204 may perform one or more subtractive manufacturing steps as described above. Manufacturing tool 204 may include a cutting tool. Cutting tool may be a component that removes material from a workpiece. In some embodiments, cutting tool includes at least an endmill, which may be a component that removes material when rotated against a workpiece. Persons skilled in the art will be aware of many variants of endmill that may be used to remove material from a workpiece. Cutting tool may include a component that transfers motion from a motor (not shown) to at least an endmill; as a non-limiting example, component may be a spindle that rotates and as a result causes endmill to rotate.

Manufacturing tool 204 may include a tool changer that can switch a plurality of endmills onto and off of manufacturing tool 204; for instance, tool changer may detach an endmill currently attached to a spindle and attach a different endmill to the same spindle, enabling the automated manufacturing system 200 to use more than one endmill in a single automated manufacturing process. Manufacturing tool 204 may include a tool changer that can switch a plurality of endmills onto and off of manufacturing tool 204. Manufacturing tool 204 may include a component used to perform EDM, such as a wire for wire EDM or an electrode. Manufacturing tool 204 may include one or more lasers. Manufacturing tool 204 may include one or more abraders.

Alternatively or additionally, manufacturing tool 204 may include at least an additive manufacturing tool capable of performing one or more additive manufacturing steps as described above. Manufacturing tool 204 may, as a non-limiting example, include one or more additive printer heads such as those used in rapid prototyping and/or "3D printing" processes, or the like. Manufacturing tool 204 may include an extruding device for extruding fluid or paste material, a sprayer or other applicator for bonding material, an applicator for powering, a sintering device such as a laser, or other such material. Furthermore, discrete object may be formed from precursor to a discrete object 304 by additive manufacturing.

Still referring to FIG. 2, manufacturing system 200 may include a support 208. In an embodiment, a support 208 may be a structure that supports a workpiece during the one or more manufacturing steps. Support 208 may include a base table 212. Base table 212 may include a surface to which a workpiece or other components may be secured. Surface may be oriented horizontally, vertically, or in any other orientation. Surface may be substantially planar. Base table 212 may include various mechanisms to attach components or workpieces to base table 212; for instance, base table 212 may include a quick release attachment mechanism that can be used to attach any component having appropriate attachment features such as quick-release studs. Support 208 may include a fixture, which as used herein is a component used in a manufacturing device to secure a workpiece to the manufacturing device during the one or more manufacturing steps. A fixture may include, without limitation, one or more clamps, fasteners, vices, bolts, studs, quick-release attachment devices, straps, and chucks. A fixture may be one element of a set of fixtures; for instance, a workpiece may be secured in manufacturing system 200 by a plurality of fixtures, such as a plurality of bolts. Support 208 may include a vise, clamp, or other component used to locate or immobilize a workpiece within or at manufacturing system 200.

Still referring to FIG. 2, support 208 may include a substrate for deposition of layers in additive processes. Substrate may be constructed of any material suitable for an additive process to be performed on top of substrate. For instance, and without limitation, substrate may include a metal or other heat-resistant base plate supporting additively added layers in metal additive processes such as DMLS or other laser sintering. Substrate may include a tray structure, e.g. for keeping powder layers used in powder fusion processes from blowing away or spilling during deposition. Substrate may include a fluid bath or other structure for bathing or coating a workpiece with successive layers, as in stereolithography or the like.

With continued reference to FIG. 2, manufacturing system 200 may include at least a locating feature 216. In an embodiment, at least a locating feature 216 may be at least a feature of manufacturing system 200 that enables a workpiece to be located at manufacturing system 200; in some embodiments, the at least a locating feature 216 enables a workpiece to be located precisely with regard to a coordinate system used to direct the one or more steps. At least a locating feature 216 may include, without limitation, one or more vices, clamps, projections, slots, recesses, or walls; for instance, the at least a locating feature 216 may include a surface of a vise jaw that is immobile with respect to another component such as a support 208 or base table 212, enabling precise prediction of surface's location, and thus of a workpiece surface set against it. At least a locating feature 216 may include a locating feature 216 on support 208; for example, the at least a locating feature 216 may include a bolt-hole, stud-hole, groove, or other recess in a base table 212, trunnion table, or fixture. As a non-limiting example, at least a locating feature 216 may include one or more grooves in a vice. At least a locating feature 216 may include a projection on a base table 212, trunnion table, or fixture. At least a locating feature 216 may include a combination of recesses and projections. The at least a locating feature 216 may include a plurality of locating features, or a single locating feature.

Continuing to refer to FIG. 2, in an embodiment, manufacturing system 200 may be a mechanical manufacturing device. In an embodiment, mechanical manufacturing device may be a manufacturing system 200 that deprives the user of some direct control over the toolpath, defined as movements the manufacturing tool 204 and workpiece make relative to one another during the one or more manufacturing steps. For instance, manufacturing tool 204 may be constrained to move vertically, by a linear slide 220 or similar device, so that the only decision the user may make is to raise or lower the manufacturing tool 204; as a non-limiting example, where manufacturing system 200 is a manually operated machine tool, user may only be able to raise and lower a cutting tool, and have no ability to move the cutting tool horizontally. Similarly, where manufacturing tool 204 includes a slide lathe, a blade on the slide lathe may be constrained to follow a particular path. As a further example, base table 212 may be moveable along one or more linear axes; for instance, base table 212 may be constrained to move along a single horizontal axis. In other embodiments, base table 212 is constrained to movement along two horizontal axes that span two dimensions, permitting freedom of movement only in a horizontal plane; for instance, base table 212 may be mounted on two mutually orthogonal linear slides.

With continued reference to FIG. 2, manufacturing system 200 may include a powered manufacturing device. In an embodiment, a powered manufacturing device may be a manufacturing device in which at least one component of the manufacturing device includes at least a component powered by something other than human power. At least a component may be powered by any non-human source, including without limitation electric power generated or stored by any means, heat engines including steam, internal combustion, or diesel engines, wind power, water power, pneumatic power, or hydraulic power. Powered components may include any components of manufacturing system 200. Manufacturing tool 204 may be powered; for instance, manufacturing tool 204 may include an endmill mounted on a spindle rotated by a motor (not shown). Workpiece support 208 may be powered. Where manufacturing system 200 is a mechanical device, motion of components along linear or rotary constraints may be powered; for instance, motion of base table 212 along one or more linear constraints such as linear slides may be driven by a motor or other source of power. Similarly, rotation of a table may be driven by a power source. Tool-changer, where present, may be driven by power. In some embodiments, all or substantially all of the components of manufacturing system 200 are powered by something other than human power; for instance, all components may be powered by electrical power.

Still referring to FIG. 2, manufacturing system 200 may include an automated manufacturing device 224. In some embodiments, an automated manufacturing system is a manufacturing device including a controller that controls one or more manufacturing steps automatically. Controller may include a sequential control device that produces a sequence of commands without feedback from other components of subtractive manufacturing device. Controller may include a feedback control device that produces commands triggered or modified by feedback from other components. Controller may perform both sequential and feedback control. In some embodiments, controller includes a mechanical device. In other embodiments, controller includes an electronic device. Electronic device may include digital or analog electronic components, including without limitation one or more logic circuits, such one or more logic gates, programmable elements such as field-programmable arrays, multiplexors, one or more operational amplifiers, one or more diodes, one or more transistors, one or more comparators, and one or more integrators. Electronic device may include a processor. Electronic device may include a computing device. Computing device may include any computing device as described below in reference to FIG. 14.

Continuing to refer to FIG. 2, controller may include a component embedded in manufacturing system 200; as a non-limiting example, the controller may include a microcontroller, which may be housed in a unit that combines the other components of manufacturing system 200. Further continuing the example, microcontroller may have program memory, which may enable microcontroller to load a program that directs manufacturing system 200 to perform an automated manufacturing process. Similarly, controller may include any other components of a computing device as described below in reference to FIG. 14 in a device housed within manufacturing system 200. In other embodiments, controller includes a computing device that is separate from the rest of the components of manufacturing system 200; for instance, the controller may include a personal computer, laptop, or workstation connected to the remainder of manufacturing system 200 by a wired or wireless data connection. As a non-limiting example, automated manufacturing device 224 may include a controller, which may be coupled to other features thereof via network; in an embodiment, controller may not be currently coupled to other materials, such that automated manufacturing device 224 may include only controller. In some embodiments, controller includes both a personal computing device where a user may enter instructions to generate a program for turning workpiece into a finished product, and an embedded device that receives the program from the personal computing device and executes the program. A person of ordinary skill in the art will readily appreciate, after reading the instant application in its entirety, the various ways that a controller, which may include one or more computing devices, may be connected to or incorporated in a manufacturing system 200 as described above.

With continued reference to FIG. 2, controller may control components of manufacturing system 200; for instance, controller may control elements including without limitation tool changer to switch endmills, spindle or gear systems operatively coupled to spindle to regulate spindle rotational speed, linear movement of manufacturing tool 204, base table 212, or both. As an example, in embodiments involving subtractive manufacturing, the equipment used for removing material may be of the computerized numerical control (CNC) type that is automated and operates by precisely programmed commands that control movement of one or more parts of the equipment to effect the material removal. CNC machines, their operation, programming, and relation to computer aided manufacturing (CAM) tools and computer aided design (CAD) tools are well known and need not be described in detail herein for those skilled in the art to understand the scope of the present invention and how to practice it in any of its widely varying forms. Persons skilled in the art, upon reading the entirety of this disclosure, will be aware of similar automated control systems usable for various forms of additive manufacturing.

Figure 9:
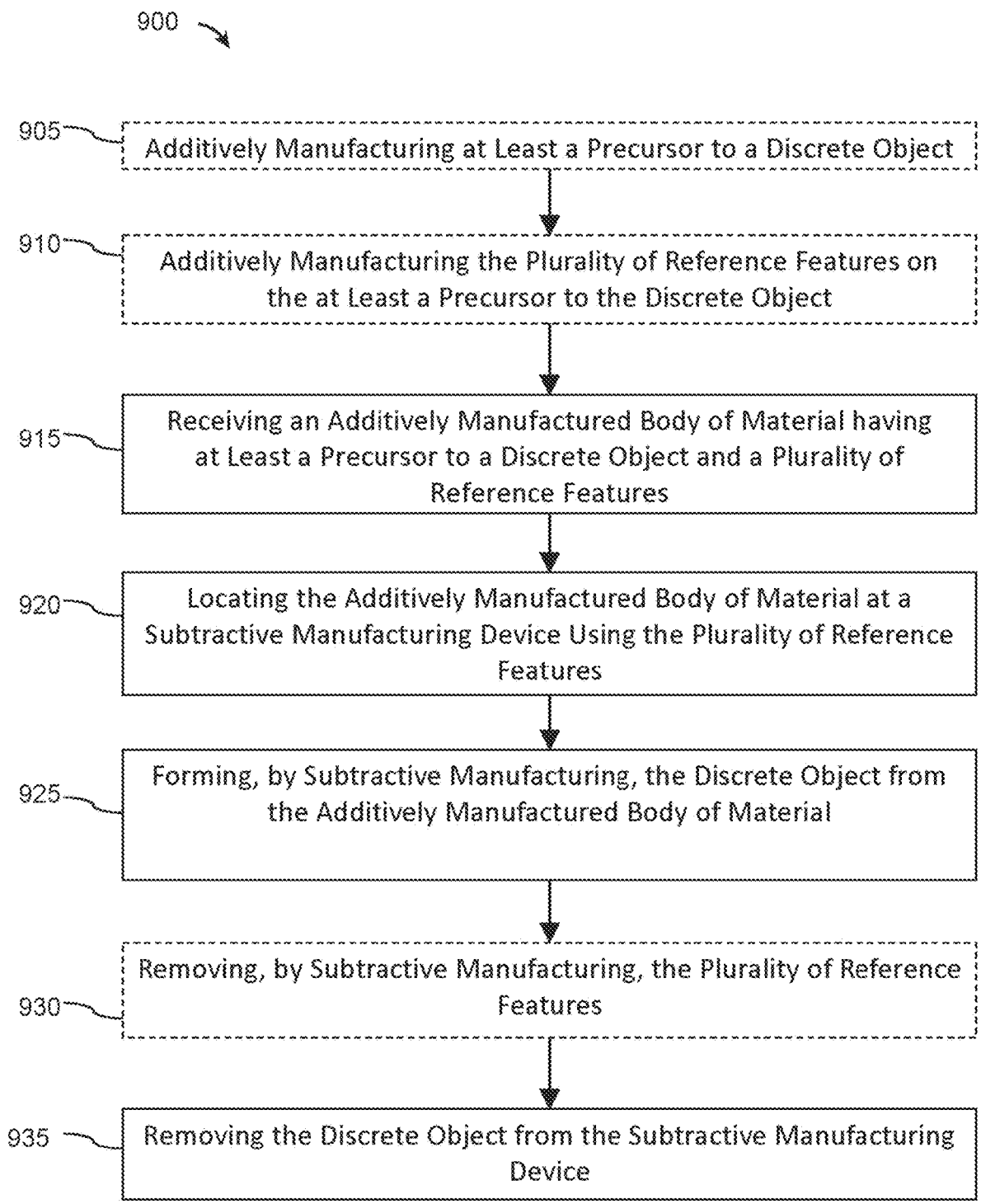
FIG. 9 is a flow diagram illustrating an exemplary method of manufacturing a discrete object from an additively manufactured body of material including a precursor to a discrete object and at least a precursor to at least a reference feature in accordance with an embodiment.

Still referring to FIG. 2, controller, automated manufacturing system 200, and/or automated manufacturing device 224 may be configured to perform any manufacturing modeling and/or other method step as disclosed herein, including without limitation as described herein in reference to FIGS. 1, 9, and/or 10. In an embodiment, controller is configured to receive a graphical representation of precursor to a discrete object, receive a graphical representation of at least a reference feature on the precursor to the discrete object, and generate a computer model of the body of material, wherein the computer model of the body of material includes the graphical representation of the precursor to the discrete object and the graphical representation of the at least a reference feature. As a further non-limiting example, controller, automated manufacturing system 200 and/or automated manufacturing device 224 may be designed and configured to manufacture a body of material including a precursor to a discrete object and at least a reference feature, where manufacturing the body of material includes receiving, at the automated manufacturing system, at least a precursor to a discrete object, a graphical computer model of the at least a precursor to the discrete object, and a graphical computer model of the discrete object, automatedly detecting, by the automated manufacturing system, at least a critical-to-quality feature in the graphical computer model of the discrete object, automatedly generating, at the automated manufacturing system, a graphical representation of the at least a reference feature on a graphical model of the precursor to the discrete object as a function of the at least a critical-to-quality feature, manufacturing, by the automated manufacturing system, the at least a reference feature on the at least a precursor, as a function of the graphical representation of the at least a reference feature, and forming the discrete object from the body of material at a subtractive manufacturing device when the body of material is located at the subtractive manufacturing device using the at least a reference feature, wherein forming further comprises forming the at least a critical-to-quality feature. As a further non-limiting example, controller, automated manufacturing system 200 and/or automated manufacturing device 224 may be designed and configured to manufacture a body of material including a precursor to a discrete object and at least a reference feature, where manufacturing the body of material includes receiving at least a precursor to a discrete object, a graphical computer model of the at least a precursor to the discrete object, and a graphical computer model of the discrete object, automatedly detecting at least a critical-to-quality feature in the graphical computer model of the discrete object, and automatedly generating, at the automated manufacturing system, a graphical representation of the at least a reference feature on a graphical model of the precursor to the discrete object as a function of the at least a critical-to-quality feature. As a further non-limiting example, controller, automated manufacturing system 200, and/or automated manufacturing device 224 may be designed and configured to receiving a graphical computer model of the discrete object to be manufactured; automatedly detect at least a critical-to-quality feature in the graphical computer model of the discrete object, and amend the graphical computing model of the discrete object to include an identification of the at least a critical-to-quality feature.

Figure 3:
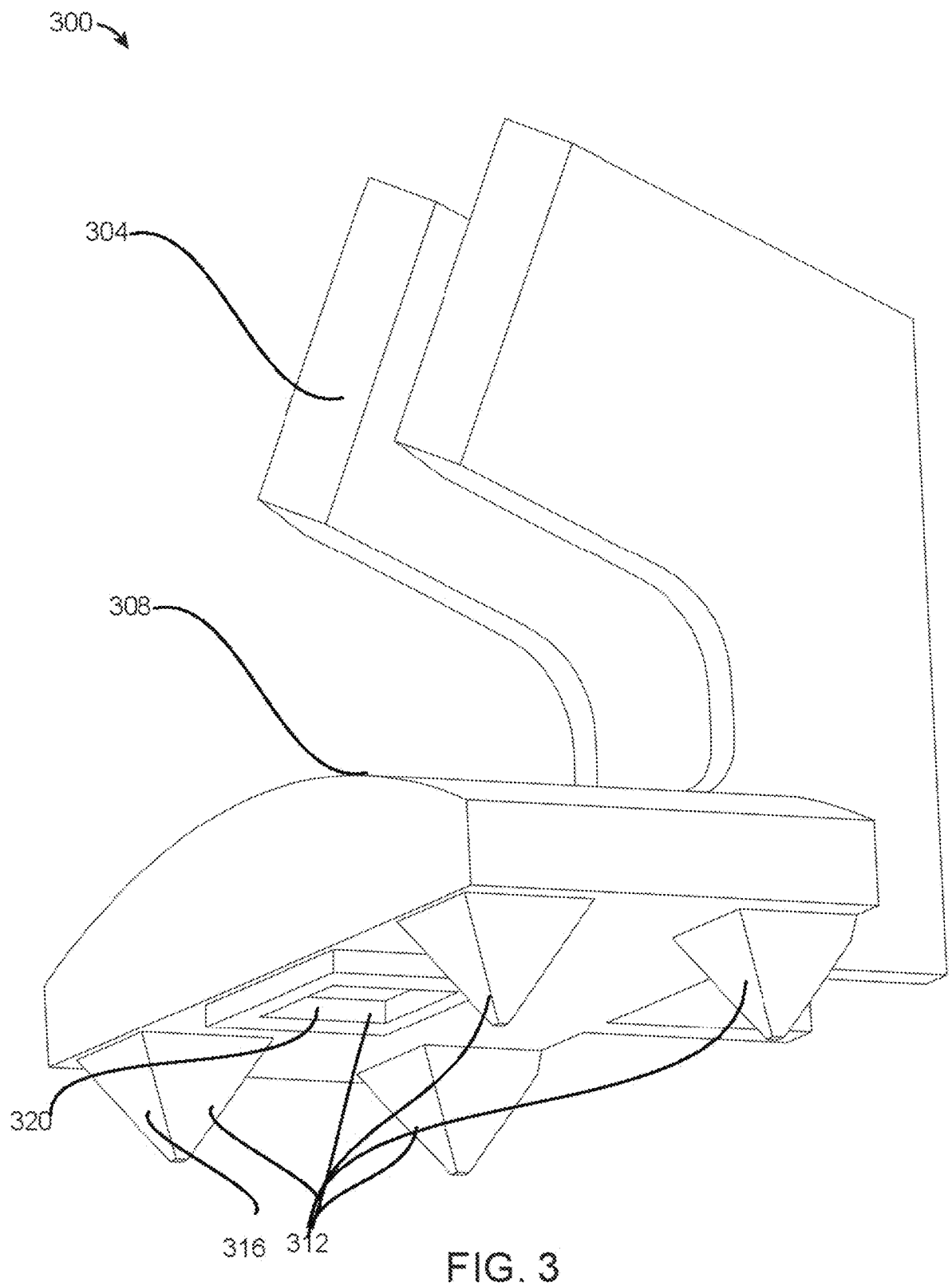
FIG. 3 is a perspective view of an exemplary additively manufactured body of material in accordance with an embodiment.

Turning now to FIG. 3, an additively manufactured body of material 300 is provided. Additively manufactured body of material 300 includes a precursor to a discrete object 304. Precursor to discrete object 304 may be any object that is formed into discrete object by performing method 100. Examples of bodies of material from which the discrete object can be made include, but are not limited to, plates, slabs, blooms, billets, boards, blocks, among many other shapes, including curvilinear and multisided shapes, and any combination thereof, as set forth in further detail below. Precursor to discrete object 304 may include at least a geometric characteristic 308 of discrete object. At least a geometric characteristic 308 of discrete object may be a feature, partial shape, or overall shape recognizable as similar to a feature, partial shape, or overall shape of the discrete object. For instance, where discrete object, when completed, has a substantially disc-shaped form, precursor to a discrete object 304 may have a geometric characteristic 308 of the discrete object where the precursor to a discrete object 304 is substantially disc-shaped; precursor to a discrete object 304 may lack one or more features of discrete object, such as particular dimensions of the substantially disk-shaped form, offset, beveled, flanged or otherwise varied features, surface recesses, grooves, or projections, or the like. Similarly, where discrete object, when completed, includes one or more holes, precursor to a discrete object 304 may possess a geometric characteristic 308 of the discrete object where the precursor to a discrete object 304 is additively manufactured already possessing at least a hole of the one or more holes; at least a hole in precursor to a discrete object 304 may lack one or more features of at least a hole in discrete object, such as threading, a precise shape, dimensions, or broached features, or the like. Precursor to a discrete object 304 may include essentially all features of discrete object, except for a lack of surface, finish, tolerance, or flatness of surfaces. In some embodiments, precursor to a discrete object 304 represents a "near net" discrete object that shares most geometric characteristics with discrete object; for instance, additively manufactured body may visually resemble discrete object but lack threading, forming to a given tolerance, forming to a surface finish, forming to a flatness, or one or more features more readily formed by subtractive manufacturing. In an embodiment, additively manufactured body of material may have some degree of warping; for instance, where additively manufactured body of material was produced by a process such as laser powder-bed fusion or DMLS that involves rapid heating and cooling, warping may occur as a result of the repeated heating and cooling, particularly where a layer with a larger cross-sectional area is constructed on top of a layer with a smaller cross-sectional area. In an embodiment, warping may be predicted by a model for additively manufactured body of material; additively manufactured body of material may be constructed with a greater volume than a discrete object to be produced therefrom, permitting subtractive manufacturing to shape discrete object in a manner correcting warping. Similarly, additive manufacturing may be used to increase an overall volume of part, permitting, for instance, machining to correct for a degree of impreciseness in reference features, overall form, and/or both via the machining process Still referring to FIG. 3, as for the material composing precursor to a discrete object 304, the material may be any suitable material, such as metal (solid, sintered, etc.), polymer (solid, foamed, etc.), wood, composite, and multilayer material, among others. Precursor to a discrete object 304 may be a partially manufactured precursor to a discrete object 304; that is, the precursor to a discrete object 304 may be produced by performing one or more additive manufacturing steps to produce discrete object.

With continued reference to FIG. 3, where additively manufactured body of material has been constructed on, for instance, a base plate, additively manufactured body of material may be removed from base plate by severing one or more connections between additively manufacture body of material and base plate; for instance, additively manufactured body of material may be cut from base plate using wire EDM, a buzz saw, a CNC machine, or other means of cutting or severing material. Additively manufactured body of material may similarly be removed or cut from any other substrate on which additively manufactured body of material was deposited. One or more support features, such as one or more support features constructed to support additively manufactured body of material during additive manufacture, may be removed from additively manufactured body of material by any process described above for removal of material, including without limitation manual or automated processes. In an embodiment, where additive manufacturing has been performed on a base plate, the addition of reference features may make it possible to subtractively manufacture discrete object from multiple directions without having to machine away a base plate; for instance, reference features may be created for two or more machining angles, such that when removed from base plate precursor may be automatically set up at each machining angle using reference features.

In an embodiment, and still referring to FIG. 3, additively manufactured body of material may be manufactured from at least a first manufacturing orientation, and discrete object may be subtractively manufactured out of the additively manufactured body of material from at least a second manufacturing orientation; at least a second manufacturing orientation may be distinct from at least a first manufacturing orientation. To illustrate, at least a first manufacturing orientation may be selected to optimize additive manufacturing by (i) ensuring that portions having small cross-sectional areas are not used to support portions having large cross-sectional areas, (ii) ensuring that overhanging angles or surfaces are deposited at angles minimizing a need for support structures, and/or (iii) minimizing a total number of layers to be deposited to create a model. The first of these may reduce warping in metal additive manufacturing processes. As a non-limiting illustration, a capital letter "H" built from the feet up would be in danger of warping at the transition between the legs and the cross-bar of the "H"; if it is instead built from back to front, the cross-sectional area to be added with each layer remains constant. Further discussion the capital letter "H," building back-to-front would require essentially no support structures, while building from the feet up would require substantial support structures to support the cross-bar. Similarly, building from back to front can be accomplished using fewer layers, reducing the amount of powder that need be deposited; thus, several manufacturing goals in optimizing the manufacture of the capital letter "H" could be met by building from a back-to-front orientation. In more complex three-dimensional forms, there may not be a single orientation that optimizes several goals ideally in this way; persons skilled in the art, upon reviewing the entirety of this disclosure, will be aware of various approaches that may be employed to select an optimal orientation, based on desired attributes or goals of the manufacturing process.

Still viewing FIG. 3, at least a second orientation may be selected to maximize efficiency and/or accuracy of subtractive processes. For instance, at least a second orientation may be selected to minimize a number of set-ups for machining, to ensure that one or more holes may be bored effectively, to maximize the efficiency with which a given volume of material may be removed, or the like. At least a reference feature may thus be chosen to orient additively manufactured body of material, as described in further detail herein, in one or more orientations maximally efficient for subtractive manufacturing. Interrogation may be used to determine such orientations; alternatively or additionally, machine-control instructions may be generated for a plurality of possible orientations, and a set of orientations for manufacturing all features to form from a particular orientation may be selected from the plurality based on machine-control instructions minimizing runtime or otherwise optimizing the subtractive manufacturing process. Persons skilled in the art, upon reviewing the entirety of this disclosure, will be aware of various ways in which subtractive manufacturing orientations may be selected and/or optimized. In an embodiment, a user may specify the subtractive manufacturing orientations, and such orientations may be automatedly used to determine position of at least a reference feature in computer modeling processes as described in further detail below.

Continuing to refer to FIG. 3, method 100 may include manufacturing precursor to a discrete object 304. For example, at optional step 105, precursor to a discrete object 304 may be additively manufactured; precursor to a discrete object 304 may be additively manufactured using any method of additively manufacturing as described above. In some embodiments, additively manufacturing precursor to a discrete object 304 includes creating a computer model of precursor to a discrete object 304, for instance as described in further detail below in reference to FIG. 10. Computer model of precursor to a discrete object 304 may be created by assigning a plurality of computer models of one or more differing structures to locations within a computer model of the precursor to a discrete object 304. This may be performed in any suitable manner, such as using CAD and/or CAM software having a graphical user interface that allows a user to manipulate graphical representations of the objects and/or precursor to a discrete object 304 to effectively place or simulate one or more features of precursor to a discrete object 304 or of discrete object. As part of step 105 or as part of another step in method 100 not specifically enumerated, computer model of precursor to a discrete object 304 may be configured into a three-dimensional model such as a CAM model, STL model, or the like that in later steps of method 100 will be used to guide the operation of one or more additive manufacturing devices to perform the necessary material deposition for forming precursor to a discrete object 304 in the proper number and sequence of steps. In other embodiments, precursor to a discrete object 304 is manufactured using other manufacturing techniques, including without limitation any manufacturing process described above, or any combination of manufacturing processes described above. Additively manufacturing precursor to a discrete object 304 may include additively manufacturing at least a geometric characteristic 308 of discrete object.

At step 120, and still referring to FIG. 3, precursor to a discrete object 304 is received with at least a reference feature 312. At least a reference feature 312 may be a feature designed, configured, and located for precisely locating a precursor to a discrete object 304 relative to subtractive manufacturing system 200. At least a reference feature 312 may locate precursor to a discrete object 304 relative to subtractive manufacturing system 200 by fitting the at least a reference feature 312 to at least a locating feature 216 of the subtractive manufacturing system 200. For instance, at least a reference feature 312 may include one or more projections 316 that fit into one or more recesses in a support 208 at the subtractive manufacturing system 200; as a non-limiting example, where at least a locating feature 216 includes a plurality of holes, such as bolt-holes or stud-holes, the at least a reference feature 312 may include a plurality of projections 316 that fit into the plurality of holes. Where at least a locating feature 216 includes at least a projection, at least a reference feature 312 may include at least a recess 320 into which at least a projection may be housed. In some embodiments, at least a reference feature 312 includes an attachment feature, such as one or more holes to admit bolts or studs, or one or more projections or recesses that fit a locating feature 216 of subtractive manufacturing system 200. At least a reference feature 312 may include one or more recesses, which may fit over one or more projections at subtractive manufacturing system 200.

Figure 4A:
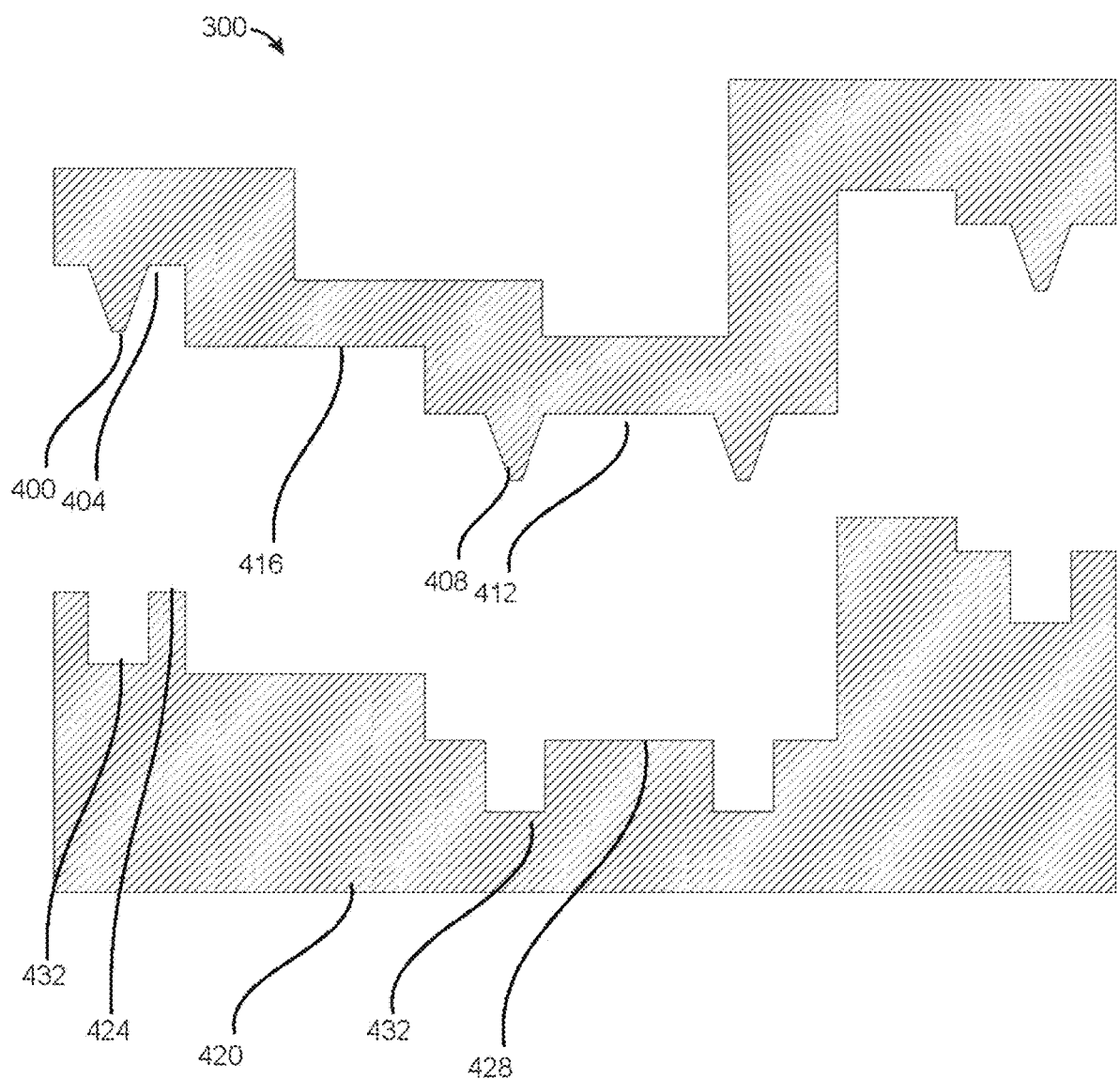
FIG. 4A is a cross-sectional view of an exemplary additively manufactured body of material in accordance with an embodiment.
Figure 4B:
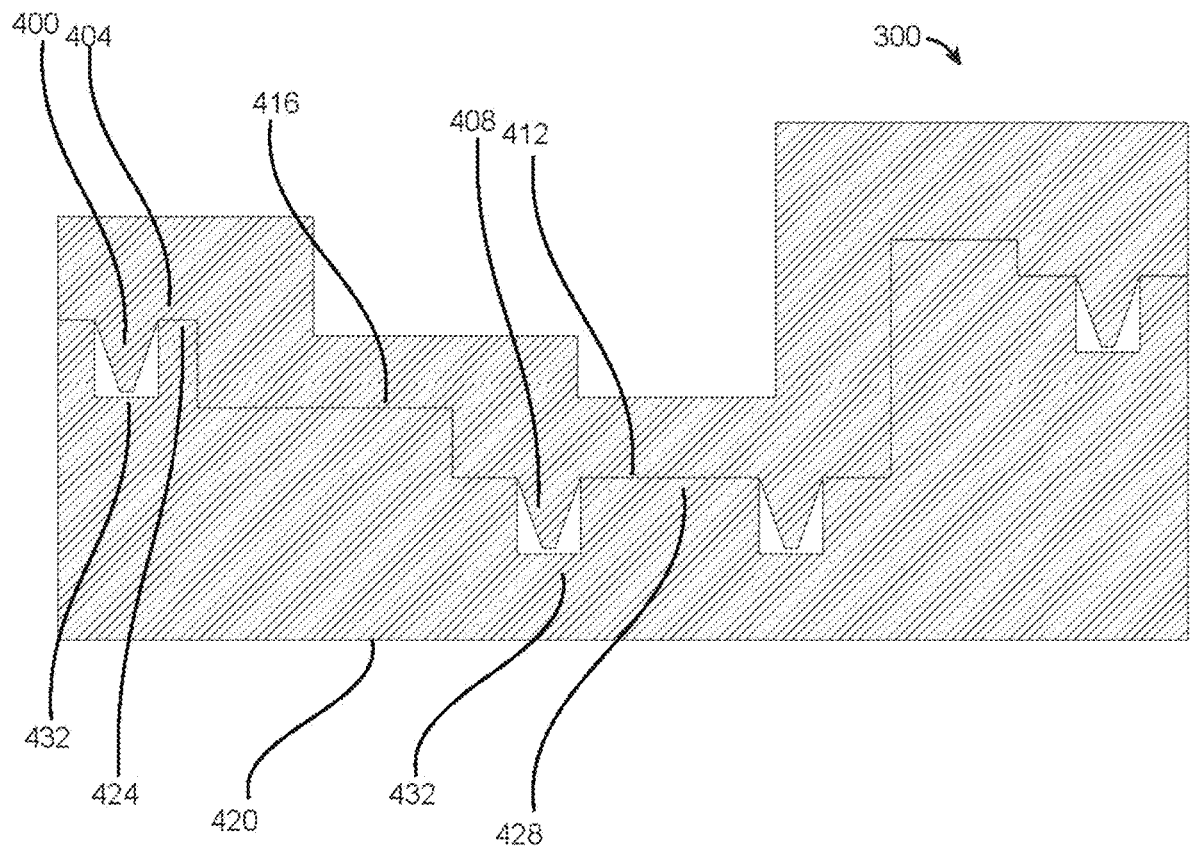
FIG. 4B is a cross-sectional view of an exemplary additively manufactured body of material in accordance with an embodiment.

Referring now to FIGS. 4A-B, at least a reference feature 312 may include a first feature 400 on a first surface 404 of precursor to a discrete object 304 and a second feature 408 on a second surface 412 of precursor to a discrete object 304. This may be used to position additively manufactured body of material 300 in an orientation consistent with manufacturing instructions to be implemented by subtractive manufacturing system 200, such as manufacturing instructions that use a coordinate system to direct the subtractive manufacturing system 200 and assume the precursor to a discrete object 304 is in a particular orientation with respect to that coordinate system. For instance, where precursor to a discrete object 304 is oriented with a bottom side 416 oriented to rest on a support 208 so that an opposite surface may be subjected to subtractive manufacturing, the bottom side 416 may have surfaces at distinct heights with regard to support 208; in other words, first surface 404 may be at a distinct height from second surface 412. In an embodiment, an element 420 of subtractive manufacturing system 200, which may be a support 208, may have corresponding surfaces 424, 428 that support surfaces of bottom. Corresponding surfaces 424, 428 may include locating features 432, which may be any locating features 216 as descried above, to which first feature 400 and second feature 408 may be fitted to locate additively manufactured body of material 300. Surfaces at different heights with respect to support 208 may have reference features of at least a reference feature 312 that orient the surfaces with respect to corresponding surfaces on support 208, for instance using locating features 432. Support 208 may be configured, manufactured, or adjusted to complement a shape of precursor to a discrete object 304.

Figure 5A:
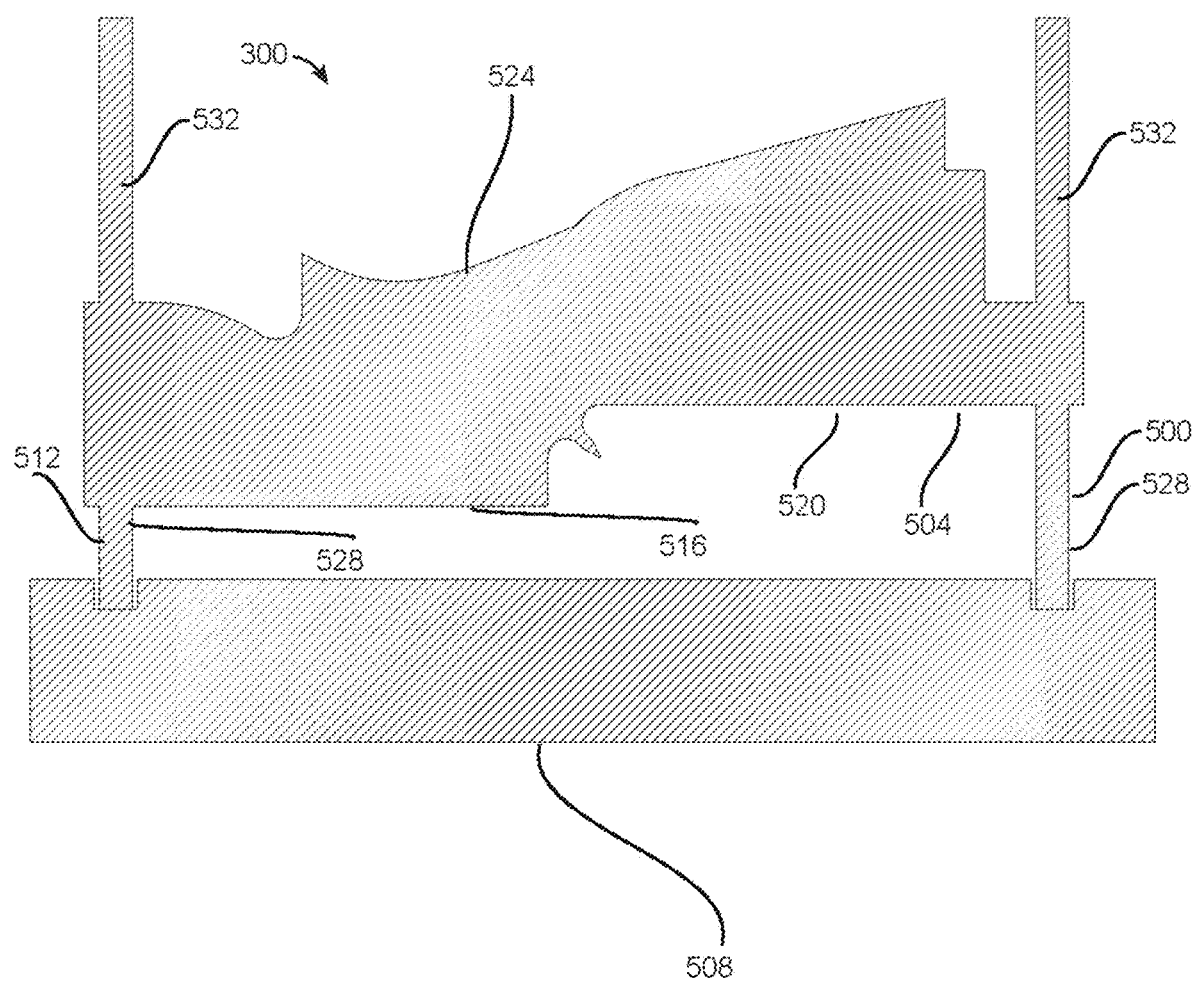
FIG. 5A is a cross-sectional view of an exemplary additively manufactured body of material in accordance with an embodiment.

In an embodiment, as illustrated for example in FIG. 5A, at least a reference feature 312 may include a first reference feature 500 that extends further from a first surface 504 of a bottom of precursor to a discrete object 304 that is further from an element 508 of subtractive manufacturing system 200, which may be a support 208, when precursor to a discrete object 304 is in an orientation used to perform some manufacturing steps of step 125, and a second reference feature 512 that extends less far from a second surface 516 that is closer to the element 508 when the precursor to a discrete object 304 is in the orientation used to perform the manufacturing steps. Thus, for instance, where element 508 of secondary manufacturing device has a shape not formed to complement the shape of precursor to a discrete object 304, at least a reference feature 312 may include first and second reference feature 512s that orient precursor to a discrete object 304 in an expected orientation for one or more manufacturing steps; this may enable the use of a standard-shaped fixture or other support 208 with various differently shaped bodies of material.

Figure 5B:
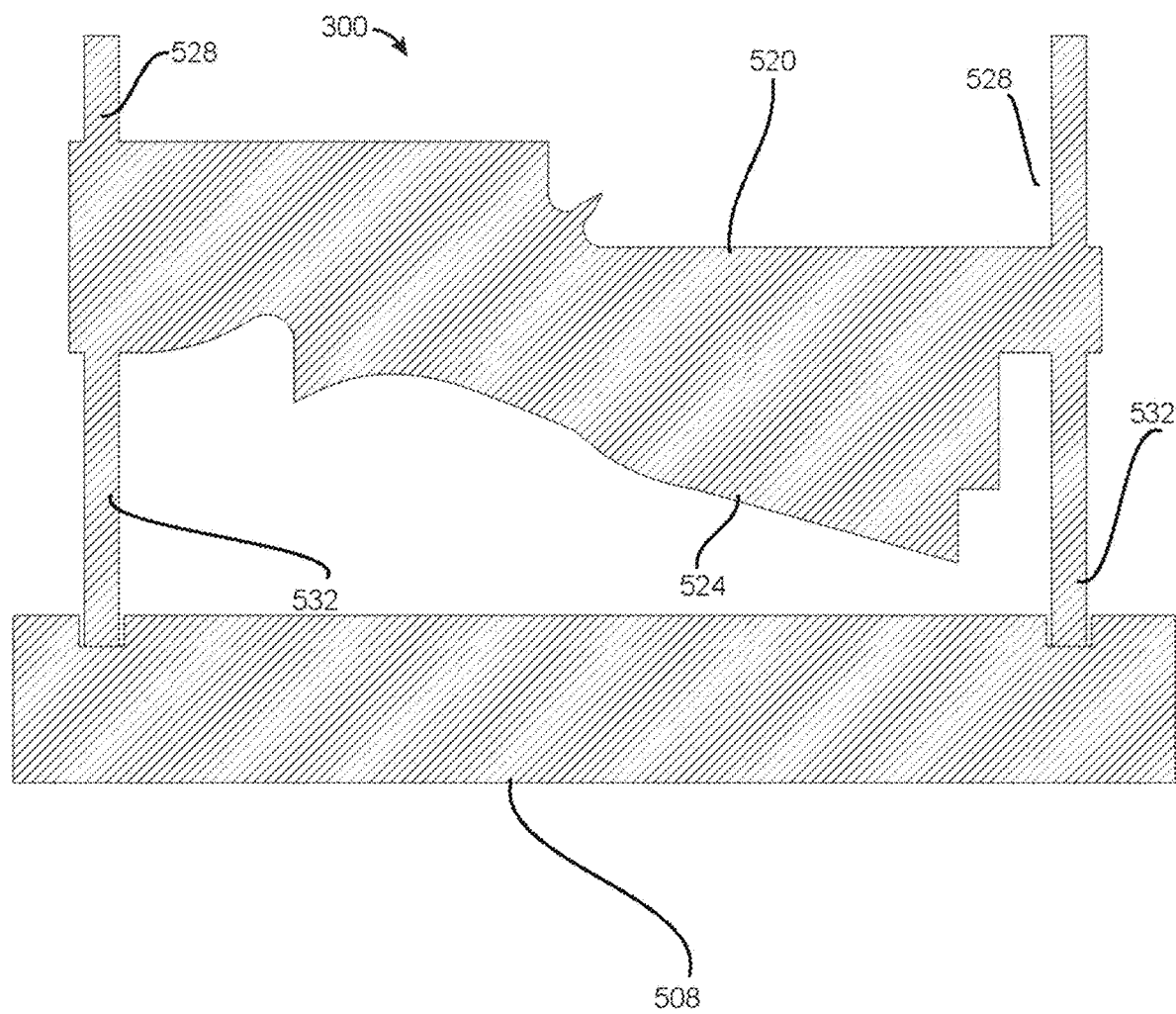
FIG. 5B is a cross-sectional view of an exemplary additively manufactured body of material in accordance with an embodiment.

Still referring to FIG. 5A, additively manufactured body of material 300 may include a first side 520 that faces element 508 when additively manufactured body of material 300 is in a first orientation, and a second side 524 that faces support 208 when precursor to a discrete object 304 is in a second orientation. At least a reference feature 312 may include at least a first-side reference feature 528 on first side 520 and at least a second-side reference feature 532 on second side 524. In an embodiment, and as shown for example in FIG. 5A, at least a first-side reference feature 528 may locate additively manufactured body of material 300 within subtractive manufacturing system 200, for instance by locating the additively manufactured body of material 300 at element 508, when the additively manufactured body of material 300 is in first orientation; as shown in FIG. 5B, at least a second-side reference feature 532 may locate additively manufactured body of material 300 within subtractive manufacturing system 200, for instance by locating the additively manufactured body of material 300 at element 508, when the additively manufactured body of material 300 is in second orientation. In an embodiment, the at least a first-side reference feature 528 and the at least a second-side reference feature 532 enable additively manufactured body of material 300 to be located at the same fixture, support 208, or other element 508 of subtractive manufacturing system 200 in different orientations. Additional sets of reference features on additional sides of additively manufactured body of material 300 may enable location of additively manufactured body of material 300 in additional orientations.

Still referring to FIGS. 5A-B, receiving additively manufactured body of material 300 may include receiving at least a reference feature 312 which has been added to precursor to discrete object. At least a reference feature 312 may have been added to precursor to discrete object through additive manufacturing, for instance as described below for additively manufacturing at least a reference feature 312 on precursor to discrete object. For instance, and without limitation, at least a reference feature 312 may have been added to precursor to discrete object by generating a computer model of the at least a reference feature 312 and additively manufacturing the at least a reference feature 312 as a function of the computer model; this may be implemented for example as described in further detail below.

Figure 6:
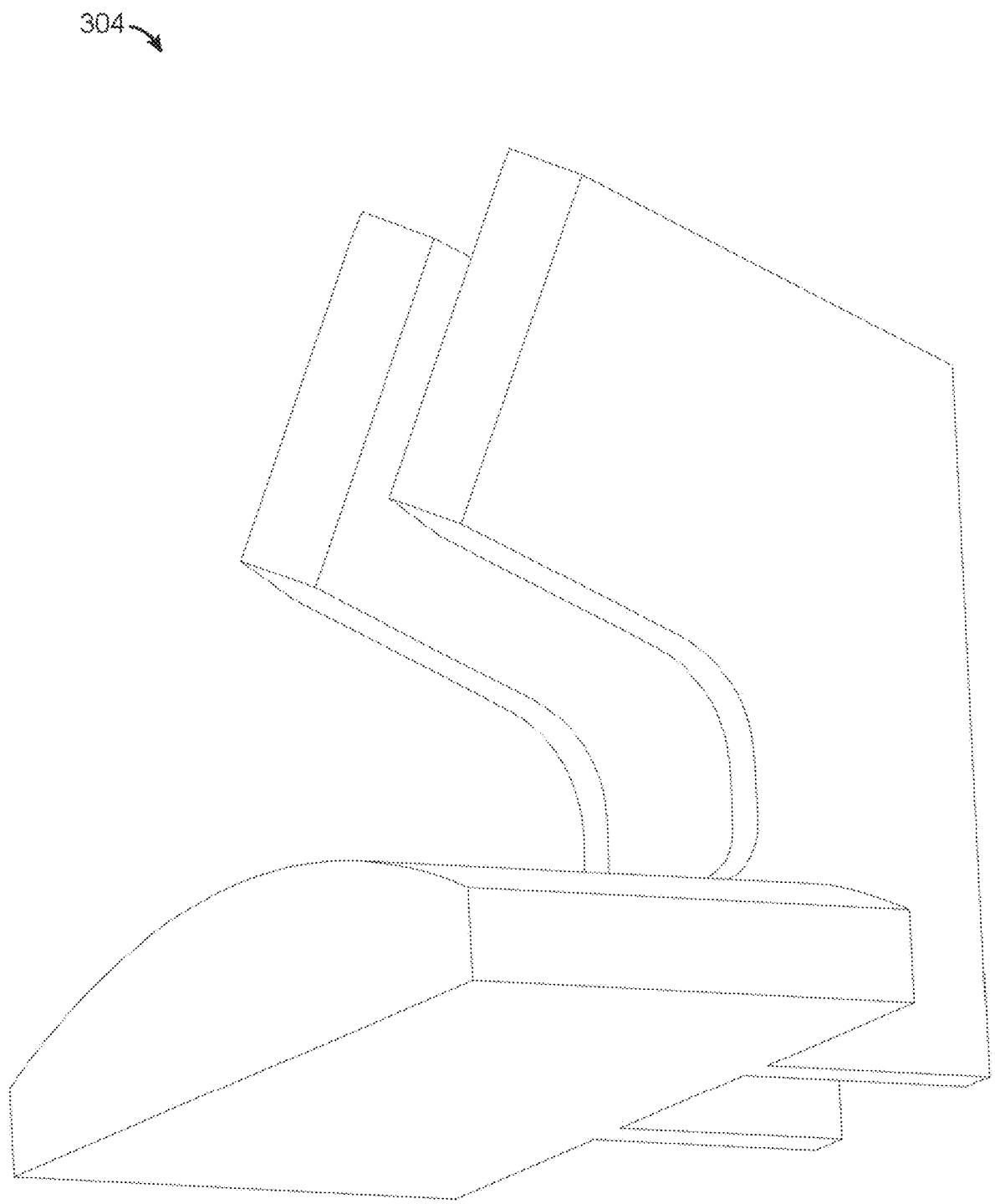
FIG. 6 is a perspective view of a precursor to a discrete object in accordance with an embodiment.

In optional step 110, at least a reference feature 312 may be additively manufactured on precursor to a discrete object 304. As illustrated for exemplary purposes in FIG. 6, precursor to a discrete object 304 may be received without at least one of the at least a reference feature 312; receiving precursor to discrete object may be accomplished by manufacturing the precursor to the discrete object 304 or by manufacturing the precursor to the discrete object 304 as described above. At least a reference feature 312 may be additively manufactured on the precursor to the discrete object. In an embodiment, at least a reference feature 312 may be manufactured as a function of a locating feature 216 at or within subtractive manufacturing system 200; at least a reference feature 312 may be additively manufactured to fit to locating feature 216 by receiving additive manufacturing control commands directing the additive manufacture of the at least a reference feature 312. For instance, where locating feature 216 includes a recess, at least a reference feature 312 may be additively manufactured having at least a projection that fits into the recess. As another example, where locating feature 216 includes a projection, at least a reference feature 312 may be additively manufactured having at least a recess that fits over the projection. Additive manufacturing control commands may be generated using one or more data describing locating feature 216; one or more data may include dimension, size, or shape data concerning locating feature 216. Additive manufacturing control commands may be generated using a computer model or graphical representation of a locating feature 216 at subtractive manufacturing system 200; additive manufacturing may be performed as a function of computer model of the locating feature 216. Additive manufacturing control commands may be generated using a computer model or graphical representation of at least a reference feature 312; additive manufacturing may be performed as a function of computer model of the at least a reference feature 312. Computer model of at least a reference feature 312 may be combined with or created by reference to a computer model of precursor to discrete object, for example as described in further detail below in reference to FIG. 10.

Referring again to FIG. 1, at step 120, additively manufactured body of material 300 is located within a subtractive manufacturing system 200 using the at least a reference feature 312. As used herein, location of additively manufactured body of material 300 "within" subtractive manufacturing system 200 is intended to encompass location of additively manufactured body of material 300 "at," "in," or "on" subtractive manufacturing system 200; for instance, where the subtractive manufacturing system 200 does not have an interior within which additively manufactured body of material 300 may be located, the additively manufactured body of material 300 may be located on or at subtractive manufacturing system 200, for instance by securing the additively manufactured body of material 300 to a support 208 or engaging the additively manufactured body of material 300 to a locating feature 216. Locating may include locating additively manufactured body of material 300 at a support 208. Locating may include locating additively manufactured body of material 300 at a fixture. Support 208 may not be located within subtractive manufacturing system 200 when additively manufactured body of material 300 is mounted to the support 208. In some embodiments, locating includes mounting additively manufactured body of material 300 to support 208 and then locating the support 208 within subtractive manufacturing system 200. As a non-limiting example, where support 208 is a fixtured, additively manufactured body of material 300 may be secured to fixture prior to securing fixture within subtractive manufacturing system 200. Additively manufactured body 300 may be mounted at support 208 using at least a reference feature 312; mounting to support 208 may include locating additively manufactured body of material 300 at support with precision, after which the support 208 may be located within subtractive manufacturing system 200 with precision, so that the additively manufactured body of material 300 is located at the subtractive manufacturing system 200 precisely.

Still referring to FIG. 1, location of additively manufactured body of material 300 within subtractive manufacturing system 200 is accomplished using at least a reference feature 312. At least a reference feature 312 may be fitted to or mated with one or more locating features 216 at subtractive manufacturing system 200. For example, where one or more locating features 216 includes at least a recess and at least a reference feature 312 includes at least a projection, at least a projection may be inserted into at least a recess. As another example, where one or more locating features 216 includes at least a projection and at least a reference feature 312 includes at least a recess, at least a recess may be inserted onto at least a projection. Where at least a reference feature 312 is formed to be located using a fixture, clamp, vise, or other element of subtractive manufacturing system 200, location may involve insertion into or mating with fixture, clamp, vise, or other element of subtractive manufacturing system 200. Location may include location with precision, such as location at precise point and orientation with respect to a coordinate system used by subtractive manufacturing system 200 or machine control instructions directing subtractive manufacturing system 200.

Continuing to refer to FIG. 1, in an embodiment, location is not precise location. Subtractive manufacturing system 200 may be set up to have an origin of a coordinate system at a particular feature of additively manufactured body of material 300; setup may be performed by a user or robot, for instance by advancing a mill of subtractive manufacturing system 200 and moving mill relative to additively manufactured body of material 300 until mill contacts a chosen feature of additively manufactured body of material 300 to establish an origin point. Further measurements or calibration may be used to orient additively manufactured body of material 300 relative to coordinate axes. In addition a 2D or 3D scanner may be used to precisely locate additively manufactured body of material 300 in relation to subtractive manufacturing system 200 As non-limiting example, a scanner may be attached to the subtractive manufacturing system 200 which digitally additively manufactured body of material 300 and uses the resulting point cloud to generate a additively manufactured body of material 300 from which machine instructions may be generated or to which previously generated machine instructions may be mapped. Persons skilled in the art will be aware of many techniques for precisely locating a workpiece within a manufacturing device, for instance to permit the manufacturing device to follow automated toolpaths in performing manufacturing steps on the workpiece.

At step 125, and still referring to FIG. 1, discrete object is formed from additively manufactured body of material 300 by subtractive manufacturing; subtractive manufacturing may include any process or combination of processes described above for subtractive manufacturing. Subtractive manufacturing system 200 may be operated manually or automatically. In some embodiments, subtractive manufacturing system 200 is programed by one or more machine control instructions; the one or more machine control instructions may be executed using a microcontroller or other computing device imbedded in or attached to subtractive manufacturing system 200. Subtractive manufacturing system 200 may include one or more cutting tools or abrading tools, including but not limited to mills. Forming discrete object may be performed by removing material according to any method described above for subtractive manufacturing. As a non-limiting example, subtractive manufacturing may include milling. Subtractive manufacturing may include the use of EDM, lasers, water jets, and lathes. In some embodiments, where stabilized workpiece is placed on a trunnion table, subtractive manufacturing system 200 may remove material from more than one side of stabilized workpiece. Alternatively, additively manufactured body of material 300 may be machined from one side, reoriented, and machined from another side; this may be accomplished for example as described above in connection with FIGS. 5A-B.

Figure 7:
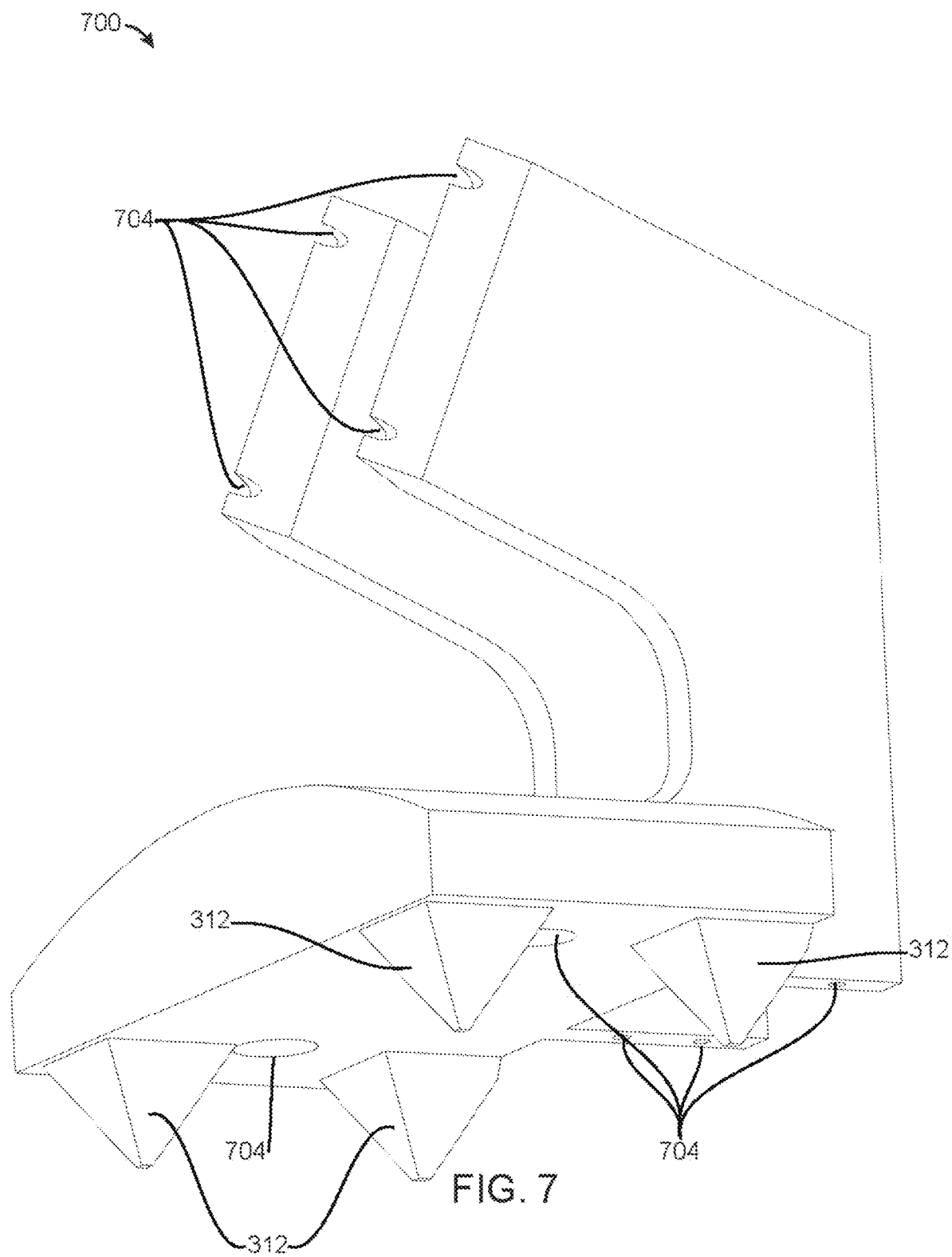
FIG. 7 is a perspective view of a discrete object in accordance with an embodiment.

FIG. 7 illustrates an exemplary embodiment of a discrete object 700 produced during step 125. Discrete object 700 may have one or more features 704 formed on precursor to discrete object 700 by subtractive manufacturing. One or more features 704 may include any feature or features that may be formed on an additively manufactured body of material 300 using subtractive manufacturing, including without limitation through holes, blind holes, threading, grooves, recesses, projections, or cuts to specified tolerances, such as tolerances for press-fits or other tolerance fits.

Figure 8:
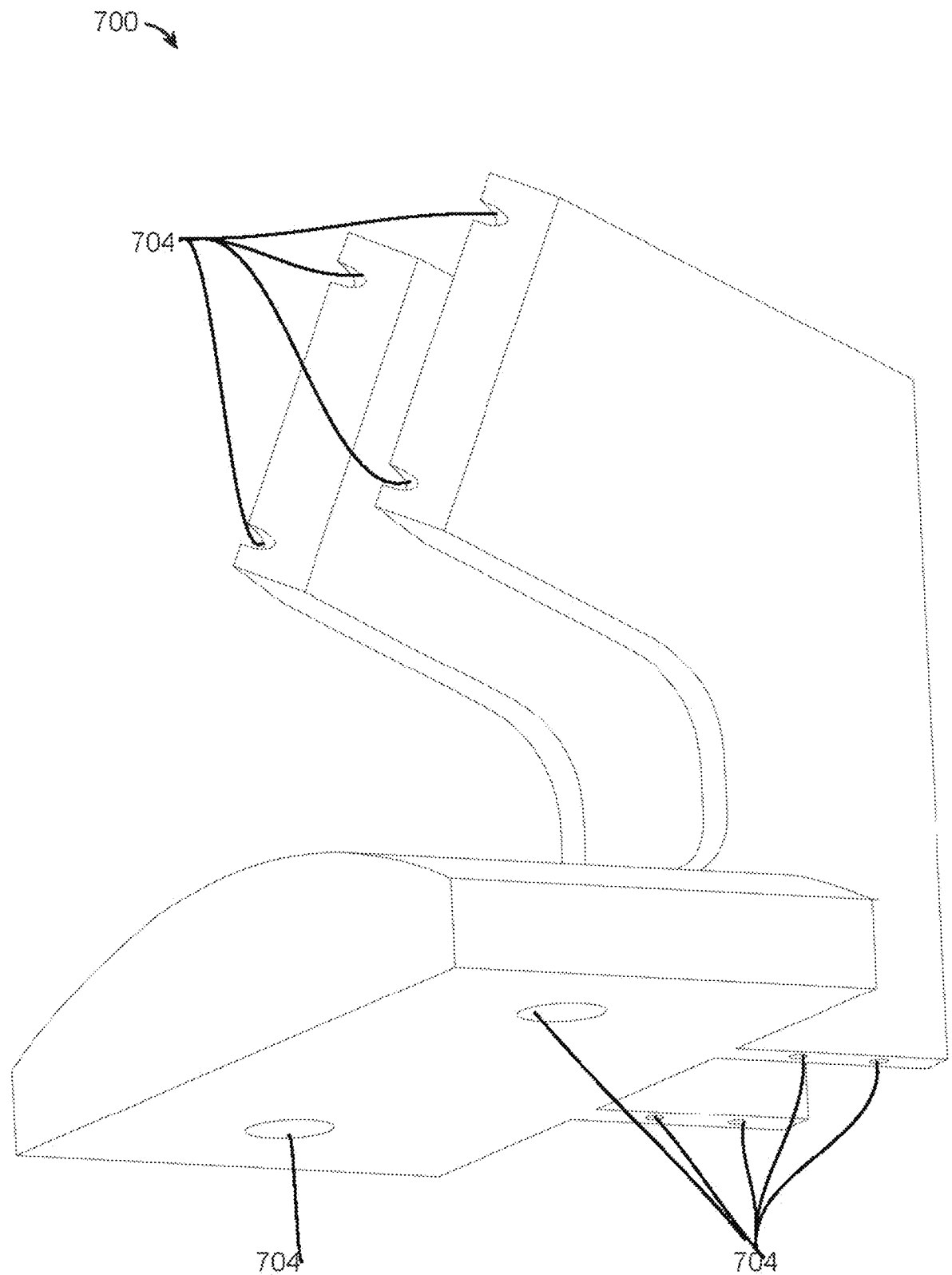
FIG. 8 is a perspective view of a discrete object in accordance with an embodiment.

As illustrated for example in FIG. 8, at least one of at least a reference feature 312 may be removed. For example, at optional step 130, at least a reference feature 312 may be removed by subtractive manufacturing, which include any process or combination of processes described above for subtractive manufacturing. At least a reference feature 312 may be removed by other means, such as sawing, clipping, cutting, or removal by further manufacturing devices.

Referring again to FIG. 1, at step 135, discrete object is removed from subtractive manufacturing system 200. In a further optional step (not shown), the discrete object removed from subtractive manufacturing system 200 at step 135 may be further processed as desired to finish that object. Examples of further process include but are not limited to: secondary machining, polishing, coating, silk-screening, and any combination thereof, among others. Fundamentally, there is no limitation on the finishing steps, if any, that may occur at the optional step.

In the foregoing method, the transitions between steps and/or locations at which the steps are performed may vary from one instantiation to another. For example, in an instantiation in which a milling machine, such as a CNC milling machine having a movable horizontal x-y bed and a rotational milling tool that moved in the z (vertical) direction, once a CAM model of the additively manufactured body of material 300 has been provided to the milling machine and additively manufactured body of material 300 is properly located for machining by the CNC milling machine, the machine may be controlled to perform step 125 of method 100 so as to one or more components or shapes on a first side of the additively manufactured body of material 300 and leave the additively manufactured body of material 300 together. Once the CNC milling machine has completed machining on one side of additively manufactured body of material 300 one or more workers, robot, or other machine may move the partially milled additively manufactured body of material 300 to a different position at the machine, to permit machining of a second side of additively manufactured body of material 300, as further illustrated below.

Some or all of the steps of method 100 and/or intermediate handling steps between the steps of method 100 may be automated to reduce the need for human interaction and contribution and associated costs. Such automation may be implemented using a work cell approach, wherein multiple steps are performed by one or more multitask or a set of single-task work-cell machines and one or more manipulators, as needed, to move a precursor to a discrete object 304 among the work-cell machines. Alternatively, the automation may be implemented using an assembly-line approach, wherein two or more single and/or multitask machines form an assembly line with suitable automated and/or manual conveyance means (e.g., conveyor belts, robots, dollies, push carts, etc.) for moving each precursor to a discrete object 304 from one machine to the next. Additionally, method 100 is exemplary and a person of ordinary skill in the art, after reading this disclosure in its entirety, will readily appreciate that method 100 may occur in a different order than show here.

Referring now to FIG. 9, an exemplary embodiment of a method 900 of manufacturing a discrete object from an additively manufactured body of material including a precursor to a discrete object and at least a precursor to at least a reference feature is illustrated. In step 905, an additively manufactured body of material including a precursor to a discrete object and at least a precursor to at least a reference feature is received. At step 910, at least a reference feature is formed, by subtractive manufacturing, from at least a precursor to at least a reference feature. At step 915, additively manufactured body of material is located within a subtractive manufacturing device using at least a reference feature. At step 920, discrete object is formed, by subtractive manufacturing, from the additively manufactured body of material. At step 925, discrete object is removed from subtractive manufacturing device.

Still referring to FIG. 9, and further referring to FIG. 3, in step 905, an additively manufactured body of material 300 including a precursor to a discrete object 304 and at least a precursor to at least a reference feature is received. Precursor to discrete object 304 may be any precursor to discrete object 304 as described above in reference to FIGS. 1-8. At least a precursor to at least a reference feature may have any form suitable for a precursor to a discrete object 304 as described above in reference to FIGS. 1-8; at least a precursor to at least a reference feature may include a "near net" version of one or more of at least a reference feature. Alternatively, at least a precursor to at least a reference feature may include a block of material of any suitable shape from which reference features may be manufactured. At least a precursor to at least a reference feature may be composed of any material or combination of materials suitable for the composition of at least a precursor to a discrete object 304. At least a precursor to at least a reference feature may be manufactured according to any manufacturing methods suitable for the manufacture of at least a precursor to a discrete object 304. At least a precursor to at least a reference feature may be manufactured together with at least a precursor to a discrete object 304.

Still referring to FIG. 9, and further referring to FIG. 4, at step 910, at least a reference feature 312 is formed, by subtractive manufacturing, from at least a precursor to at least a reference feature. Forming by subtractive manufacturing may be implemented using any subtractive manufacturing process described above in reference to FIGS. 1-8.

In an embodiment, at least a reference feature 312 may be manufactured as a function of a locating feature 216 at or within subtractive manufacturing system 200; at least a reference feature 312 may be subtractively manufactured to fit to locating feature 216 by receiving subtractive manufacturing control commands directing the subtractive manufacture of the at least a reference feature 312. For instance, where locating feature 216 includes a recess, at least a reference feature 312 may be subtractively manufactured having at least a projection that fits into the recess. As another example, where locating feature 216 includes a projection, at least a reference feature 312 may be subtractively manufactured having at least a recess that fits over the projection. Subtractive manufacturing control commands may be generated using one or more data describing locating feature 216; one or more data may include dimension, size, or shape data concerning locating feature 216. Subtractive manufacturing control commands may be generated using a computer model or graphical representation of a locating feature 216 at subtractive manufacturing system 200; subtractive manufacturing may be performed as a function of computer model of the locating feature 216. Subtractive manufacturing control commands may be generated using a computer model or graphical representation of at least a reference feature 312; subtractive manufacturing may be performed as a function of computer model of the at least a reference feature 312. Computer model of at least a reference feature 312 may be combined with or created by reference to a computer model of precursor to discrete object, for example as described in further detail below in reference to FIG. 10. At least a reference feature 312 may be formed as a function of a computer model of the at least a locating feature 216. At least a reference feature 312 may be formed as a function of a computer model of the at least a reference feature 312. At least a reference feature 312 may have any form suitable for at least a reference feature 312 as described above in reference to FIGS. 1-8.

At step 915, additively manufactured body of material is located within a subtractive manufacturing device using at least a reference feature. This may be implemented as described above for step 120 as described in reference to FIG. 1. At step 920, discrete object is formed, by subtractive manufacturing, from the additively manufactured body of material. This may be implemented as described above for step 125 as described in reference to FIG. 1. At step 925, discrete object is removed from subtractive manufacturing device.

Figure 10:
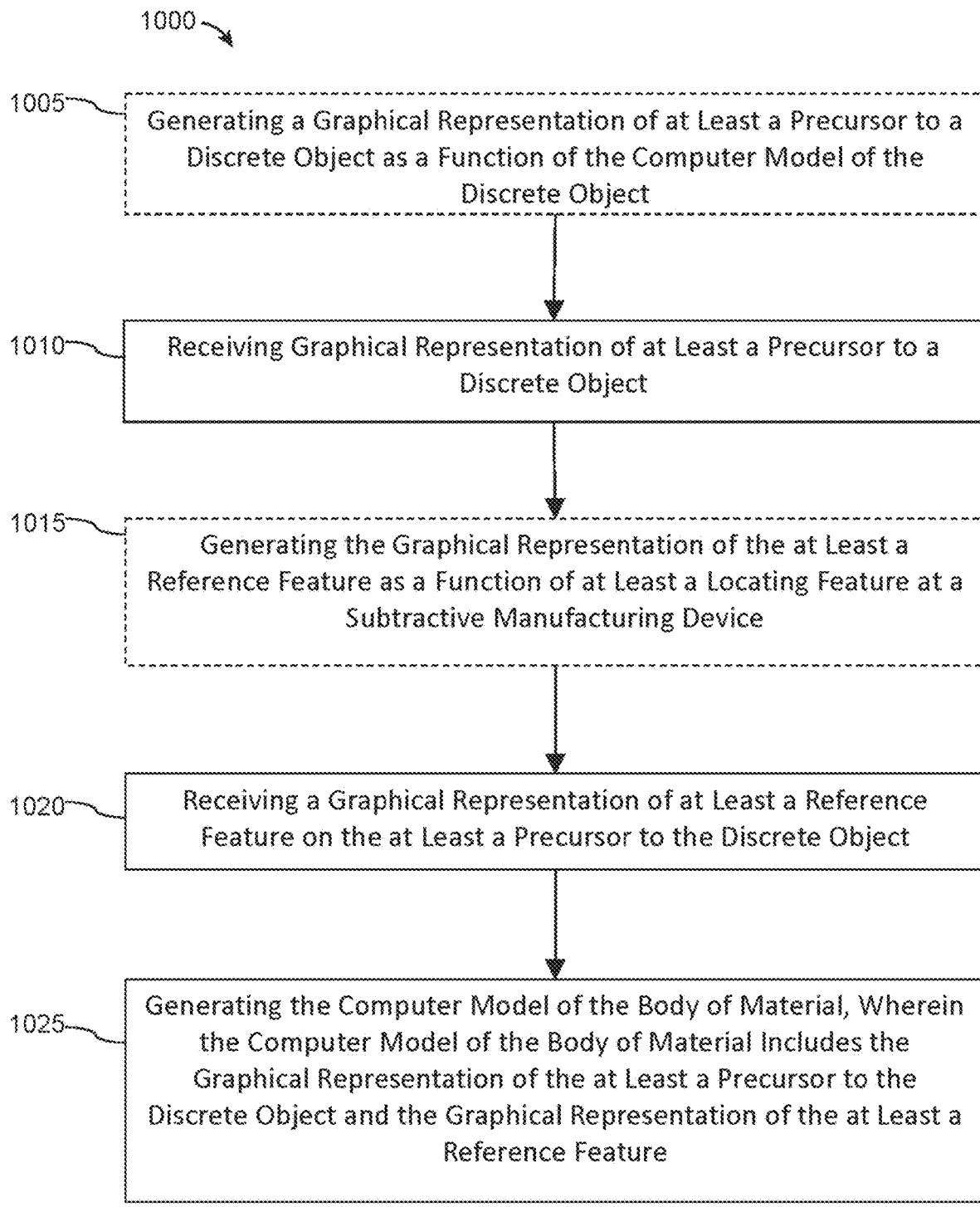
FIG. 10 is a flow diagram illustrating an exemplary method of producing a computer model of an additively manufactured body of material in accordance with an embodiment.

Referring now to FIG. 10, a method 1000 of manufacturing a discrete object from an additively manufactured body of material including a precursor to a discrete object and at least a reference feature. At optional step 1005, a graphical representation of precursor to a discrete object may be generated by an automated manufacturing system 200, automated manufacturing device 224 and/or controller as a function of a computer model of a discrete object. At step 1010, a graphical representation of precursor to a discrete object is received at automated manufacturing system 200, automated manufacturing device 224 and/or controller. At optional step 1015, a graphical representation of at least a reference feature may be generated as a function of at least a locating feature at a subtractive manufacturing device, by automated manufacturing system 200, automated manufacturing device 224, and/or controller. At step 1020, a graphical representation of at least a reference feature on precursor to the discrete object is received at automated manufacturing system 200, automated manufacturing device 224, and/or controller. At step 1025, a computer model of a body of material is generated at automated manufacturing system 200, automated manufacturing device 224, and/or controller, the computer model of the body of material including graphical representation of precursor to discrete object and graphical representation of at least a reference feature.

In an embodiment, and still viewing FIG. 10, modeling may include detection of one or more geometric features of objects to be formed from body of material or of one or more precursor elements in body of material. Detection of one or more geometric features may include detection one or more features to form from additively manufactured body of material. This may be accomplished, as a non-limiting example, by receiving one or more user instructions indicating one or more features to form. Alternatively or additionally, automated manufacturing system 200, automated manufacturing device 224, and/or controller may detect at one or more features to form, locations for at least a reference feature geometry of at least a locating feature and/or at least a reference feature, or any other geometric feature to be detected, modified, used, or manufactured according to any means or method herein, by interrogating any or all graphical models and/or computer models as described herein. Interrogation, as used herein, is a process whereby a system incorporating at least a computing device, including without limitation automated manufacturing system 200, automated manufacturing device 224, and/or controller, analyzes a graphical model of a body, discrete object, part, product, workpiece, or the like, and extracts information describing one or more features represented in the graphical model, either as existing features of the body discrete object, part, product, workpiece or the like, or as features to be added to and/or formed thereon. Information extracted during interrogation may include, without limitation, geometrical information, such as lengths, widths, heights, thicknesses, contours, bend radii, opening sizes and locations, volumes, etc.; part clearances; dimensional tolerances; materials; finishes; purchased components, such as mechanical fasteners, hinges, handles, latches, etc.; and certifications. Persons skilled in the art, upon reviewing the entirety of this disclosure, will be aware of various categories of data that may likewise be extracted during interrogation. In some embodiments, model-based pricing information may be considered to be parsed into "raw" variables and "processed" variables. Raw variables are variables that an interrogator can obtain directly from the computer-model data, and processed variables are variables generated by the interrogator from raw variables. Processed variables may be thought of as inputs needed for generating a price but that are not directly available from the computer-model data. In the context of an example for machining fabrication based on a SolidWorks® computer model, raw variables may include face count, surface count, hole count, and counterbore count, and processed variables may include cutout volume and machining operation setup count.

Interrogation may involve parsing and/or analyzing a graphical model such as a three-dimensional computer model including without limitation a CAD model to identify separate elements thereof by reading specific commands issued by or to a modeling program used to create and/or modify the graphical model. Interrogation may involve parsing and/or analyzing a graphical model to identify specific routines or functions associated with such commands to determine whether they collectively define an individual element or portion (a "shape," "solid body," or "component") of a 3D computer model. Many CAD systems, including, by way of example, SolidWorks® (registered trademark of Dassault Systemes), include an application program interface (API) to enable a user to control the issuance of customized routines or functions associated with such commands. Interrogation may involve reading such commands, routines, and functions to determine whether they define an individual shape, and, if so, may analyze various geometric aspects of the defined shape to determine whether such aspects correspond to one or more manufacturing requirements for a product to be manufactured based on a 3D computer model.

As a non-limiting example of interrogation using or based on the SolidWorks CAD program, interrogation may involve reading the "FeatureManager Design Tree" (an outline representation of individual shapes) to determine the number of solid bodies (or shapes) in the design. Representations of individual shapes may be found in other CAD software files, and other CAD software systems may be used. In SolidWorks, one command usable to analyze the number of solid bodies is:

object[ ] bodies=(object[ ])part.GetBodies2((int)Const.sw-BodyType_e.swSolidBody, false);
and the output is a list of bodies. The foregoing code statement is listed by way of example only; other code statements or sequences may be used. Interrogation may involve analyzing geometric aspects of such identified shapes and comparing such aspects to corresponding manufacturing requirements. In an embodiment, these manufacturing requirements may include given starting materials. In general, interrogation may be performed using any method, facility, or combination thereof used for identifying features of a graphical model of an object, including without limitation methods or facilities used by CAD or CAM systems, for instance for toolpath generation.

In an embodiment, automated manufacturing system 200, automated manufacturing device 224, and/or controller may identify at least a feature to be formed by comparing a model of discrete object incorporating such features and/or a model of a part or product to be formed from discrete object to a model of discrete object in which such features are excluded. Interrogation may further provide a modification history one or more computer models indicating one or more features recently added by a user or automated process.

Automated manufacturing system 200, automated manufacturing device 224, and/or controller may select a first side on which to place at least a reference feature based on detected features; for instance, interrogation may produce data indicating that one or more features to form may be formed by inserting a given side of discrete object in a recess and rotating a resulting unified workpiece to render a location of each feature accessible to a machine tool, for instance on a rotary table or the like; the given side may therefore be selected as first side. This process may be iterative; for instance, automated manufacturing device 224, and/or controller may identify first side, perform the remaining steps of any method disclosed herein for such as modeling and/or manufacture of at least a reference feature on first side, corresponding to the initial first side, then identify a second side and repeat any and all such steps with regard to the second side. First side may alternatively or additionally be specified by user input. Persons skilled in the art, upon review of the entirety of this disclosure, will be aware of various techniques, APIs, facilities, and/or algorithms for automated determination of orientations for manufacture of a given feature on a given discrete object and/or determination of feasibility of formation of a given feature from a given orientation, for instance using toolpath generation programs, machine-control instruction generation programs, "slicers," and the like.

Figure 11:
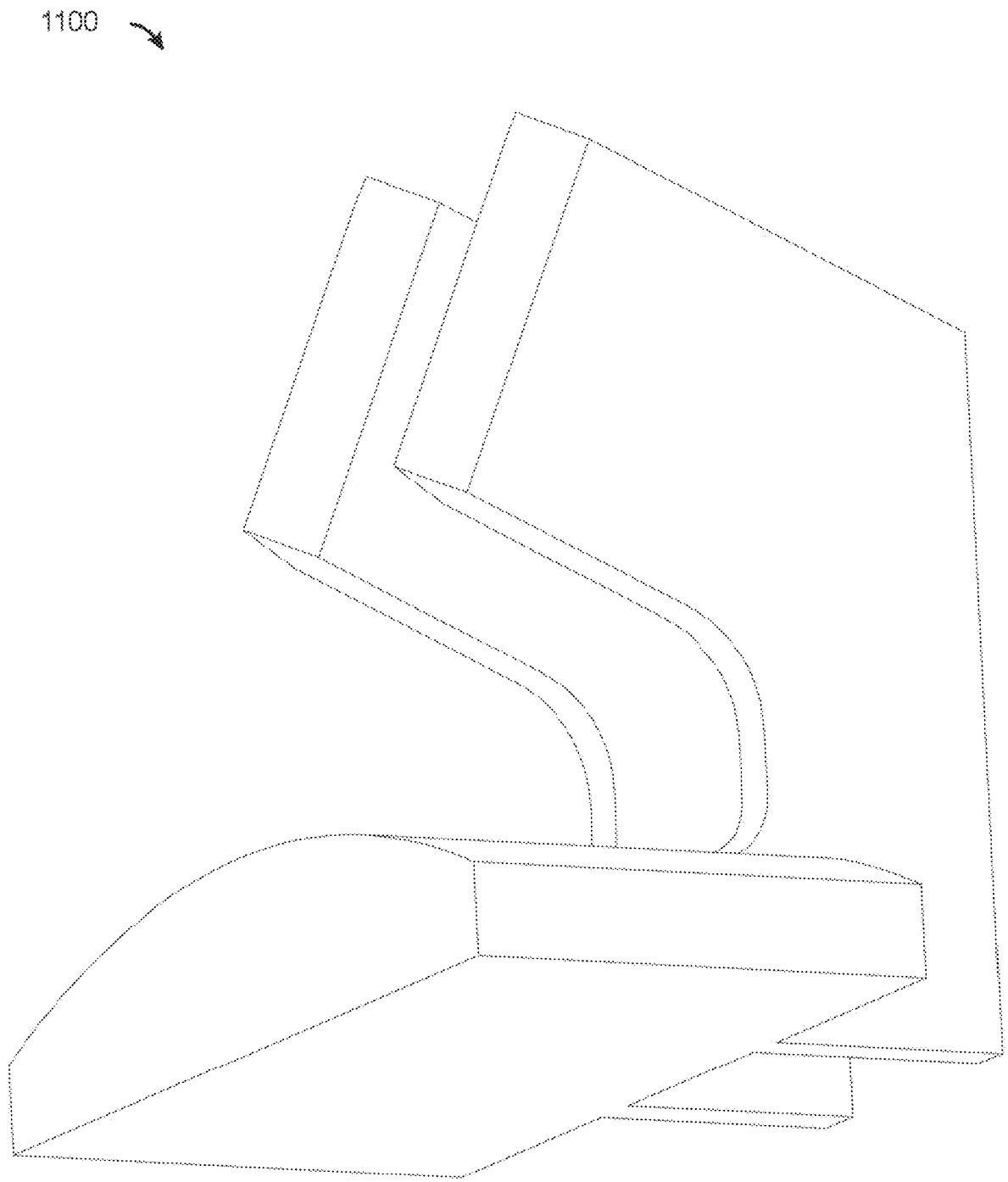
FIG. 11 is a perspective view of a graphical representation of a precursor to a discrete object in accordance with an embodiment.

Still referring to FIG. 10, and also referring to FIG. 11, at step 1010 a graphical representation of precursor to a discrete object 1100 is received. In an embodiment, graphical representation of precursor to discrete object 1100 is received at a computing device, such as any computing device as described below in reference to FIG. 14. Graphical representation of precursor to discrete object 1100 may be received at or opened in a CAD program, CAM program, or other program used for modeling objects for manufacture. Graphical representation of precursor to discrete object 1100 may be received from another computing device via wired or wireless communication, or from a temporary memory storage device.

Still referring to FIGS. 10 and 11, in an embodiment, receiving graphical representation of precursor to discrete object 1100 involves generating the graphical representation of precursor to discrete object 1100. A user may generate graphical representation of precursor to discrete object 1100 in a modeling program such as a CAD program by assembling one or more geometric components of the graphical representation of precursor to discrete object 1100; one or more geometric components may include geometric primitives or more complex models.

Figure 12:
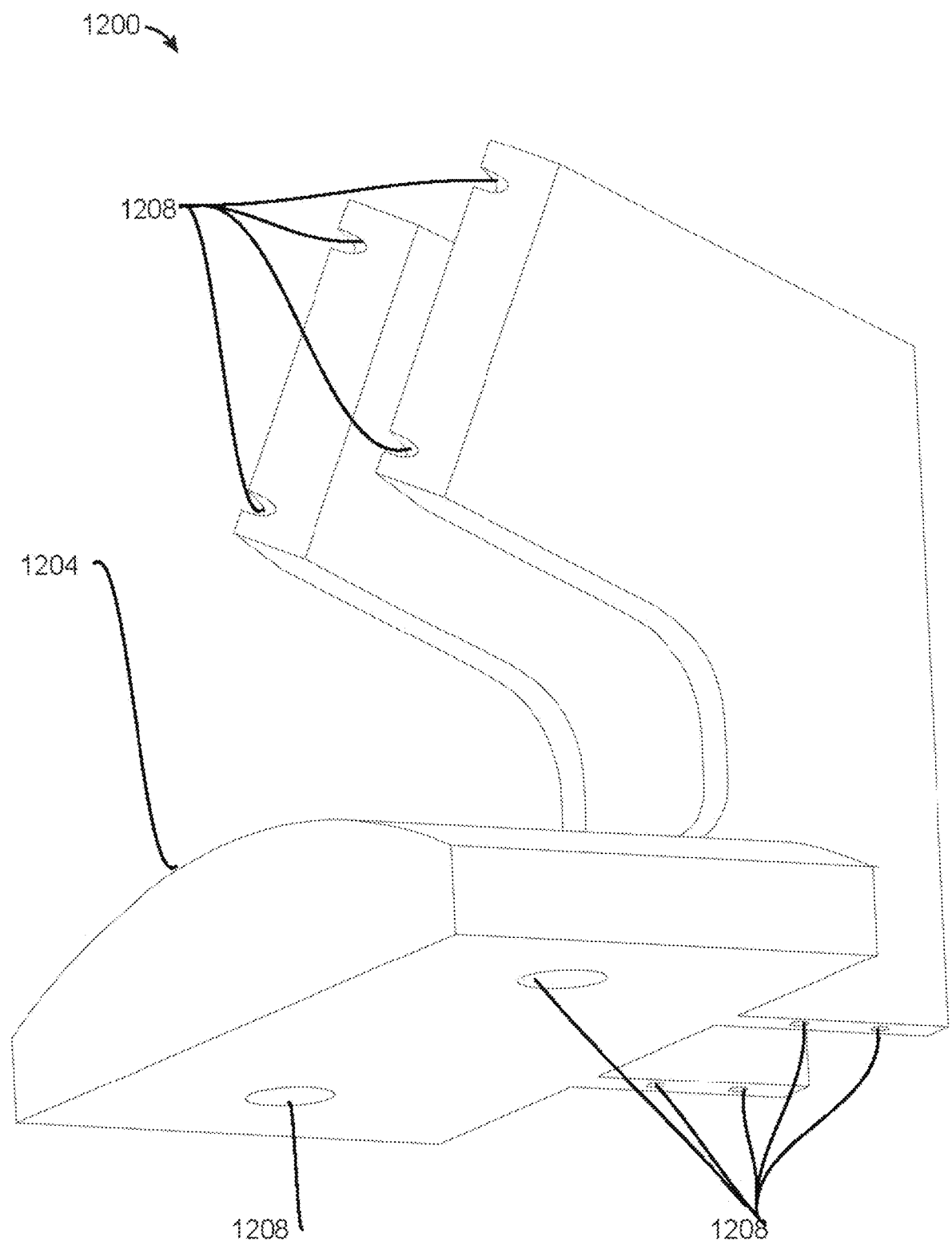
FIG. 12 is a perspective view of a computer model of a discrete object in accordance with an embodiment.

Continuing to refer to FIGS. 10 and 11, graphical representation of precursor to discrete object 1100 may be generated as a function of another model. For example, at optional step 1005, graphical representation of precursor to discrete object 1100 may be generated as a function of a computer model of a discrete object. Referring now to FIG. 12, an exemplary embodiment of a computer model of a discrete object 1200 is illustrated. Computer model of a discrete object 1200 may be received from another machine or generated by a user in a modeling program such as a CAD program; user may generate computer model by assembling geometric components as described above. Graphical representation of precursor to discrete object 1100 may be generated by reproducing one or more geometric features 1204 of computer model of discrete object; one or more geometric features 1204 may be any feature representing at least a geometric characteristic 308 of discrete object as described above in reference to FIGS. 1-8. In an embodiment, graphical representation of precursor to discrete object 1100 is a graphical representation of a "near net" object as described above in reference to FIGS. 1-8; for instance, the geometric representation of precursor to discrete object 1100 may be substantially identical to computer model of at discrete object 1200 except for at least a feature 1208 to be formed, using subtractive manufacturing, from an additively manufactured body of material as modeled in method 1000. At least a feature 1208 may be any feature of discrete object to be formed by subtractive manufacturing as described above in reference to FIGS. 1-8.

Figure 13:
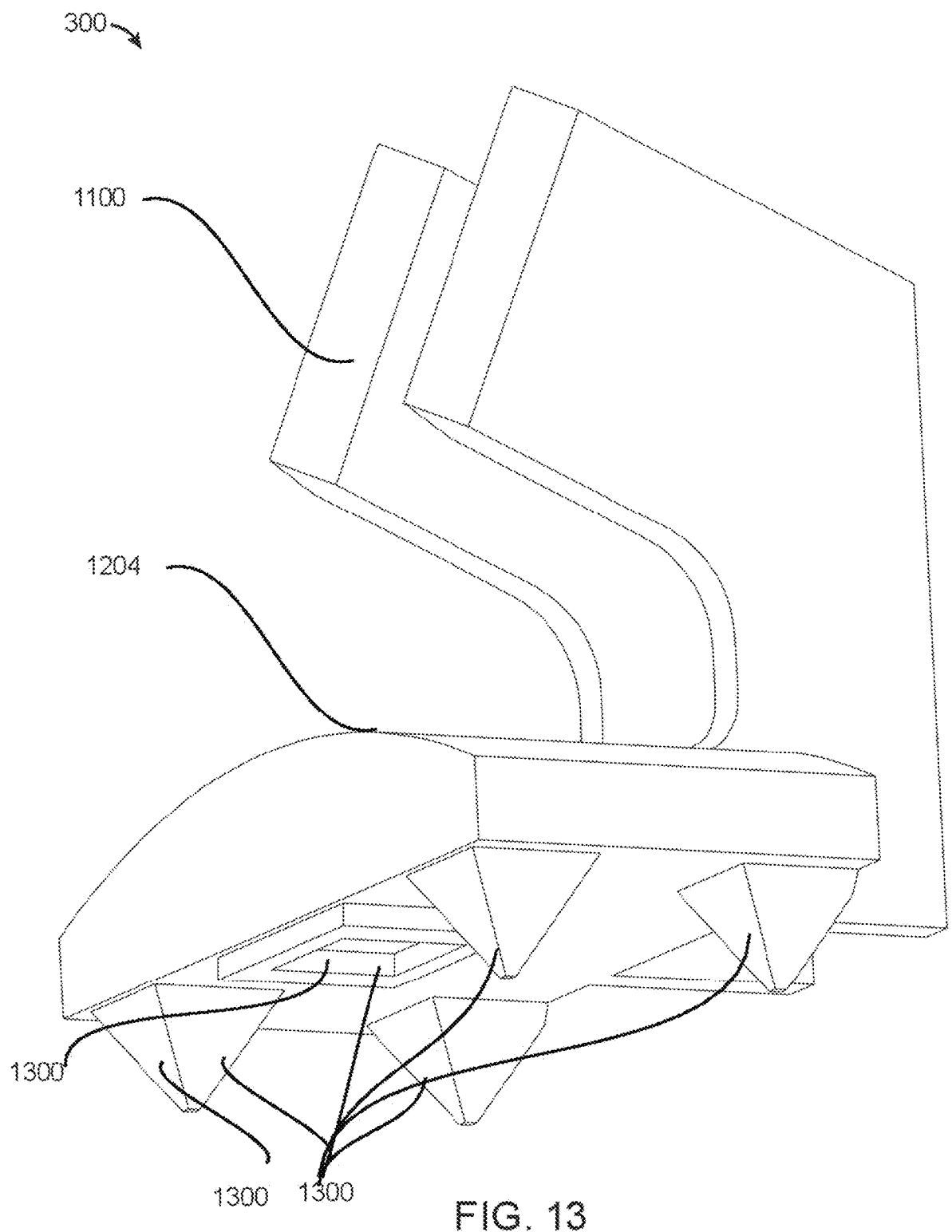
FIG. 13 is a perspective view of a computer model of an additively manufactured body of material in accordance with an embodiment.

Still referring to FIG. 10, and further referring to FIG. 13, at step 1020, a graphical representation of at least a reference feature 1300 on precursor to the discrete object is received. Graphical representation of at least a reference feature graphical representation of at least a reference feature 1300 may be received with graphical representation of precursor to discrete object 1100; for instance, both graphical representation of precursor to discrete object 1100 and graphical representation of at least a reference feature 1300 may be received as part of a single CAD file or file used in another modeling program. Graphical representation of at least a reference feature 1300 may be generated. For instance, at optional step 1015, graphical representation of at least a reference feature 1300 may be generated as a function of at least a locating feature at a subtractive manufacturing device. In an embodiment, data describing at least a locating feature is received; data may include dimension, shape, or size data of at least a locating feature. Data may include a graphical representation of at least a locating feature. Data may be used to generate graphical representation of at least a reference feature 1300; for instance, graphical representation at least a reference feature 1300 may be generated to represent a reference feature that fits within a recess or around a projection. Graphical representation of at least a reference feature 1300 may be generated to represent any at least a reference feature 312 described above in reference to FIGS. 1-8. For instance, graphical representation of at least a reference feature 1300 may include at least a projection. Graphical representation of at least a reference feature 1300 may include at least a recess.

Still referring to FIG. 10 and further referring to FIG. 13, in an embodiment, graphical representation of at least a reference feature may be formed by superimposing a standard feature on the geometry of graphical representation of precursor to discrete object 1100; for instance, a standard shape may be an elongated form that is merged with graphical representation of precursor to discrete object 1100 to project above and below graphical representation of precursor to discrete object 1100, for instance to create representations of first-side reference features 528 and second-side reference features 532 as described above in reference to FIGS. 5A-B. In some embodiments, a plurality of graphical representations of reference features are formed as a function of a plurality of locating features, such as a plurality of bolt or stud holes on a base table, trunnion table, or other table. In an embodiment, generation of graphical representation of at least a reference feature using a graphical representation of at least a locating feature, for instance by superimposing a model of one graphical representation on another and generating a modified model as a result; techniques for performing this process may follow any means or method disclosed in U.S. Non-provisional patent application Ser. No. 15/939,209, filed on Mar. 28, 2018, the entirety of which is incorporated herein by reference.

In an embodiment, and still viewing FIG. 10, graphical representation of at least a reference feature may further include a graphical representation of a first feature on a first surface of precursor to the discrete object and a graphical representation of a second feature on a second surface of precursor to the discrete object; this may be implemented as described above in reference to FIGS. 1-9. As a non-limiting example, interrogation as described above may demonstrate that, in a first orientation selected as described above for subtractive manufacture of discrete object, a first set of reference features may be required to maintain additively manufactured body of material in that first orientation, for instance by joining the first set of reference features to at least a locating feature, while in a second orientation a second set of reference features may be required to maintain additively manufactured body of material in that orientation; automated manufacturing system 200, automated manufacturing device 224, and/or controller may generate each of first set of reference features and second set of reference features, for instance, by transforming graphical model of at least a precursor into the first orientation and then second orientation, and performing methods as described further herein for generation of graphical representations of first set of reference features and second set of reference features in each orientation. Orientation may, as a non-limiting example, be selected to permit or optimize manufacture of at least a critical-to-quality feature as described in further detail below.

With continued reference to FIG. 10, in an embodiment, graphical representation of the at least a reference feature further includes a graphical representation of a first reference feature that extends a first distance from a first surface of the precursor to the discrete object and a graphical representation of a second reference feature that extends a second distance from a second surface of the precursor to the discrete object; as noted above, the first distance may be greater than the second distance. This may be performed, for instance, via interrogation as disclosed above; in a selected orientation, a portion of a surface facing at least a locating feature may be at a greater distance from the at least a locating feature than another portion, as determined by, for instance, geometric analysis of a model combining a model of at least a locating feature with a model of at least a precursor, based upon which first reference feature and second reference feature may be generated with differing lengths to maintain at least a precursor in the selected orientation when at least a reference feature is joined to at least a locating feature.

At step 1025, and continuing to refer to FIG. 10 and FIG. 13, a computer model 1304 of a body of material is generated, the computer model of the body of material including graphical representation of precursor to discrete object and graphical representation of at least a reference feature. In an additional optional step not shown, additive manufacture control instructions may be generated as a function of computer model of body of material. Additive manufacture control instructions may be transmitted to an additive manufacturing device to manufacture precursor to discrete object 304, at least a reference feature 312, or body of material 300, for instance as described above in reference to FIGS. 1-8.

Subtractive machine control instructions may be generated in another optional step not illustrated as a function of computer model of body of material. Subtractive machine control instructions may be transmitted to a subtractive manufacturing system 200, for instance instructing subtractive manufacturing device to manufacture a discrete object 700 as described above in reference to FIGS. 1-8. In an embodiment, generating model of an additively manufactured body of material 300 in accordance with the disclosed method improves the function of computer modeling programs such as CAD programs by enhancing the ability of computer modeling programs to design manufacturing processes; improvements may include the ability to plan manufacturing processes that combine the geometric flexibility of additive manufacturing with the precision and speed of subtractive manufacturing processes. In an embodiment, generating model of an additively manufactured body of material 300 in accordance with the disclosed method improves manufacturing processes and technology by enabling optimal combination of additive and subtractive manufacturing techniques; improvements may include the ability to use manufacturing processes that combine the geometric flexibility of additive manufacturing with the precision and speed of subtractive manufacturing processes.

In an embodiment, and still viewing FIG. 10, automated manufacturing system 200, automated manufacturing device 224, and/or controller may initiate manufacture of the additively manufactured body of material as a function of the graphical representation of the additively manufactured body of material. This may be performed as described above in reference to FIGS. 1-9, and/or as described in any material incorporated herein by reference. Initiation of manufacture may include performance of a first step in the removal of material from additively manufactured body of material and/or addition of material to additively manufactured body of material as described above; first step may include a particular milling or cutting operation, such as the performance of a registration cut. First step may include location of body of material at an automated manufacturing system 200 and/or automated manufacturing device 224; location may include placement in a precise position and/or registration within a coordinate system used by automated manufacturing system 200 and/or automated manufacturing device 224 to guide particular manufacturing steps. First step may include generation of a control instruction initiating manufacturing steps; generation of a control instruction may include transmission of a signal to initiate manufacture and/or transmission of any machine control instruction sets generated as described above, including without limitation transmission of information for localized and machine-specific machine-control instruction generation. Transmission may be direct or indirect; for instance, transmission may involve transmission to a remote device that relays transmission to an automated manufacturing system 200 and/or automated manufacturing device 224 or computing device coupled thereto, or transmission to an auxiliary computing device or computer memory for transport to the automated manufacturing system 200 and/or automated manufacturing device 224 and/or computing device coupled thereto. Initiation of manufacture may include initiating additive manufacture of the additively manufactured body of material as a function of the graphical representation of the additively manufactured body of material. Initiating manufacture may include initiating subtractive manufacture of at least a discrete object from the additively manufactured body of material; this may be performed as a function of graphical representation of additively manufacture body of material, a graphical representation of one or more discrete objects, or both.

With continued reference to FIG. 10, automated manufacturing system 200, automated manufacturing device 224 and/or controller may generate at least a machine-control instruction to subtractively manufacture at least a discrete object from the additively manufactured body of material. This may be performed as described above in reference to FIGS. 1-9, and/or as described in any material incorporated herein by reference. Generating the at least a machine-control instruction may include receiving a graphical representation of the at least a discrete object and generating the at least a machine-control instruction as a function of the graphical representation of the at least a discrete object, for example and without limitation as described above in reference to FIGS. 1-9 and/or in any material incorporated herein by reference. Controller may initiate manufacture of the additive body of material and/or discrete object. This may be performed as described above in reference to FIGS. 1-9, and/or as described in any material incorporated herein by reference. Initiation of manufacture may include performance of a first step in the removal of material from additively manufactured body of material and/or addition of material to additively manufactured body of material as described above; first step may include a particular milling or cutting operation, such as the performance of a registration cut. First step may include location of body of material at an automated manufacturing device 224; location may include placement in a precise position and/or registration within a coordinate system used by automated manufacturing system 200 and/or automated manufacturing device 224 to guide particular manufacturing steps. First step may include generation of a control instruction initiating manufacturing steps; generation of a control instruction may include transmission of a signal to initiate manufacture and/or transmission of any machine control instruction sets generated as described above, including without limitation transmission of information for localized and machine-specific machine-control instruction generation. Transmission may be direct or indirect; for instance, transmission may involve transmission to a remote device that relays transmission to an automated manufacturing system 200 and/or automated manufacturing device 224 or computing device coupled thereto, or transmission to an auxiliary computing device or computer memory for transport to the automated manufacturing system 200 and/or automated manufacturing device 224 and/or computing device coupled thereto. Initiation of manufacture may include initiating additive manufacture of the additively manufactured body of material as a function of the graphical representation of the additively manufactured body of material. Initiating manufacture may include initiating subtractive manufacture of at least a discrete object from the additively manufactured body of material; this may be performed as a function of graphical representation of additively manufacture body of material, a graphical representation of one or more discrete objects, or both.

In an embodiment, methods and systems described above improve the efficiency of manufacturing processes by permitting an additively manufactured body to be set up at a subtractive manufacturing device using features, created during additive manufacturing, that match up to features of the subtractive manufacturing device. As the additive process may be modeled to create such reference features automatically, this may eliminate the need for skilled or time-consuming setup procedures; a person with relatively little training may set up a workpiece so produced by mating an additively created reference feature to a corresponding feature at the subtractive manufacturing device. As a result, one or more setups may be performed rapidly and at little cost. Subtractive manufacturing may be used to remove reference features that are no longer required.

Figure 14:
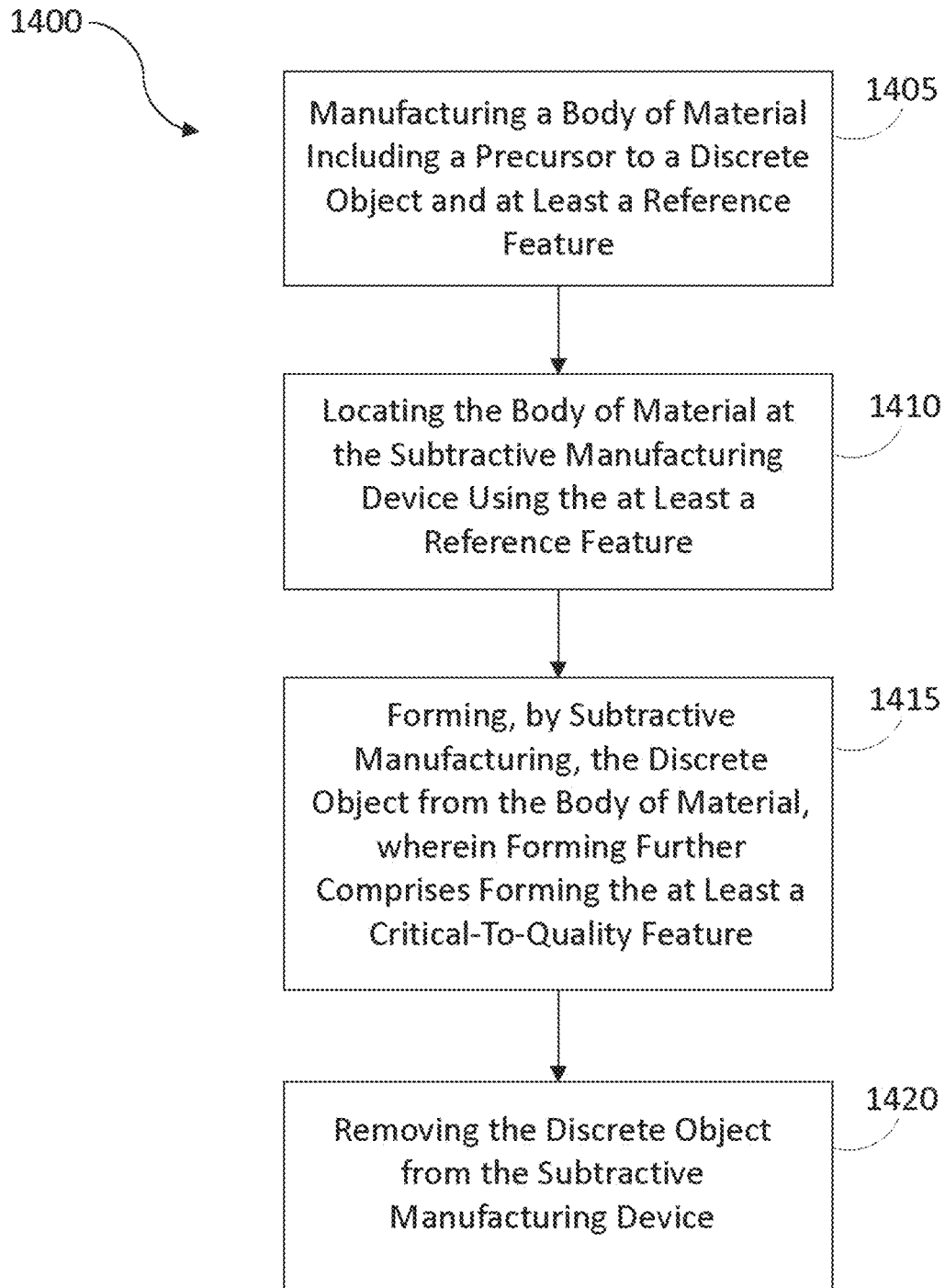
FIG. 14 is a flow diagram illustrating an exemplary embodiment of a method of manufacturing a discrete object from a body of material including a precursor to a discrete object and at least a reference feature.

Referring now to FIG. 14, an exemplary embodiment of a method 1400 of manufacturing a discrete object from a body of material including a precursor to a discrete object and at least a reference feature, is illustrated. At step 1405, an automated manufacturing system manufactures a body of material including a precursor to a discrete object and at least a reference feature. Automated manufacturing system may include any automated manufacturing system 200 and/or automated manufacturing device 224 as described above in reference to FIGS. 1-13. Automated manufacturing system includes a subtractive manufacturing device. Subtractive manufacturing device may include any subtractive manufacturing device as described above in reference to FIGS. 1-13.

Figure 15:
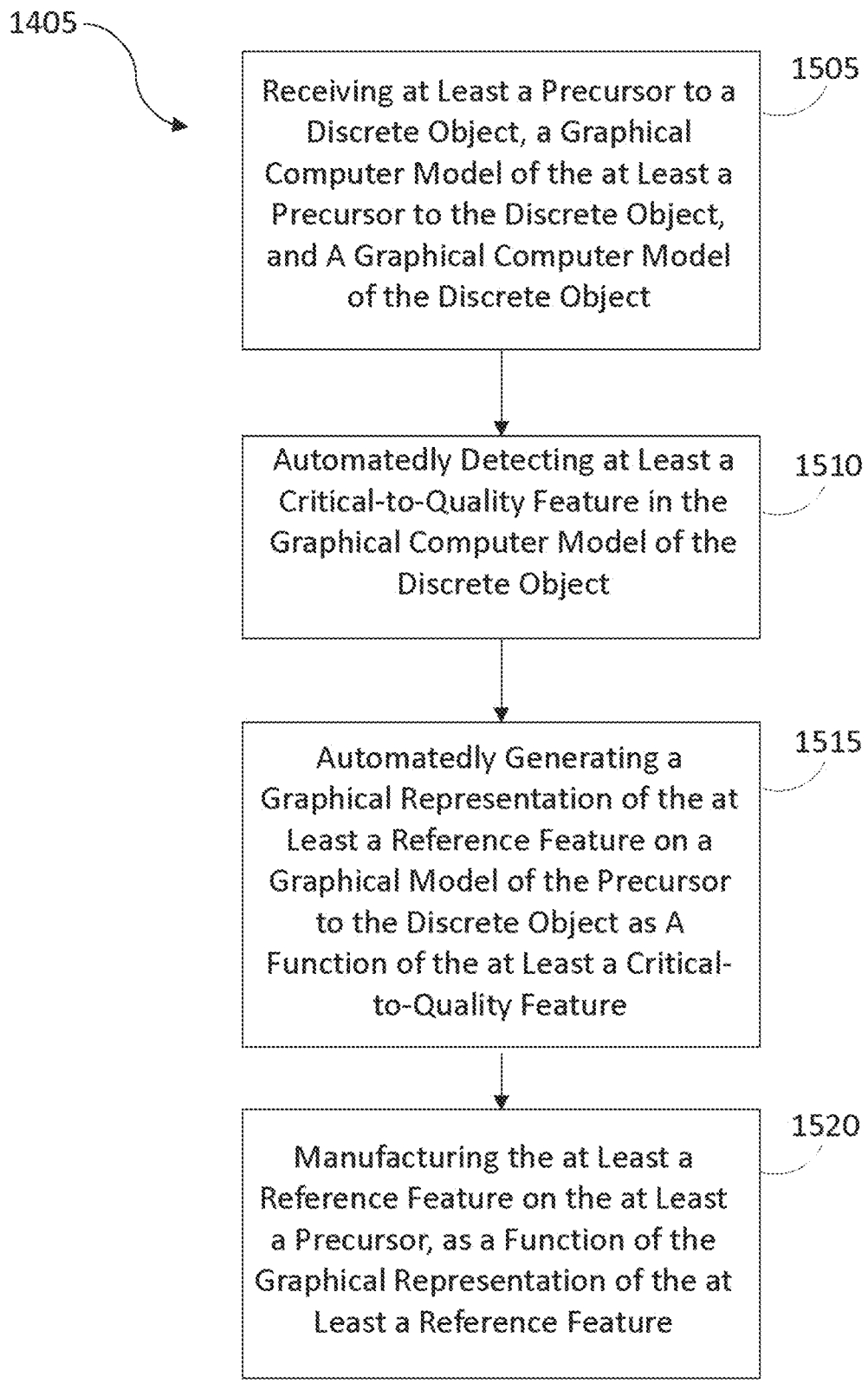
FIG. 15 is a flow diagram illustrating exemplary embodiments of method steps for identifying critical-to-quality features.

Referring now to FIG. 15, a flow diagram illustrates exemplary embodiments of process steps for manufacturing a body of material including a precursor to a discrete object and at least a reference feature 1405. At step 1500, automated manufacturing system 200 and/or automated manufacturing device 224 receives at least a precursor to a discrete object, a graphical computer model of the at least a precursor to the discrete object, and a graphical computer model of the discrete object. In an embodiment, receiving the at least a precursor to the discrete object may be implemented as described above in reference to FIGS. 1-13. For instance, and without limitation, receiving the at least a precursor to the discrete object may include manufacturing the at least a precursor to the discrete object. Manufacturing may include additively manufacturing the at least a precursor; this may be implemented according to any method, method step, and/or using any process, means, devices, or systems described above in reference to FIG. 13. Alternatively or additionally, manufacturing may include subtractively manufacturing the at least a precursor; this may be implemented according to any method, method step, and/or using any process, means, devices, or systems described above in reference to FIG. 13. Receiving graphical computer model of at least a precursor may be implemented according to any method, method step, and/or using any process, means, devices, or systems described above in reference to FIG. 13. Receiving graphical computer model of graphical computer model of the discrete object according to any method, method step, and/or using any process, means, devices, or systems described above in reference to FIG. 13.

Still viewing FIG. 15, at step 1505, automated manufacturing system automatedly detects at least a CTQ feature in the graphical computer model of the discrete object. In an embodiment, detecting the at least a critical-to-quality feature further comprises extracting a geometric description of at least a surface feature depicted in the graphical computer model, comparing the geometric description of the at least a surface feature to a geometric description of at least a stored CTQ shape description, and determining that the geometric description of the at least a surface feature matches the geometric description of the at least a stored CTQ shape description. In an embodiment, automated manufacturing system may include a database or data store containing a plurality of geometric descriptions of shapes frequently associated with CTQ features. Geometric descriptions may be any mathematical information usable to store geometric forms for a CAD system, similar software, and/or related software as described in further detail above in reference to FIGS. 1-13. Geometric descriptions may be provided in terms of mathematical formulas for planes, curves, lines, and the like; formulas may be stored according to two or three-dimensional Cartesian or polar coordinates, vector-based formulas, or the like. Persons skilled in the art, upon reviewing the entirety of this disclosure, will be aware of various ways in which automated manufacturing system may store geometric and/or mathematical formulas to describe the geometry of one or more shapes. Comparison may be performed by, e.g., identifying a formula for a shape represented in graphical computer model using, for instance, an interrogator as described above in reference to FIGS. 1-13; a formula may be normalized or otherwise scaled for numerical comparison to a standard formula stored in memory, and/or may be compared to one or more general rules matching the formula to geometric forms.

Still referring to FIG. 15, stored CTQ shape descriptions may be entered, defined, or otherwise provided by users; alternatively or additionally, CTQ shape descriptions may be derived from features identified as CTQ features as described herein regarding any method or method step for identifying CTQ features and storing the identified CTQ features. For instance, an initial library of common forms or forms that one or more users have encountered as matching CTQ features may be entered; additional forms may be entered by users as subsequently encountered, or entered by automated manufacturing system when automatically identified as described in further detail herein.

Figure 16A:
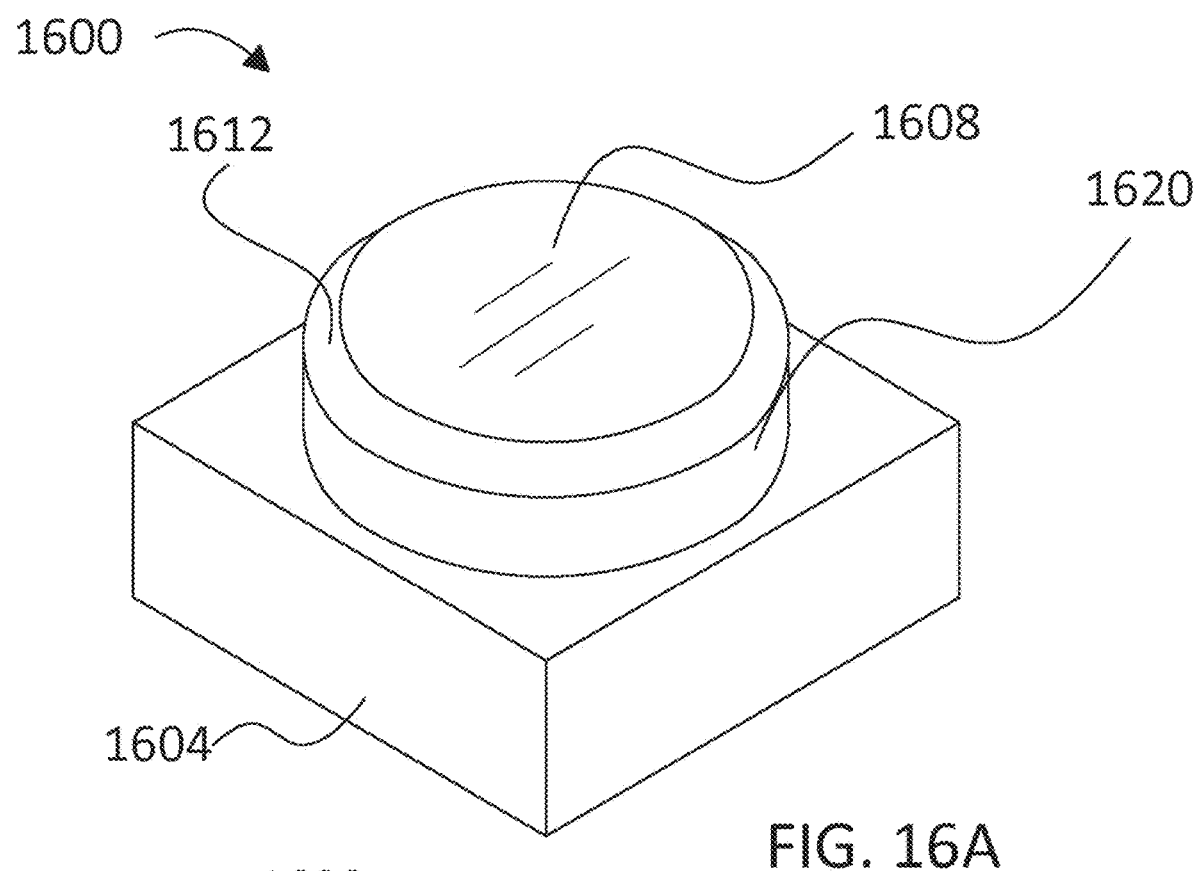
FIGS. 16A-C are isometric diagrams of exemplary embodiments of graphical computer models.

Referring now to FIG. 16A, an exemplary embodiment of a graphical computer model 1600 of a discrete object 1604 is illustrated. As a non-limiting example, a stored CTQ form may match a mating projection 1608, such as a cylindrical projection or other projection having a form commonly or previously associated with a mating projection. A feature, such as a beveled end, commonly used to aid in formation of press fits or the like may be a further indication that a feature is a CTQ feature; a stored CTQ form may, for instance, show a projection 1608 having a beveled end 1612, such as a beveled cylindrical projection. As a further non-limiting example, and as illustrated for instance in FIG. 16B, a recess may be identified as a mating recess 1616 by comparison to a stored CTQ form representing a commonly or previously used mating recess. As a result, mating projection 1608 and/or mating recess 1616 may be identified as CTQ by automated manufacturing system. Mating recess 1616 may have features matching features designed to aid in mating processes, similarly to mating projection 1608

Figure 16B:
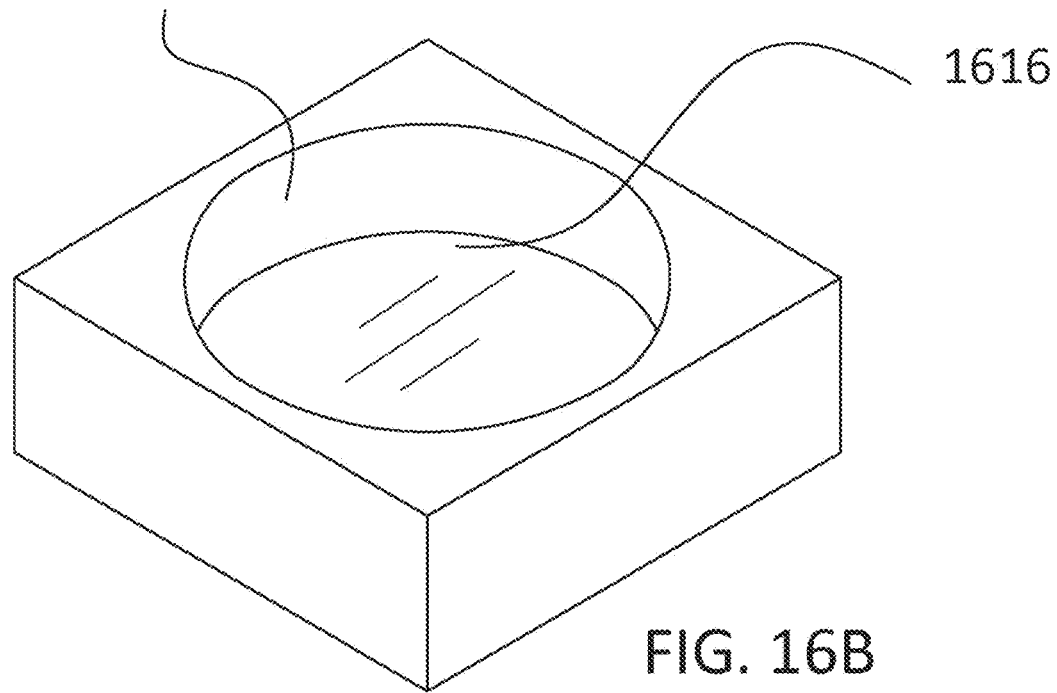

Still referring to FIGS. 16A-B, in an embodiment, detecting the at least a critical-to-quality feature may include detecting at least a join locus. At least a join locus may be a location on a graphical computer model corresponding to a location on a represented discrete object where the discrete object is or will be joined to another discrete object, part, or component. For instance, and without limitation, a stored CTQ value may be associated with stored data indicating its likely use as a join location, for instance as a mating projection and/or mating recess as described above. As a further non-limiting example, detecting at least a join locus may include extracting a first geometric description of at least a surface feature depicted in graphical computer model, comparing the geometric description of the at least a surface feature to a geometric description of at least a second surface feature 1620 of a graphical representation of an object, and determining that the first geometric feature and second geometric feature are complementary forms. For instance, and without limitation, a projection in graphical computer model may have a form complementing a recess graphical representation of object, where a "complementing" form may indicate that projection and recess may mate to form an engineering fit; engineering fit may include, without limitation, a clearance fits such as an "easy running" fit, "close running" fit, "sliding" fit, or "location" fit, a transition such as a "tight fit," "similar fit," or "fixed fit," an interference fit such as a "press fit," "driving fit," "forced fit," or "shrink fit," any one of RC1-9 fits, or the like. An engineering fit may be identified by a recess having a similar form to a projection and dimension sufficiently close to those of the projection to indicate suitability to one or more fits; in another embodiment, a projection may be identified as forming an engineering fit with a recess if the former is a shape differing from the shape of the recess but capable of fitting to the recess according to the parameters of one or more such fits. In an embodiment, graphical representation of object may be associated with graphical computer model; for instance, the two may be provided together, or indicated by a user, flag, or datum as representing discrete objects to be combined together.

Figure 16C:
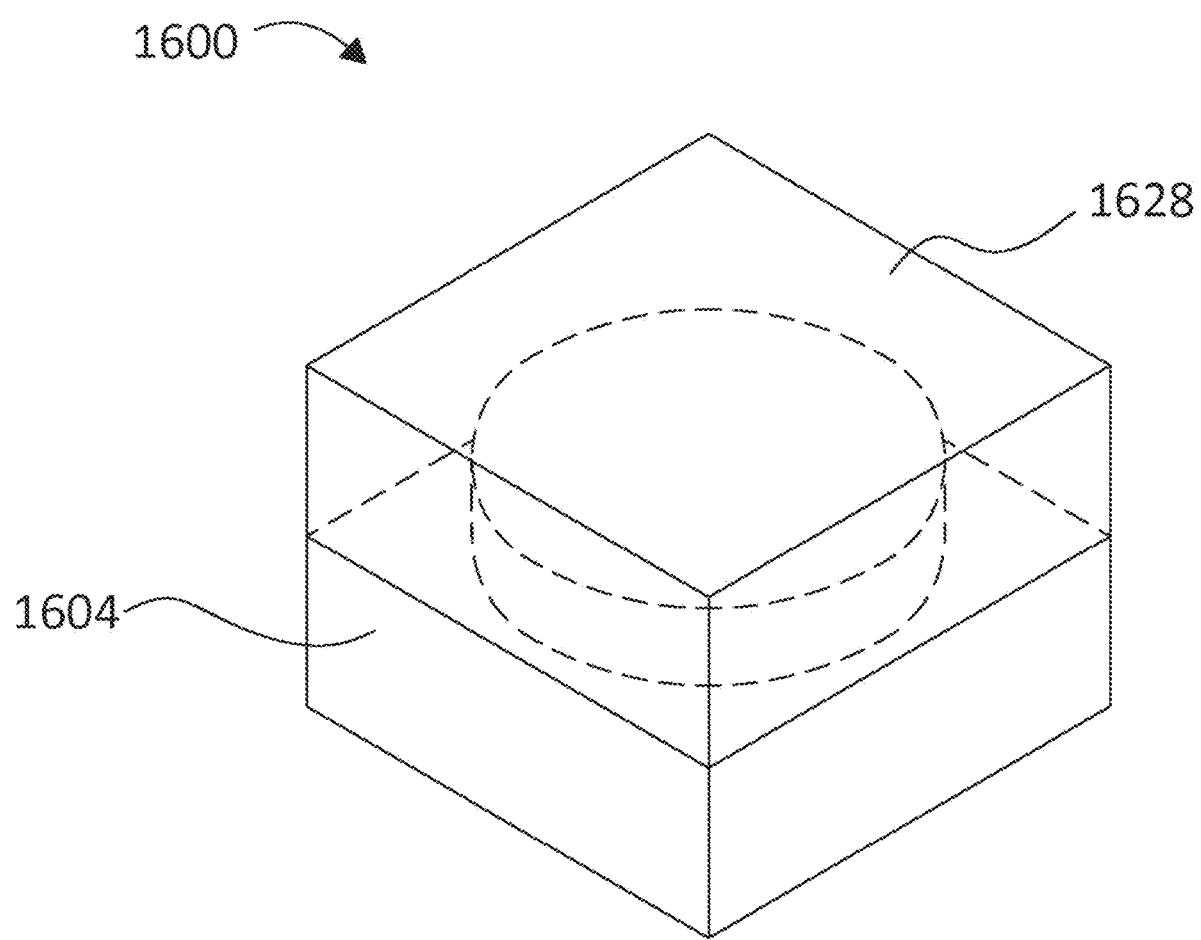

Referring now to FIG. 16C, in an embodiment, graphical computer model 1600 depicts an object 1628 mating with the graphical representation 1604 of the at least a discrete object and detecting the at least a join locus 1620 further comprises identifying a graphical depiction of a surface feature mating with the second object. For instance, and without limitation, graphical computer model may illustrate an object 1628 having a recess mating to a projection of discrete object 1604; graphical computer model so illustrating may be one of a set of models. In the above examples, discrete object is described as having a projection while a second object is described as having a recess to match to the projection, for exemplary purposes, but persons skilled in the art will appreciate that discrete object may have a recess that mates to a projection of second object, or that each of the two objects may have multiple projections and/or recesses in any desired combination.

Referring again to FIG. 15, detecting at least a join locus may include extracting a geometric description of at least a surface feature depicted in the graphical computer model, comparing the geometric description of the at least a surface feature to a geometric description of at least a fastening feature shape description, and determining that the geometric description of the at least a surface feature matches the geometric description of the at least a stored fastening feature shape description. At least a fastening shape, as used herein is at least a shape matching a locus or element at which a fastening method, which may be any joining method, is commonly or has previously been applied. For instance, and without limitation, a through-hole and/or threaded hole may represent a fastening shape; as a result, a face containing one or more such holes may be identified as likely to join to another face, and thus as a CTQ form. As a further example, a projecting tab or strip may indicate a likely spot weld, seam weld, or rivet location, indicating that an adjacent face may be joined to a face of another part, and thus may be a CTQ shape. At least a fastening feature may itself be a CTQ shape; in an embodiment, each of at least a fastening feature and a nearby face may be identified as a CTQ feature by automated manufacturing system 200 and/or automated manufacturing device 224. Automated manufacturing system 200 and/or automated manufacturing device 224 may use any suitable method or process for identifying faces as practiced, without limitation, in CAD programs, CAM programs, or the like, such as detection of max area normal as identifying a face. Detection of CTQ feature may further include detection of particular patterns, such as threading, associated with CTQ features.

Still viewing FIG. 15, automated manufacturing system 200 and/or automated manufacturing device 224 may utilize user feedback in identifying CTQ features; for instance, automated manufacturing system 200 and/or automated manufacturing device 224 may detect a plurality of CTQ features. Plurality of CTQ features may be presented to a user via a user interface, for instance by highlighting candidate CTQ features in a user interface used with a modeling program such as a CAD or CAM program, by presenting the plurality of candidate CTQ features in a joint-recommendation interface as described below, or the like. Persons skilled in the art, upon reviewing the entirety of this disclosure, will be aware of various ways in which candidate CTQ features may be graphically indicated to a user. Automated manufacturing system 200 and/or automated manufacturing device 224 may receive a user selection of a CTQ feature via user interface; user may indicate selected feature according to any suitable means or method, including without limitation by selection of the graphical element using a locator, mouse, touchscreen, or the like. In an embodiment, automated manufacturing system 200 and/or automated manufacturing device 224 may retain user-selected feature as CTQ feature and discard other candidates. User may select a single feature or a plurality of features. Automated manufacturing system 200 and/or automated manufacturing device 224 my alternatively or additionally provide indication to user of restrictions on manufacturing methods based on detection of CTQ features; for instance, a warning may be display to user that it is necessary to machine a given feature, which may add to cost and/or complexity of manufacture; a cost-conscious user may modify graphical computer model as a result, to substitute a feature that does not require machining.

At step 1510, and still viewing FIG. 15, automated manufacturing system 200 and/or automated manufacturing device 224 automatedly generates a graphical representation of the at least a reference feature on a graphical model of the precursor to the discrete object as a function of the at least a critical-to-quality feature; this may be implemented as described above in reference to FIGS. 1-13. In an embodiment, and without limitation, automated manufacturing system 200 and/or automated manufacturing device 224 may determine an orientation for discrete object based on identified CTQ feature; determination of orientation may be performed as described above in reference to FIGS. 1-13. For instance, and without limitation, an optimal, necessary, or efficient direction from which to machine at least a CTQ feature may be determined, and graphical representation of at least a reference feature may be generated to place precursor in that orientation when located using at least a reference feature at subtractive device; multiple orientations may be determined, and multiple reference features corresponding to the multiple orientations may be generated, as described above in reference to FIGS. 1-13.

Continuing to view FIG. 15, at step 1515, automated manufacturing system 200 and/or automated manufacturing device 224 manufactures at least a reference feature on the at least a precursor as a function of the graphical representation of the at least a reference feature; this may be implemented as described above in reference to FIGS. 1-13. Automated manufacturing system 200 and/or automated manufacturing device 224 may manufacture at least a reference feature additively; this may be performed as described above in reference to FIGS. 1-13. Automated manufacturing system 200 and/or automated manufacturing device 224 may manufacture at least a reference feature subtractively; this may be performed as described above in reference to FIGS. 1-13. For instance, and without limitation, subtractive process may be used to manufacture at least a reference feature from a precursor to at least a reference feature as described above in reference to FIG. 9. Automated manufacturing system 200 and/or automated manufacturing device 224 may manufacture at least a reference feature and at least a precursor together; for instance, automated manufacturing system may manufacture at least a reference feature and at least a precursor together in a single additive manufacturing process, a single subtractive manufacturing process, or using any other suitable process such as molding. Automated manufacturing system 200 and/or automated manufacturing device 224 may, for instance, create a mold using any suitable process and then manufacture one or more instances of at least a precursor combined with at least a reference feature using mold.

Referring again to FIG. 14, at step 1410, body of material is located at subtractive manufacturing device using the at least a reference feature; this may be implemented according to any method or method step, in any combination, as described above in reference to FIGS. 1-13. At step 1415 the discrete object is formed from the body of material by subtractive manufacturing; this may be performed according to any method or method step, in any combination, as described above in reference to FIGS. 1-13. Forming includes forming the at least a critical-to-quality feature. At step 1420, discrete object is removed from the subtractive manufacturing device. Removal of discrete objected may be performed according to any method or method steps in any combination as described above in reference to FIGS. 1-13. Method 1400 may include any additional steps of pre- or post-processing of discrete object, at least a precursor, at least a reference feature, or the like, as described above in reference to FIGS. 1-13. Method 1400 may include any step for moving discrete object from one location to another, from one device to another, or the like, using any method steps or means as described above in reference to FIGS. 1-13.

Furthermore, automated detection of CTQ features may enable automated manufacturing system to design and/or implement each stage of manufacturing process, requiring robotic or human involvement only for approval and/or setup. In addition, and as previously noted above in reference to FIGS. 1-13, reference features may remove skill and measurement requirements from setup for subtractive manufacturing steps, permitting persons with minimal training and/or automated machinery to perform the setup. As a result, a superior part may be made with reduced consumption of materials and/or energy, more rapidly, and/or with lesser costs in manpower, training, or the like. Automated detection of CTQ parts may therefore substantially improve modeling programs such as CAD, CAM, and/or related or supporting software, toolpath generation and/or slicer programs that automatedly design manufacturing processes, and the manufacturing processes themselves. A tangible result of this improvement may be a discrete object having optimal structural advantages afforded by processes such as additive manufacture, while having CTQ features enabled by subtractive manufacture, which in turn may be used as a component in, or exemplar of, a safer, more effective, or more durable end-product. Such a product may, for instance, be an aircraft, spacecraft, or component thereof, where gains in strength-to-weight ratio and ability to form complex geometries may be critical, but joint integrity and exact tolerances are equally indispensable.

Figure 17:
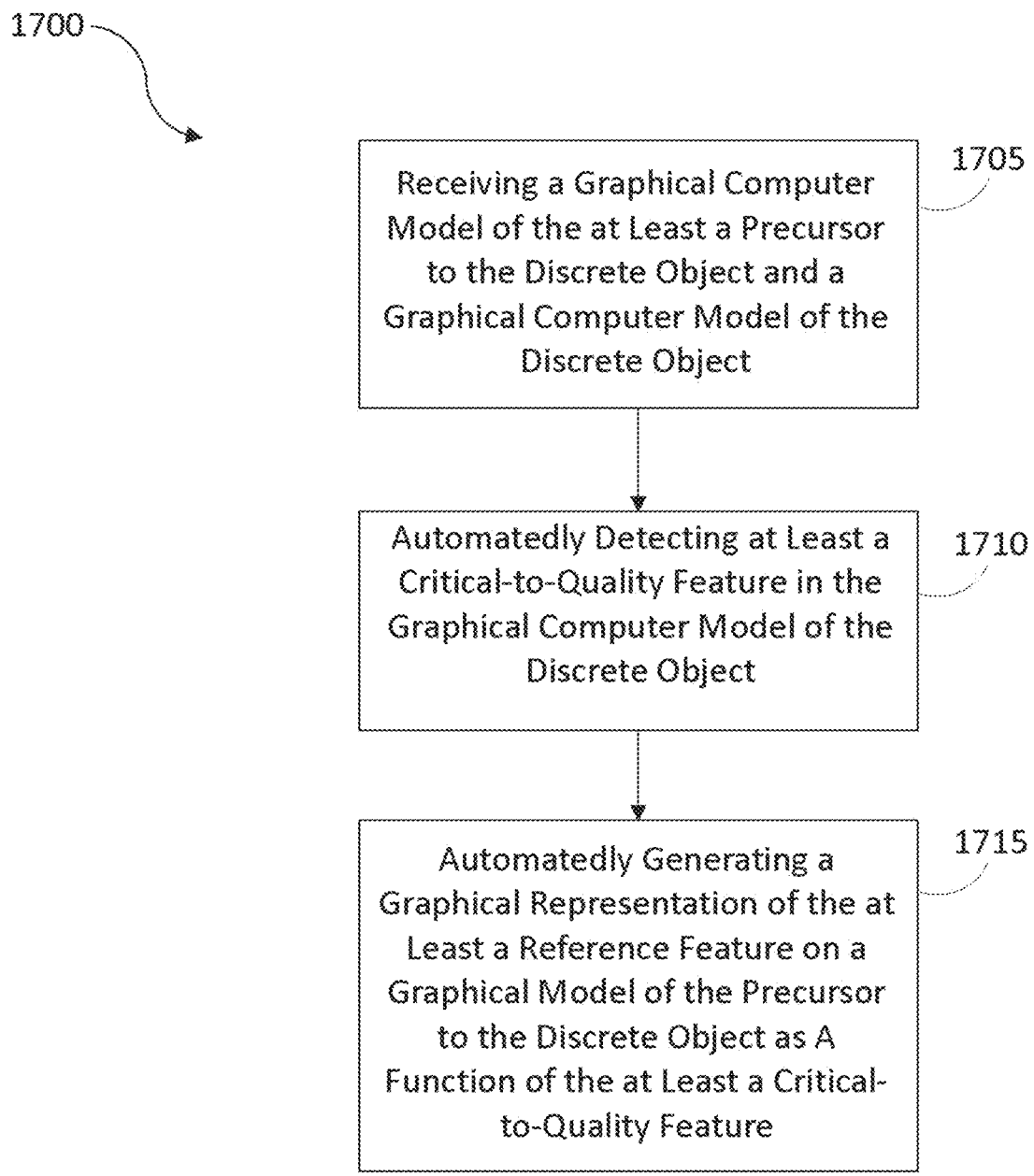
FIG. 17 is a flow diagram illustrating an exemplary embodiment of a method of manufacturing a discrete object from a body of material including a precursor to a discrete object and at least a reference feature.

Referring now to FIG. 17, an exemplary embodiment of a method 1700 of manufacturing a discrete object from a body of material including a precursor to a discrete object and at least a reference feature is described. At step 1705, an automated manufacturing system 200 and/or automated manufacturing device 224 receives a graphical computer model of at least a precursor to a discrete object, and a graphical computer model of the discrete object; this may be performed according to any method or method step as described above in reference to FIGS. 14-16C. Automated manufacturing system 200 and/or automated manufacturing device 224 may include any automated manufacturing system 200 and/or automated manufacturing device 224 as described above in reference to FIG. 2; automated manufacturing system 200 and/or automated manufacturing device 224 may include any combination of elements, including without limitation automated manufacturing devices, as described above in reference to FIG. 2. At step 1710, automated manufacturing system 200 and/or automated manufacturing device 224 detects at least a critical-to-quality feature in the graphical computer model of the discrete object; this may be implemented according to any method or method steps as described above in reference to FIGS. 14-16C. For instance, and without limitation, detecting the at least a critical-to-quality feature may include extracting a geometric description of at least a surface feature depicted in the graphical computer model, comparing the geometric description of the at least a surface feature to a geometric description of at least a stored critical-to-quality shape description, and determining that the geometric description of the at least a surface feature matches the geometric description of the at least a stored critical-to-quality shape description, as described in further detail above in reference to FIGS. 1-16C. Detecting the at least a critical-to-quality feature may include detecting at least a join locus, as described in further detail above in reference to FIGS. 1-16C. Detecting the at least a join locus may include extracting a first geometric description of at least a surface feature depicted in the graphical computer model, comparing the geometric description of the at least a surface feature to a geometric description of at least a second surface feature of a graphical representation of an object, and determining that the first geometric feature and second geometric feature are complementary forms, as described in further detail above in reference to FIGS. 1-16C. Where the graphical computer model depicts an object mating with the graphical representation of the at least a precursor part, detecting the at least a join locus may include identifying a graphical depiction of a surface feature mating with the second object as described in further detail above in reference to FIGS. 1-16C. Detecting the at least a join locus may include extracting a geometric description of at least a surface feature depicted in the graphical computer model, comparing the geometric description of the at least a surface feature to a geometric description of at least a fastening feature shape description, and determining that the geometric description of the at least a surface feature matches the geometric description of the at least a stored fastening feature shape description, as described in further detail above in reference to FIGS. 1-16C. Where the at least a critical-to-quality feature includes a plurality of critical-to-quality features, automated manufacturing system 200 and/or automated manufacturing device 224 may present the plurality of critical-to-quality features to a user via a user interface and receiving, via the user interface, a user selection of a critical-to-quality feature, as described in further detail above in reference to FIGS. 1-16C.

At step 1715, automated manufacturing system 200 and/or automated manufacturing device 224 automatedly generates a graphical representation of the at least a reference feature on a graphical model of the precursor to the discrete object as a function of the at least a critical-to-quality feature; this may be implemented according to any method or method steps as described above in reference to FIGS. 1-16C. Method 1700 may include any additional manufacturing, processing, or other step described above in reference to FIGS. 1-16C, including without limitation generation of machine-control instructions, generation of automated manufacturing control instructions, initiation of manufacture, and/or manufacturing steps. Automated manufacturing device 224 may perform any additional step described in any method presented herein, including without limitation manufacturing the at least a reference feature on the at least a precursor, as a function of the graphical representation of the at least a reference feature. As a further example, automated manufacturing device 224 may manufacture the discrete object as described above in reference to FIGS. 1-16C.

Figure 18:
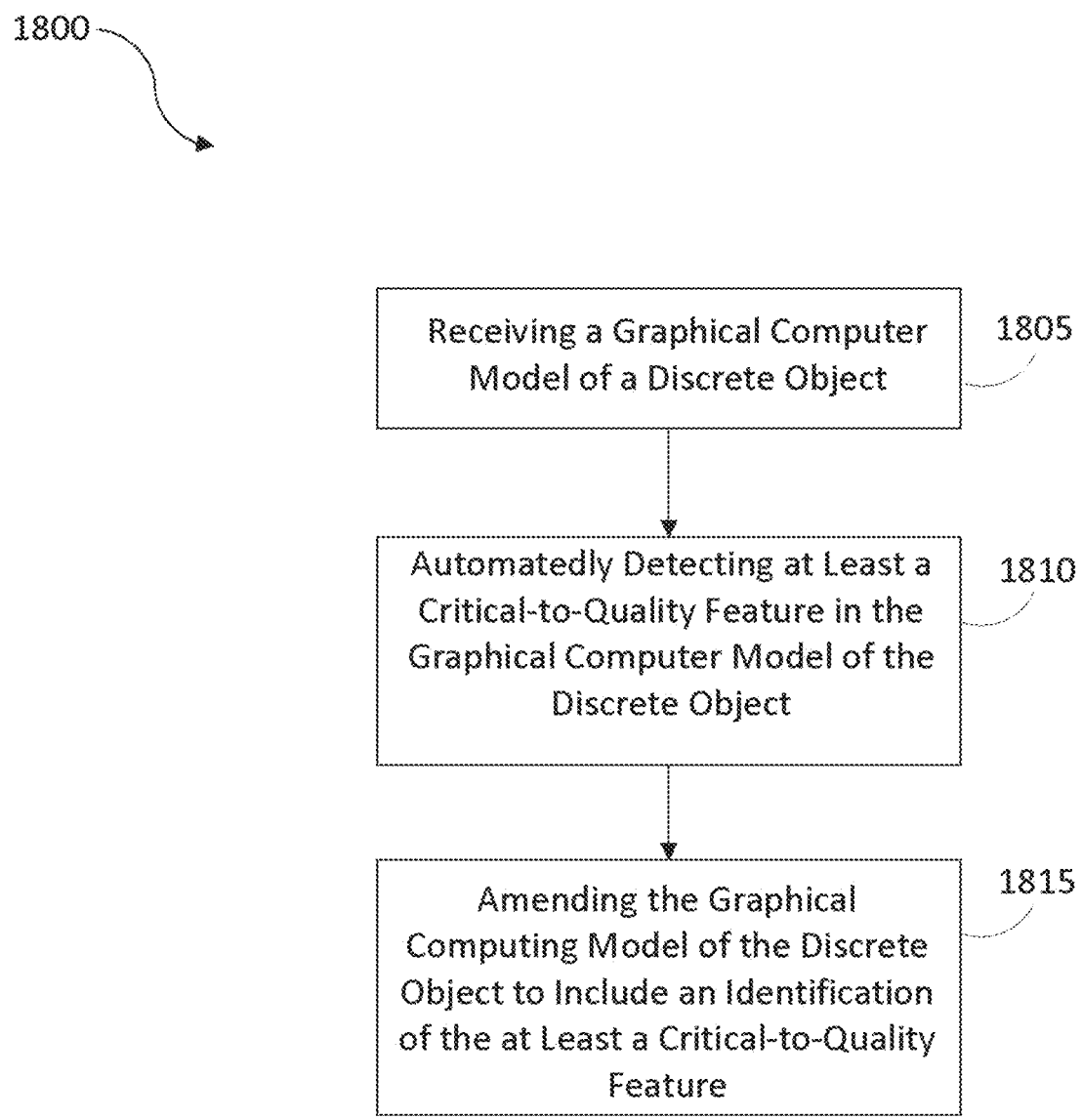
FIG. 18 is a flow diagram illustrating an exemplary embodiment of a method of manufacturing a discrete object from a body of material including a precursor to a discrete object.

Referring now to FIG. 18, an exemplary embodiment of a method 1800 of manufacturing a discrete object from a body of material including a precursor to a discrete object and at least a reference feature is illustrated. At step 1805, an automated manufacturing system 200 and/or automated manufacturing device 224 receives a graphical computer model of a discrete object; this may be implemented according to any method or method steps in any combination as described in above in reference to FIGS. 1-17. At step 1810, automated manufacturing system 200 and/or automated manufacturing device 224 automatedly detects at least a critical-to-quality feature in the graphical computer model of the discrete object; this may be implemented according to any method or method steps in any combination as described in above in reference to FIGS. 1-17. For instance, and without limitation, detecting the at least a critical-to-quality feature may include extracting a geometric description of at least a surface feature depicted in the graphical computer model, comparing the geometric description of the at least a surface feature to a geometric description of at least a stored critical-to-quality shape description, and determining that the geometric description of the at least a surface feature matches the geometric description of the at least a stored critical-to-quality shape description, as described in further detail above in reference to FIGS. 1-17. Detecting the at least a critical-to-quality feature may include detecting at least a join locus, as described in further detail above in reference to FIGS. 1-17. Detecting the at least a join locus may include extracting a first geometric description of at least a surface feature depicted in the graphical computer model, comparing the geometric description of the at least a surface feature to a geometric description of at least a second surface feature of a graphical representation of an object, and determining that the first geometric feature and second geometric feature are complementary forms, as described in further detail above in reference to FIGS. 1-17. Where the graphical computer model depicts an object mating with the graphical representation of the at least a precursor part, detecting the at least a join locus may include identifying a graphical depiction of a surface feature mating with the second object as described in further detail above in reference to FIGS. 1-17. Detecting the at least a join locus may include extracting a geometric description of at least a surface feature depicted in the graphical computer model, comparing the geometric description of the at least a surface feature to a geometric description of at least a fastening feature shape description, and determining that the geometric description of the at least a surface feature matches the geometric description of the at least a stored fastening feature shape description, as described in further detail above in reference to FIGS. 1-17. Where the at least a critical-to-quality feature includes a plurality of critical-to-quality features, automated manufacturing system 200 and/or automated manufacturing device 224 may present the plurality of critical-to-quality features to a user via a user interface and receiving, via the user interface, a user selection of a critical-to-quality feature, as described in further detail above in reference to FIGS. 1-17.

At step 1815, automated manufacturing system 200 and/or automated manufacturing device 224 amends the graphical computing model of the discrete object to include an identification of the at least a critical-to-quality feature; this may be implemented according to any method or method steps in any combination as described in above in reference to FIGS. 1-17. Automated manufacturing device 224 may perform any additional step described in any method presented herein, including without limitation manufacturing the at least a reference feature on the at least a precursor, as a function of the graphical representation of the at least a reference feature. As a further example, automated manufacturing device 224 may manufacture the discrete object as described above in reference to FIGS. 1-17.

Figure 19:
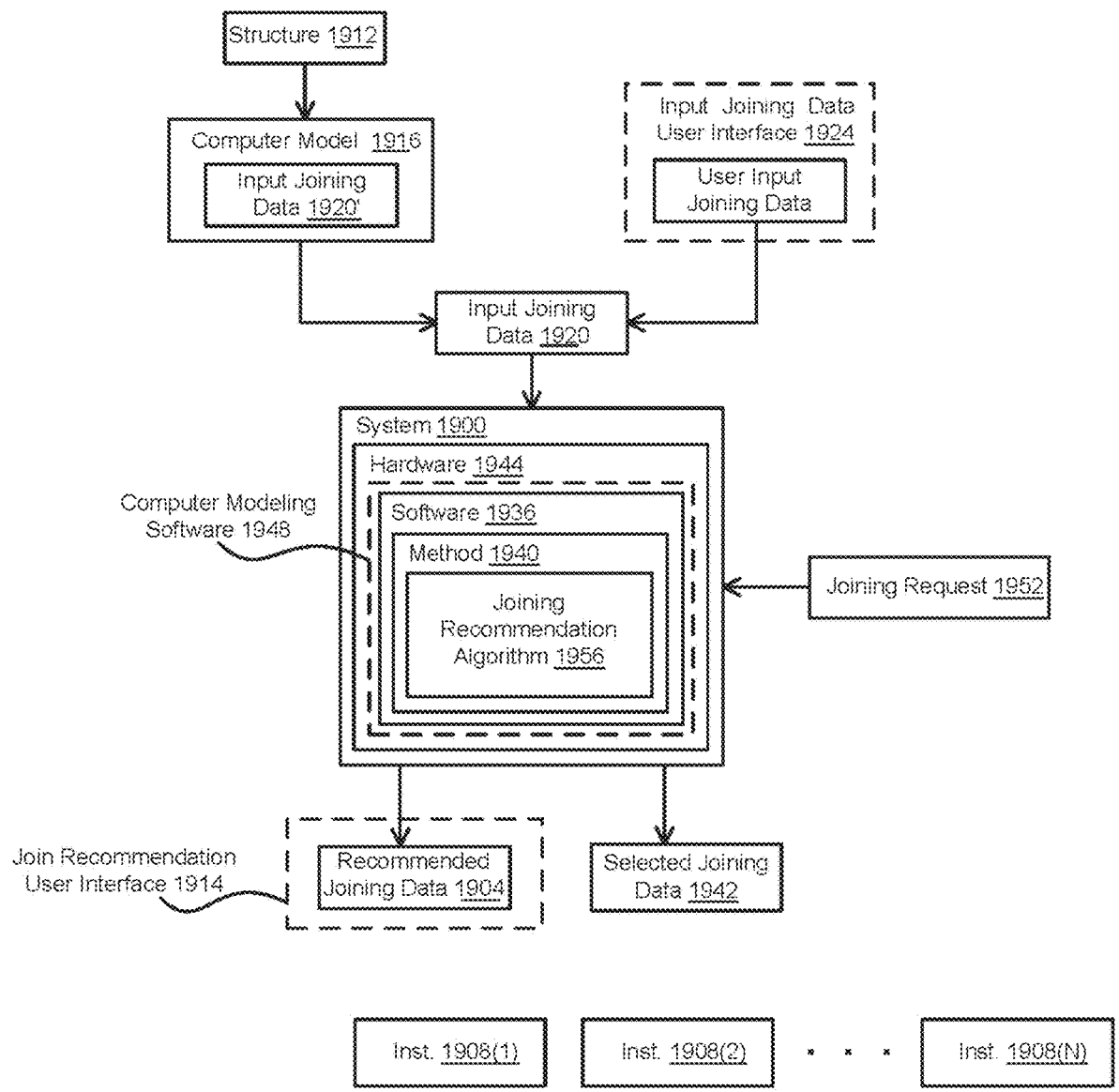
FIG. 19 is a high-level block diagram of a joining data determining and selecting system made in accordance with the present disclosure.

Referring now to FIG. 19, certain aspects and embodiments of a join-recommending system that may be incorporated in or combined with automated manufacturing system 200 and/or automated manufacturing device 224 are illustrated. Join-recommending system includes software tools and techniques for automatically recommending and presenting joining data and methods for joining in one or more instantiations of a structure that is represented in a computer model through the use of a join-recommendation user interface. Using various ones of these tools and techniques, precise joining features and other joining data extracted from the computer model can be used along with joining parameters, as well as input joining data from an input-joining-data user interface, to create highly precise and highly repeatable joining recommendations to be presented to a user. Other aspects of the present invention include software tools and techniques for allowing a user to optionally share or send the presented recommendations to another. Still other aspects of the present invention include software tools and techniques to optionally allow a user to select a joining method from the presented recommendations through a join-recommendation user interface which may be associated with the computer model in any of various ways (e.g. through the use of a feature tree or by visually displaying the selected joining data on the computer model). These and other aspects of the present invention will become readily apparent upon reviewing this entire disclosure. Before proceeding with describing numerous aspects of the present invention in detail, a number of definitions of certain terms used throughout this disclosure are first presented. These terms shall have the following meanings throughout unless noted otherwise. Like terms, such as differing parts of speech, differing tenses, singulars, plurals, etc., for the same term (e.g., fabricating, fabricate, fabrication, fabrications, fabricated) shall have commensurate meanings.

Structure: A "structure" can be any physical thing that can be made by or under the control of a human and/or under the control of one or more machines, including without limitation any discrete object as described above in reference to FIGS. 1-18. For example, a "structure" can be made by hand, using one or more tools, using one or more pieces of machinery, or any combination thereof. Examples of structures include, but are not limited to objects, parts, assemblies of components, buildings, vehicles, machines, semiconductor devices, computing devices, and electronic equipment, among many others.

Fabricate: To "fabricate" a structure is perform a step or collection of steps needed to physically instantiate the structure. In this context, fabrication includes, but is not limited to steps of cutting, machining, milling, turning, making connections, molding, in particular injection molded parts, casting, stamping, forming, bending, etching, drilling, etc. Synonyms that fall within the meaning of "fabricate" herein include, but are not limited to manufacture, erect, assemble, mold, and form, among many others. Fabrication may include any manufacturing process or combination of manufacturing processes as described above in reference to FIGS. 1-18.

Computer model: A "computer model" is a virtual, for example, digital, model of a physical structure as created using appropriate computer-modeling software, such as SolidWorks (available from Dassault Systemes SolidWorks Corp, Waltham, Mass.), AutoCAD (available from Autodesk, Inc., San Rafael, Calif.), and MicroStation (available from Bentley Systems, Inc., Exton, Pa.), among many others. A "computer model" can be of any type, such as a wireframe or solid model, among others, or any combination thereof, and can be saved in a computer file using any suitable file protocol, such as .SLDPRT, .SLDASM, .STP, .IGS, a .DWG, .DXF, .DGN, etc. A "computer model" includes information about the geometry and/or other properties of the modeled structure. A computer model may include, without limitation, a graphical computer model as described above in reference to FIGS. 1-18.

Joining: A "joining" is a means that attaches portions of a structure or structures together in such a way as to ensure that the overall structure is structurally sound (e.g., strong enough to resist and withstand the force loads expected of it). A joining can be made by hand, using one or more tools, using one or more pieces of machinery, or any combination thereof. Joining can be fully automated (e.g., robotic) or involve varying degrees of human input. Examples of joinings include, but are not limited to seam welds, stitch welds, spot welds, rivets, nails, screws, nuts and bolts, adhesives, fuses, among many others. Fundamentally, there is no limitation on what "joining" can mean other than that it attaches portions of a structure or structures to one another.

Input joining data: "Input joining data" are input data to a system of the present disclosure that may be extracted from a computer model and that influence the recommended joining data of the structure(s) represented by the computer model. It is noted that input joining data may be either "extracted" or "non-extracted." The process of extracting joining data from a computer model is more one of scraping than extraction, because the input joining data is not removed from the computer model (which would destroy its integrity) but rather scraped, i.e., copied from the computer model and processed as needed for use in the system. "Non-extracted input joining data" can be input or received in any suitable manner, such as via a input-joining-data user interface or a non-computer-model electronic document, such as a form-Tillable portable document format (PDF) document, or a non-computer-model data file, among others. Examples of "input joining data" include, but are not limited to, geometry (such as size, shape, dimensions, areas, configurations, numbers of components and other features, such as openings, recesses, bosses, etc.), type(s) of material (in computer models wherein materials can be specified), connection type(s) and features (in computer models wherein such information can be specified, finish type(s) (in computer models wherein finishes can be specified), among others. Fundamentally, there is no limitation on the data that can constitute "input joining data," other than that they influence the recommended joining data of the structure(s) and, therefore, selected joining data. Input joining data may be received from a user, for instance via a user interface as described in further detail below. Input joining data may alternatively or additionally be extracted or derived from any computer model using interrogation as described above in reference to FIGS. 1-18.

Recommended joining data: "Recommended joining data" are output data from a system of the present disclosure that are determined by a joining recommendation algorithm based on at least a portion of a computer model of at least a portion of a structure. Recommended joining data may be presented to the user via a join-recommendation user interface. For example, recommended joining data may include a specific type of joining, one or more joining characteristics for a joining, quantitative parameter values for a joining, or qualitative parameter values for a joining.

Joining characteristic: A "joining characteristic" includes any quantitative and/or qualitative data that conveys manufacturing specific knowledge about joining to a user. For example, a joining characteristic may be a minimum material thickness, a maximum material thickness, compatibility information for material types, strength of a joint, a cosmetic descriptor of a join, joining time per edge length segment, heat distortion factors per edge length measurement, tolerance adjustments per edge length segment, or a cost to be incurred by the user for the join, among others. Fundamentally, there is no limitation on the data that can constitute "joining characteristic," other than that data conveys manufacturing specific knowledge about joining. One or more elements of joining characteristic data may be stored in a database. For instance, and without limitation, a database of joining methods may contain records describing joining characteristics, including without limitation mathematical or geometric descriptions or joining locations at which each joining method may be used, materials with which a given joining method may be used, and the like; any method or system described herein may include or be configured to perform the action of querying a database using input joining data, such as the geometry, materials, and/or other characteristics of a joining location and/or structure or structures to be joined, and receiving records containing joining characteristics of one or more joining methods that may match the query data. One or more joining characteristics may further be compared to rules for joining two or more structures; such rules may include, without limitation, calculation of a minimum and/or optimal joining strength given two designed structures. As a non-limiting example, structures may have dimensions and material description, from which a mass of each structure may be derived; this may be compared to inertial or weight-based strains of a given set of masses to be joined on a the joining method in question, and a determination may be made that a given joining method is or is not sufficiently strong to join represented structures. Similar rules may govern strains on joins due to torque, likely strains due to uses or simulated uses to which structure is put using user-input data and/or data in computer model; for instance, and without limitation, where a represented structure or set of structures to be joined is used in an engine, a rule pertaining to use in an engine may impose a higher degree of shear resistance as a requirement for a joining method, eliminating weaker joining methods.

Figure 20:
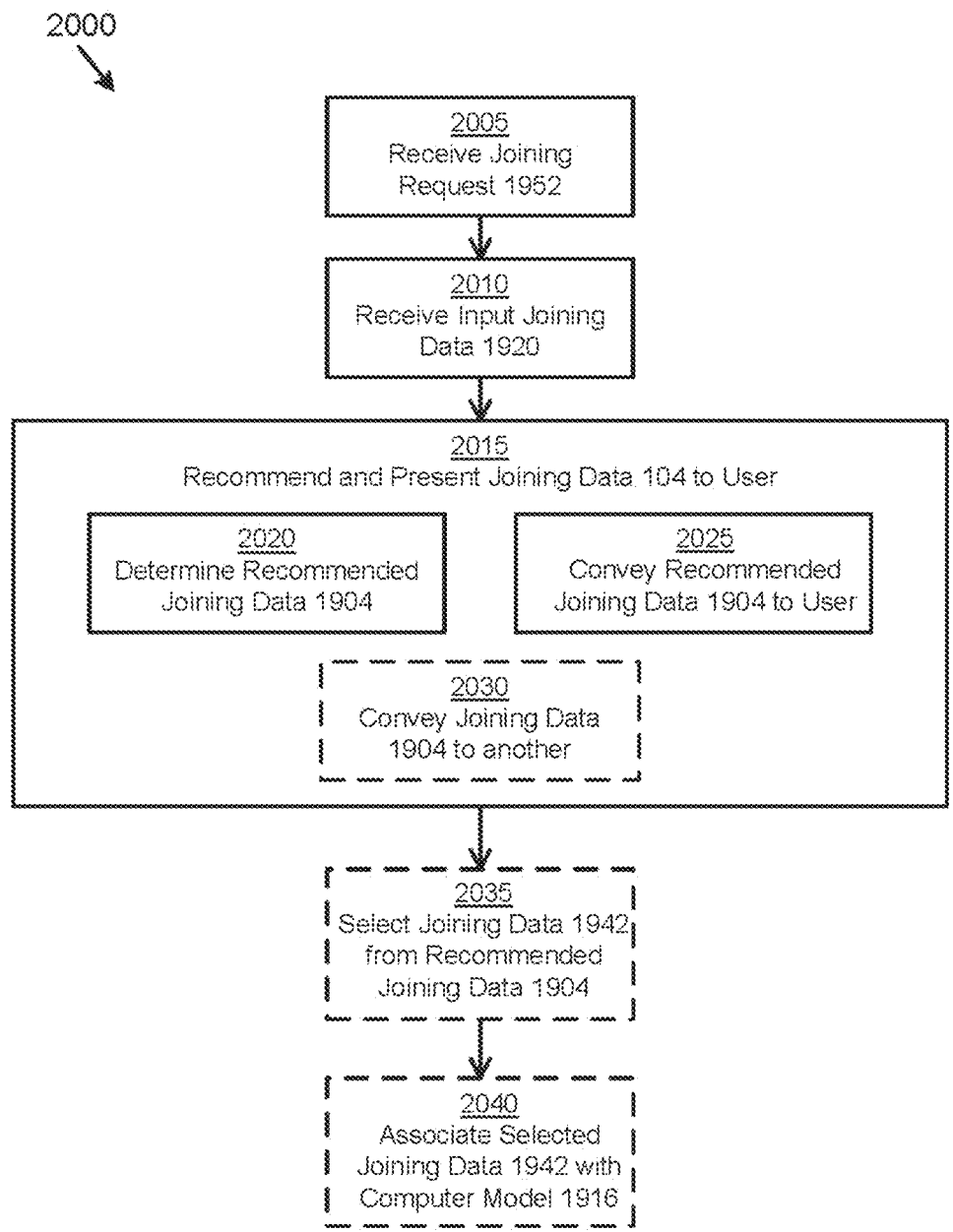
FIG. 20 is a flow diagram illustrating a method of determining and conveying joining data to a user and allowing the user to select joining data based on the presented method(s) that can be implemented by the joining data determining and selecting system of FIG. 1, according to an embodiment.

With the foregoing terms and meanings in mind, reference is now made to FIG. 19, which illustrates a join-recommending system 1900 that assists a user (not shown) by presenting recommended joining data 1904 for creating one or more instantiations 1908(1) to 1908(N) by joining portions of structure(s) 1912 with one another via a join-recommendation user interface 114. Said structure(s) 1912 are represented by computer model 1916. As described below in more detail, join-recommending system 1900 determines recommended joining data 1904 based on input joining data 1920 (e.g., input joining data 1920' associated with a computer model 1916 and/or input joining data not obtained from the computer model, such as input joining data input by a user via an input-j joining-data user interface 1924 which includes user-input joining data, as part of the recommendation process). As will become readily apparent from reading this entire disclosure, join-recommending system 1900 includes software 1936 for performing a method 1940 of determining and conveying recommended joining data 1904 and, optionally, allowing a user to determine selected joining data 142 to associate with the structure 1912. FIG. 20 illustrates a joining data recommendation, presentation, and association method 2000 that is suitable for use as method 1940 of FIG. 19. Method 2000 is described below in detail. However, before describing method 2000 and with continuing reference to FIG. 19, join-recommending system 1900 also includes suitable hardware 1944 for executing software 1936. In this context, hardware 1944 includes all of the corresponding requisite functionality of the physical devices themselves. As those skilled in the art will readily appreciate from reading this entire disclosure, method 1940 can be implemented in any suitable computer-based environment, such as in a network of computing devices or in a single computing device. Thus, hardware 1944 can include a broad range of computing devices.

Examples of hardware 1944 that can be used to implement the various steps of method 1940 include, but are not limited to, web servers, desktop computers, laptop computers, tablet computers, smartphones, and Internet appliances, wearable computer (such as a GOOGLE GLASS™ computing device), among others, including without limitation hardware and/or computing devices as described in further detail below in reference to FIG. 28. A network of two or more such devices can include any one or more types of networks, including, but not limited to, a global communications network (such as the Internet), a wide-area network, a local-area network, and a telecommunications network, among others. In this connection, those skilled in the art will also recognize the myriad of ways that the steps of method 1940 can be implemented across a network. For example, if any steps of method 1940 are implemented on one or more web-servers, they may be performed by suitable software residing on, provided by, and/or executed by such server(s). Such software can include a software application, a software module (such as a plugin to another software application, such as a computer modeling application, web browser, etc.), and/or a software code segment. In many cases, the same or similar software, or any portion thereof, can be implemented on a desktop computer, a laptop computer, and a tablet computer. As another example, various steps of method 1940 can be performed by one or more mobile apps running, on, for example, a smartphone or tablet computer, and provided the ability to communicate with one or more other computing devices running software that performs one or more other steps of the method.

In a particular embodiment, all steps of method 1940 can be performed by a single computing device, such as a desktop computer or a webserver accessible via a browser, running an integrated software application that performs all steps of method 1940 and that may also include computer-modeling functionality as well, such as a computer-modeling software application 1948. In another embodiment, some steps of method 1940 can be performed on a first computing device, whereas other steps of the method are performed on a second computing device located remotely from the first computing device across a network. Those skilled in the art will understand how to implement any variation reasonably conceivable using only known programming techniques and this disclosure as a guide. Consequently, it is not necessary to describe every potential variation for skilled artisans to practice the present invention to the fullest scope accorded by the appended claims. Regardless of the type of hardware 1944 used to implement software 1936 made in accordance with the present invention, the hardware works in combination with and under the control of such software to form join-recommending system 1900, which provides functionality described herein.

Referring now to FIG. 20, and also to FIG. 1 for context and noting that 1900-series element numerals correspond to FIG. 1 and 2000-series numerals correspond to FIG. 20, at step 2005 of method 2000 a joining request 1952 may be received by software 1936 from a user. As noted above, request 1952 is for recommended joining data 1904 for joining one or more instantiations 1908(1) to 1908(N) of a structure 1912 represented by a computer model 1916. Software 1936 can receive request 1952 in any suitable manner, such as via a user interface (not shown) presented to a user on a computing device accessible to the user. In this example, software 1936 may present a user-selectable soft control (not shown), such as a soft button or checkbox, that a user can select to make the request. As those skilled in the art will readily appreciate, the selection of the soft control can be effected in any suitable manner, such as by clicking on or otherwise selecting the control using a pointing device (e.g., a mouse) or by touching a touchscreen at the appropriate location to make the selection. The manner of selection will depend on the particular hardware 1944 and configuration of software 1936 being used on the user's computing device. As alluded to above, the user interface containing the user-selectable control can be provided application-specific software running on the user's device or a web-browser or other remote-access means that allows the user to access joining software functionality remotely from the user's device. As another example, request 1952 may be a more passive request, such as the user opening an application (not shown) of software 1936 that provide a user interface for joining recommendation and/or selection tasks; once the user opens the application, software 1936 may initiate various ones of its joining recommendation and/or selection functionalities. As yet a further example, request 1952 may be non-user initiated, such as join-recommending system 1900 detecting a candidate joining location in structure 1912 represented by computer model 1916.

Still viewing FIG. 20, joining request may alternatively or additionally be generated automatedly by join-recommending system 1900. For instance, and without limitation, join-recommending system may identify a join location; this may be implemented, without limitation, as described above in reference to FIGS. 1-18. Join-recommending system 1900 may generate a join request automatedly upon detection of join location; automatedly generated join request, or a plurality thereof corresponding, for instance, to a plurality of automatedly detected join locations, may be presented to a user via any user interface as described in this disclosure. User may enter an indication that an automatedly generated join request is desired. Alternatively or additionally, further steps of method 2000 may be performed, such as selection of recommended joining methods, automatedly prior to presentation to user; thus, for instance, system 1900 may, upon receipt of computer model, generate recommended joining methods for one or more automatedly detected joining locations, and present each set of recommended joining methods to a user for each automatedly detected joining location, allowing user to select or reject any joining method and/or join at any such joining location.

At step 2010, in conjunction with the user making joining request 1952, software 1936 receives input joining data 1920. As described above, input joining data 1920 can be any data that a joining recommendation algorithm 1956 of software 1936 needs for determining recommended joining data 1904. Those skilled in the art will understand that input joining data 1920' can be determined in a variety of ways. In one example embodiment, joining data 1920' may be inputted manually by the user through any of a variety of means (e.g. a text entry dialogue box or prompt, a drop-down selection menu and/or a bulleted or button selection, among others). In another exemplary embodiment, joining data 1920' may be extracted from computer model 1916 automatically in any of a variety of ways. For example, if data-extraction code is built into computer-modeling software, such as computer-modeling software application 1948, the data-extraction code may be preprogramed to recognize input joining data 1920' within computer model 1916 and utilize the internal protocols of that application to gather the that data. As another example, if the data-extraction code is implemented as an external plugin module to computer-modeling software, the code might utilize the application's plugin module protocols. As yet another example, if the data-extraction code is executed externally from the computer-modeling application but not as a plugin, the external code may utilize an application programming interface of the application. Regardless of how software 1936 and the data-extraction code are configured, those skilled in the art will readily understand how to design the code. Recognition of input joining data may be performed using any interrogation method as described above in reference to FIGS. 1-18. In an embodiment, input joining data may additionally be generated by querying one or more database entries linking geometry of joining locations to input joining data previously used at locations having matching geometry; matching geometry may be detected according to any means or methods described above in reference to FIGS. 1-18. In an embodiment, each time any method or method step as described herein is performed and a user and/or process selects a joining method and/or associates input joining data with one or more elements of geometry represented in a computer model, system 1900 and/or automated manufacturing system 200 and/or automated manufacturing device 224 may generate a data record linking the selected joining method and/or input joining data to the one or more elements of geometry, and/or may enter such linked information in a database listing rules for selection of input joining data based on geometries or other characteristics obtained by interrogating a computer file. Such relationships and/or rules may additionally or alternatively be entered by a user directly, for instance and without limitation according to any means or method for entry of input joining data or other data as described in this disclosure, including without limitation via an input-joining-data user interface as described in further detail below.

Alternatively, input joining data 1920 may comprise input joining data, which can be received in any of a variety of ways, depending on how software 1936 is configured in a particular instantiation. For example, software 1936 may be configured to allow a user to input joining data via the input-joining-data user interface 1924 that includes one or more data-input features of one or more differing types, such as, but not necessarily limited to, keyed-input fields, drop-down menus, radio-control selectors, hyperlinks, and other selectors, among others. Those skilled in the art will readily appreciate that the type(s) and number of data-input features can depend on the robustness of computer model 1916 relative to input joining data 1920' that it contains and the variety of options available from a particular fabricator. Regarding the former, as noted above, if a version of computer model 1916 includes input joining data 1920' such as material type(s), then the input-joining-data user interface 1924 does not necessarily need a data-input feature directed to the material type(s), since that information will be extracted from the computer model. However, for a version of computer model 1916 that does not allow the user to specify materials within the computer modeling software 1948, therefore prohibiting the extraction of such data, the input-joining-data user interface 1924 would need one or more data-input features to allow the user to input the appropriate material(s) needed for recommending joining method(s). Of course, material type is but one example of a joining-data type that can be of either an extracted type or a non-extracted type, and other joining data that can be of either type can be handled similarly.

The input-joining-data user interface 1924 of the present disclosure can be implemented in any of a number of ways. For example, if the input-joining-data software code is implemented within computer-modeling software, such as computer-modeling software application 1948, then the user interface (not shown) may be presented as a graphical user interface of the software application. Similarly, if the input-joining-data software code is executed in a plug-in-type external module, then the user interface may be presented in the same manner. It is noted that such computer-modeling software can be of the type that presents its graphical user interface via an on-screen window under the control of the operating system of the computer on which the application is implemented. However, in other embodiments, the graphical user interface can be presented in another way (via a web-browser, for example) when the computer-modeling software application 1948 includes the input-joining-data software code and is implemented over the World-Wide Web, perhaps in a software-as-a-service implementation, among others, or when the input-joining-data software code is implemented separately from the computer-modeling software application. Regardless of how the input-joining-data software code is implemented for receiving joining data, skilled artisans will be able to create the appropriate software code.

At step 2015, software 1936 determines and presents recommended joining data 1904 to a user via a join-recommendation user interface 114. Depending on the configuration of software 1936 and where the various software components of the joining recommendation portion of the software are physically executed, step 2015 will typically include several substeps. For example, at substep 2020, joining recommendation algorithm 1956 may determine recommended joining data 1904 by, for example, utilizing input joining data 1920. The precise joining recommendation algorithm 1956 used in a particular embodiment will be highly dependent on, for example, the type(s) of structure(s) 1912 handled by software 1936, as well as the particularities of the fabricator(s) needed to fabricate the instantiation(s). Algorithm 1956 may, in one embodiment, function in the form of a decision tree. This decision tree structure may function through a series of branching decisions, the outcomes of which may be determined by the available input joining data 1920. Branching decisions may alternatively or additionally be determined by stored rules and/or relationships as described above. For instance, a given element or set of elements of input joining data may be assembled into a query, which may be used to recover one or more matching data records from a database listing rules relating input joining data to recommended joining methods and/or to joining methods selected in the past. As a further example, input joining data may be entered in a query that cross-links to one or more database entries describing rules for recommending joining methods given input joining data and/or joining location geometry, as described above; such rules may be created by entry of joining methods selected or generated in previous iterations of any method and/or method steps as described herein, and/or may be entered previously by a user, as a non-limiting example. This algorithm results in recommended joining data 1904 being presented to the user. Joining recommendation algorithm 1956 makes these recommendations by analyzing the geometry of the selected features and/or the surrounding features and comparing this geometrical data to known parameters and limitations for various joining methods and techniques. Thus, as a non-limiting example, joining recommendation algorithm 1956 may retrieve joining methods that are recorded as functioning and/or potentially functioning with geometry at a given joining location. Joining recommendation algorithm 1956 may further compare joining methods matching geometry at a given join location with one or more engineering goals of join, such as a desired shear or tensile strength, a desired degree of durability or flexibility, materials to be used to manufacture structure, a desired cost, or the like; engineering goals may be entered by a user, for instance as described in further detail below in reference to FIG. 21 using inputs to set user priorities, or may be automatically derived. Automated derivation of engineering goals may include, as a non-limiting example, querying past selected joins for similar geometry of joining location and/or structure and retrieving recorded engineering goals and/or characteristics of such joins. Thus, for instance, a particular form of a join location may have used in past iterations for a join having high tensile strength; system 1900 may retrieve a database record relating join location geometries to engineering goals, determine that high tensile strength is an engineering goal for the instant join location, and select joining methods having high tensile strengths for recommendation and/or eliminate joining methods having low tensile strength. Persons skilled in the art, upon reviewing the entirety of this disclosure, will be aware of various engineering goals that may be associated with joining location geometry and/or structure geometry as consistent with this disclosure; any or all such goals and/or relationships to geometry may be used to select recommended joining methods as described herein.

Step 2015 may also include a substep 2025 at which software 1936 conveys recommended joining data 1904 to the user. These recommendations may be presented to the user in any one or more of a variety of ways. For example, recommended joining data 1904 can be displayed on a display screen (not shown) of the user's computer, conveyed in an email, and/or provided in some other type of message, including regular mail, an instant message, a text message, etc. and/or as an attachment thereto, among others. Illustrative embodiments of this display screen will further be shown in FIG. 21 and FIG. 4. Fundamentally, there are no limitations on how recommended joining data can be conveyed to a user.

Step 2015 may further include an optional substep 2030 at which software 1936 conveys recommended joining data 1904 to an entity other than the user. For example, software 1936 may transmit recommended joining data to others wishing to collaborate on the design of structure 1912 (e.g., user's manager, design project team members, etc.). As another example, software 1936 may transmit recommended joining data 1904 and input joining data 1920 to one or more fabricator(s) for purposes of data collection. As yet another example, software 1936 may transmit recommended joining data and input joining data 1920 to a social media system (not shown). Fundamentally, there are no limitations on how recommended joining data can be conveyed to other entities.

At optional step 2035, the user determines the selected joining data 142 to associate with the computer model 1916 of the structure 1912 from the recommended joining data 1904 presented via a join-recommendation user interface 114. For example, selected joining data 142 can be chosen from a display screen (not shown) of the user's computer, conveyed in an email, and/or provided in some other type of message. Step 2035 may involve an iterative process in which the user is provided additional information about recommended joining data 1904 before determining the selected joining data 142. Step 2035 may involve the user specifying additional input information (e.g., parameter values) required for the selected joining data 142 to be associated with the computer model 1916 via the input-joining-data user interface 1924.

At optional step 2040, in response to receiving the selected joining data 142, software 1936 associates the selected joining data 142 with the computer model 1916 of the structure 1912. For example, software 1936 may append information about the selected joining data 142 to the computer model 1916, create a data link between information about the selected joining data 142 and the computer model 1916, and/or display a visual representation of the selected joining data 142 with a visual representation of the computer model 1916.

It is particularly emphasized that the order of performance of the foregoing steps of method 2000 need not be as shown. Rather, they may be implemented in any logical order that results in determining and conveying recommended joining data.

Exemplary Embodiments for Conveying Recommended Joining Data

Figure 21:
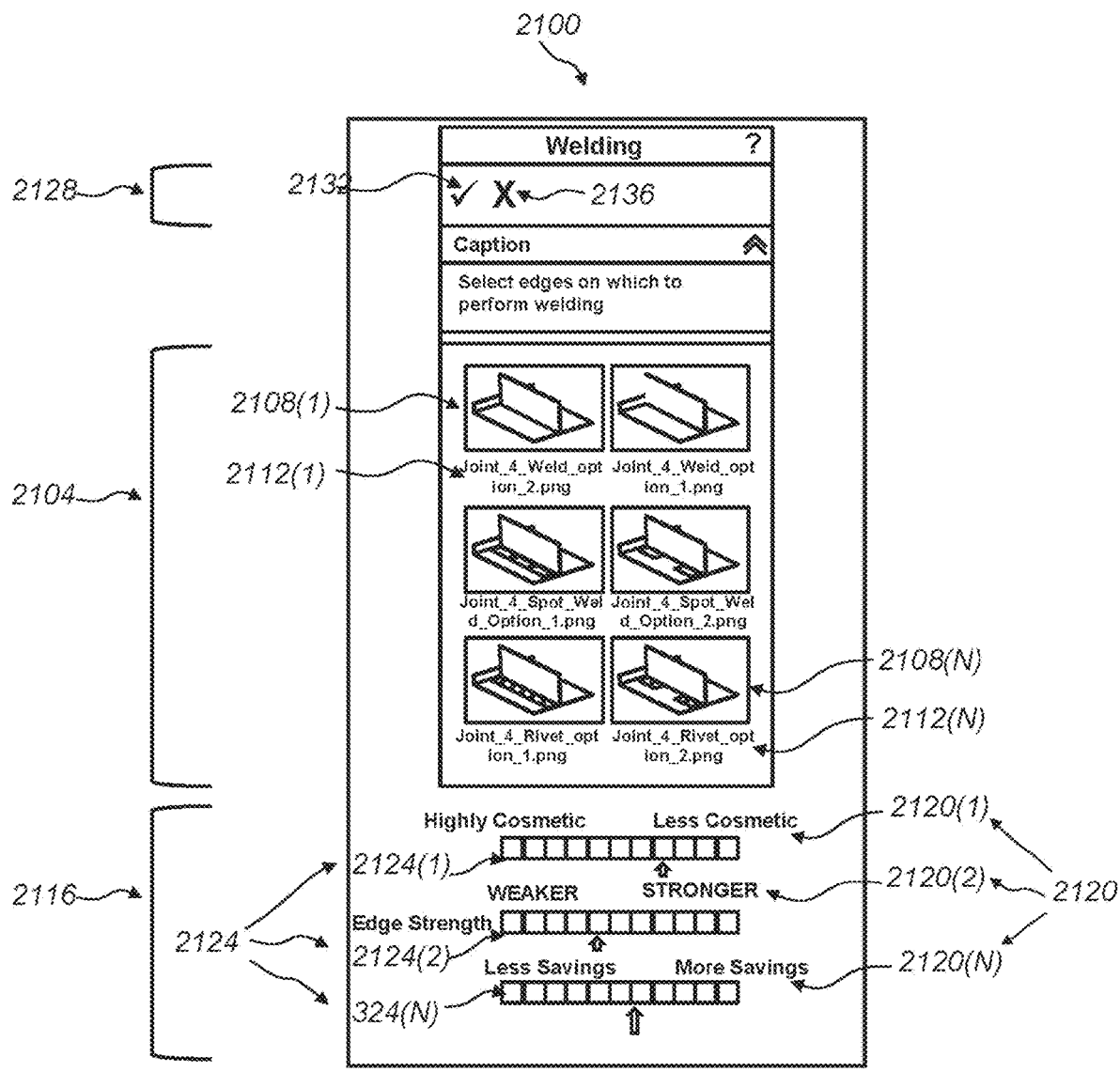
FIG. 21 is an example embodiment of a screenshot of a display window of a particular instantiation of the joining data determining and selecting system of FIG. 1, after joining data to recommend has been determined.

FIG. 21 illustrates an exemplary screen display window 2104 for conveying recommended joining data. Window 2104 may be implemented in system 1932 and/or displayed at step 2025 of method 2000 as a means to present recommended joining data 1904. Window 2104 includes a panel 2104 that conveys one or more recommended joining methods 2108(1) to 2108(N) based on recommended joining data 1904, which are determined by joining recommendation algorithm 1956. For example, each recommended joining method 2108(1) to 2108(N) may include a textual and/or a graphical depiction of the joining method, which empowers the user with manufacturing knowledge and guidance (i.e. visually depicted lists of all possible/recommended joining types presents the user with options they may not have known existed or may have otherwise overlooked or undervalued, such as being shown that in a given example, a rivet joining may be far stronger than a seam weld, correcting the user's previous impressions of poor riveting strength, thereby teaching them) previously unavailable while working with computer models of structures.

In this example, optional window 2104 further includes a panel 2116 that conveys one or more joining characteristics 2120 for ones of the recommended joining methods 2108(1) to 2108(N). For illustrative purposes, panel 2116 includes information about the cosmetic appearance, strength, and cost of ones of the recommended joining methods 2108(1) to 2108(N). In one embodiment, each joining characteristic 2120 includes a control 2124 for conveying quantitative and/or qualitative information regarding the characteristic 2120 which further empowers the user with the ability to compare manufacturing knowledge across recommended joining methods. Any control 2124 may be pre-set according to automatedly generated characteristics or rules, for instance by recourse to stored rules or past join method selections as described above; user may therefore be presented with an automatedly determined optimal joining method, while having an option to change one or more desired characteristics according to current desires or needs.

The one or more recommended welding methods 2108(1) to 2108(N) and/or other joining methods may be selectable by the user. When the user selects a recommended joining method 2108(N) displayed in panel 2104, information for one or more joining characteristics 2120(1) to 2120(N) associated with the selection is displayed in panel 2116. This feature enables users to quickly toggle between the one or more recommended welding methods 2108(1) to 2108(N) and compare the one or more joining characteristics 2120(1) to 2120(N).

Window 2104 further includes a panel 2128 that enables the user to signal software 1936 regarding recommended joining data 1904 and/or recommended joining method(s) 2108 that may or may not be associated with the model. Panel 2128 includes a confirmation button 2132 that enables the user to signal software 1936 that ones of the recommended joining methods 2108(1) to 2108(N) are to be associated with the model. For example, upon selection of the confirmation button 2132, software 1936 may execute step 2040 of FIG. 20, at which the system may display a window, such as window 2200 of FIG. 4, for use in displaying information for one or more characteristics associated with the selected or recommended joining data 142 to the user. Panel 2128 further includes a cancellation button 2136 that enables the user to signal software 1936 that ones of the recommended joining methods 2108(1) to 2108(N) are not to be associated with the computer model 1916.

Figure 22:
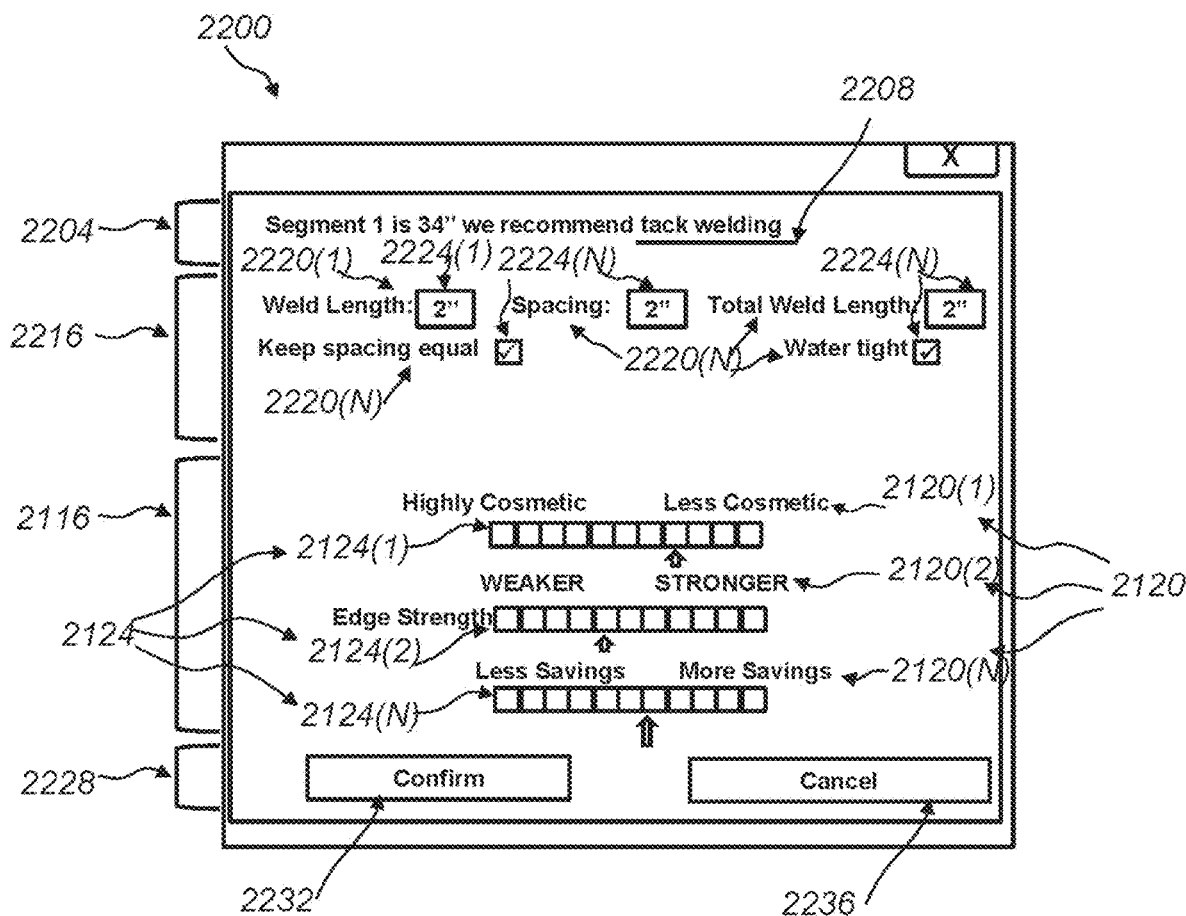
FIG. 22 is an example embodiment of a screenshot of a display window of a particular instantiation of the joining data determining and selecting system of FIG. 1, after joining data to recommend has been determined.

FIG. 22 is an exemplary optional screen display window 2200 of software 1936 (FIG. 1), in which recommended joining data 1904 is graphically conveyed to the user. Window 2200 may be optionally displayed to the user at step 2040 of method 2000 (FIG. 20) after confirming a joining method in window 2104, or as a result of the automatic method of recommendation and presentation. Window 2200 may be displayed in order to give more information to the user about the joining they have been recommended and/or have selected and to continue the recommendation and presentation process, as well as to gather additional information about the joining from the user if it is necessary or desirable. Window 2200 includes a panel 2204 that conveys information regarding the input joining data 1920 that joining recommendation algorithm 1956 used to determine recommended joining data 1904. For example, panel 2204 may convey a geometric calculation of the structure 1912 and recommend a joining method 2208 based on the geometric calculation.

Window 2200 also includes a panel 2216 that includes one or more controls for conveying recommended joining data 1904 determined by joining recommendation algorithm 1956. For example, controls 2220(1) to 2220(N) may convey quantitative and/or qualitative joining parameter values 2224(1) to 2224(N) associated with the joining method 2208. Controls 2220(1) to 2220(N) may enable the user to modify one or more of the recommended joining parameter values 2224(1) to 2224(N).

Window 2200 further includes panel 2116 FIG. 21) which will serve the function of displaying information for one or more characteristics 2120(1) to 2120(N) (FIG. 3) associated with the selected joining data 142. This panel displays this information through the use of selection description widgets 2124(1) to 2124(N) (FIG. 21) which will convey quantitative and/or qualitative information regarding characteristics 2120(1) to 2120(N) associated with the selected joining data 142. Note that the quantitative and/or qualitative information displayed in selection description widgets 2124(1) to 2124(N) may automatically update as the user modifies quantitative and/or qualitative joining parameter values 2224(1) to 2224(N), providing an additional level of specificity to the user regarding the selected joining method 142.

Window 2200 also includes a panel 2228 that enables the user to signal software 1936 regarding recommended joining data 1904 that may or may not be associated with the model. Panel 2228 includes a confirmation button 2232 that enables the user to signal software 1936 that the joining method 2208 and quantitative and/or qualitative joining parameter values 2224(1) to 2224(N) are to be associated with the model. For example, upon selection of the confirmation button 2232, software 1936 may execute step 2040 of FIG. 20, making the association between the selected joining data 142 and the computer model 1916. Panel 2228 further includes a cancellation button 2236 that enables the user to signal software 1936 that the joining method 2208 and quantitative and/or qualitative joining parameter values 2224(1) to 2224(N) are not to be associated with the computer model 1916.

Figure 23:
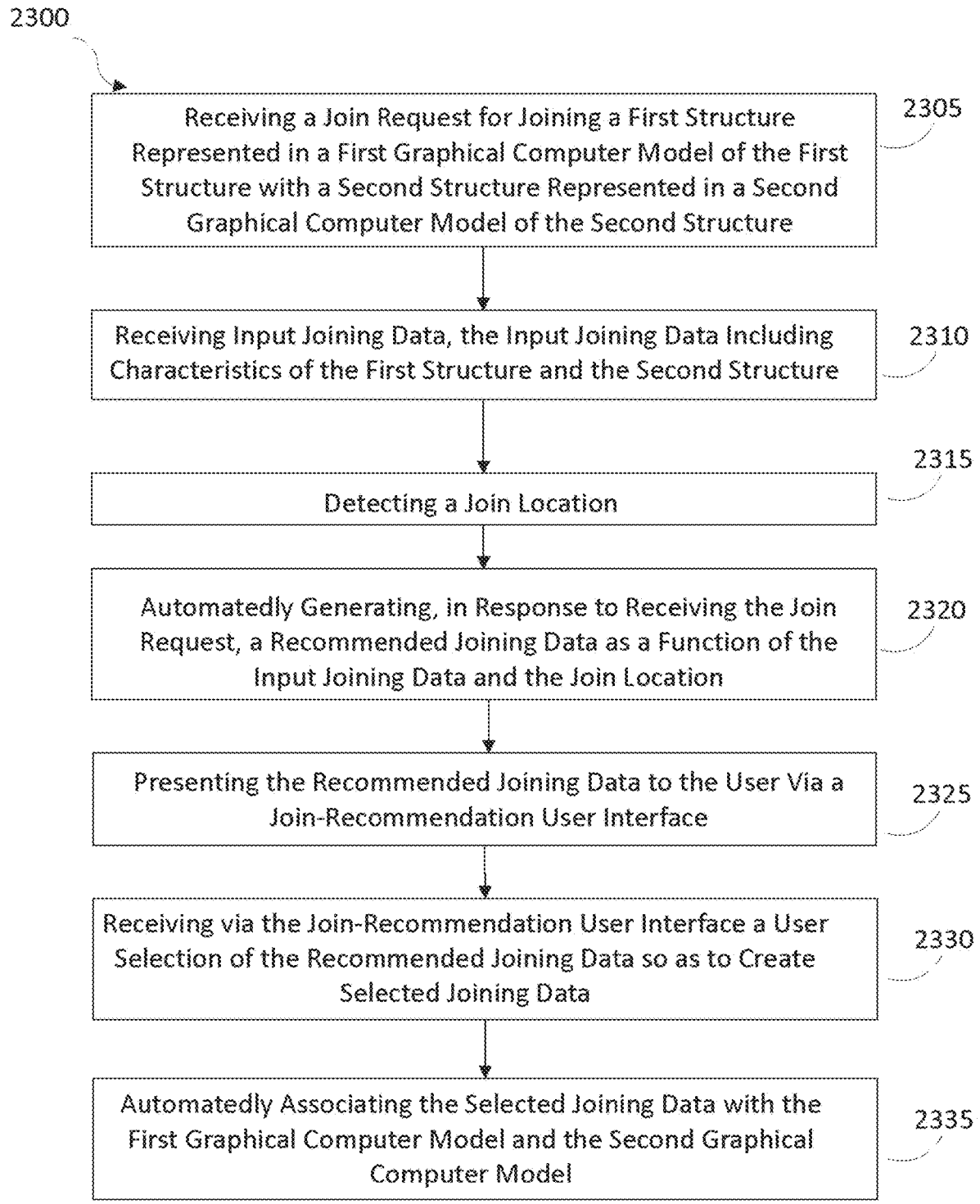
FIG. 23 is a flow diagram illustrating an exemplary embodiment of a method of assisting a user in selecting a join for a structure represented in a computer model.

Referring now to FIG. 23, an exemplary embodiment of a method 2300 of assisting a user in selecting a join for a structure represented in a computer model is illustrated. At step 2305, an automated manufacturing system, automated manufacturing device 224 and/or join-recommending system 1900 receives a join request for joining a first structure represented in a first graphical computer model of the first structure with a second structure represented in a second graphical computer model of the second structure; this may be implemented according to any method or method step as described above in reference to FIGS. 1-22. At step 2310, automated manufacturing system and/or join-recommending system receives input joining data, the input joining data including characteristics of the first structure and the second structure; this may be implemented according to any method and/or method step or steps as described above in reference to FIGS. 1-22. For instance, and without limitation, input joining data may include characteristics of two structures; the characteristics may include material type, geometry, and weld location.

Still referring to FIG. 23, and at step 2315, automated manufacturing system 200, automated manufacturing device 224 and/or join-recommending system 1900 detects a join location; this may be performed according to any method or method steps as described above in reference to FIGS. 1-22. As a non-limiting example, and referring now to FIG. 24, at step 2405, detection of a join location may include detecting at least a first critical-to-quality feature of the first structure in the first graphical computer model; this may be implemented as described above in reference to FIGS. 1-22. At step 2410, detection of a join location may include identifying a join location as a function of the at least a first critical-to-quality feature and the at least a second critical-to-quality feature; this may be implemented as described above in reference to FIGS. 1-22. At optional step 2415, detection of a join location may include detecting at least a second critical-to-quality feature of the second structure in the second graphical computer model; this may be implemented as described above in reference to FIGS. 1-22. At optional step 2420, detection of a join location may include geometrically matching the at least a first critical-to-quality feature to the second critical-to-quality feature; this may be implemented as described above in reference to FIGS. 1-22.

Referring again to FIG. 23, automated manufacturing system 200, automated manufacturing device 224 and/or join-recommending system 1900 automatedly generates, in response to receiving the join request, a recommended joining data as a function of the input joining data and the join location; this may be implemented according to any method or method steps as described above in reference to FIGS. 1-22. For instance, and without limitation, generating may include calculating, based on the input joining data, a joint strength and manufacturing cost for each of at least two joining methods, where joining methods may include without limitation weld types. At step 2325, automated manufacturing system 200, automated manufacturing device 224 and/or join-recommending system 1900 presents recommended joining data to the user via a join-recommendation user interface; this may be implemented as described above in reference to FIGS. 1-22. For instance, and without limitation, presenting may include presenting recommended joining data to the user via a join-recommendation user interface, the interface including a panel for displaying the at least two different weld types and a panel for displaying the calculated joint strength and manufacturing cost for each of at least two different joining methods, including without limitation each of at least two weld types. At step 2330, automated manufacturing system 200, automated manufacturing device 224 and/or join-recommending system 1900 receives via the join-recommendation user interface a user selection of the recommended joining data so as to create selected joining data; this may be implemented for instance as described above in reference to FIGS. 1-22. At step 2335, automated manufacturing system 200, automated manufacturing device 224 and/or join-recommending system 1900 automatedly associating the selected joining data with the first graphical computer model and the second graphical computer model; this may be implemented for instance as described above in reference to FIGS. 1-22.

Figure 25:
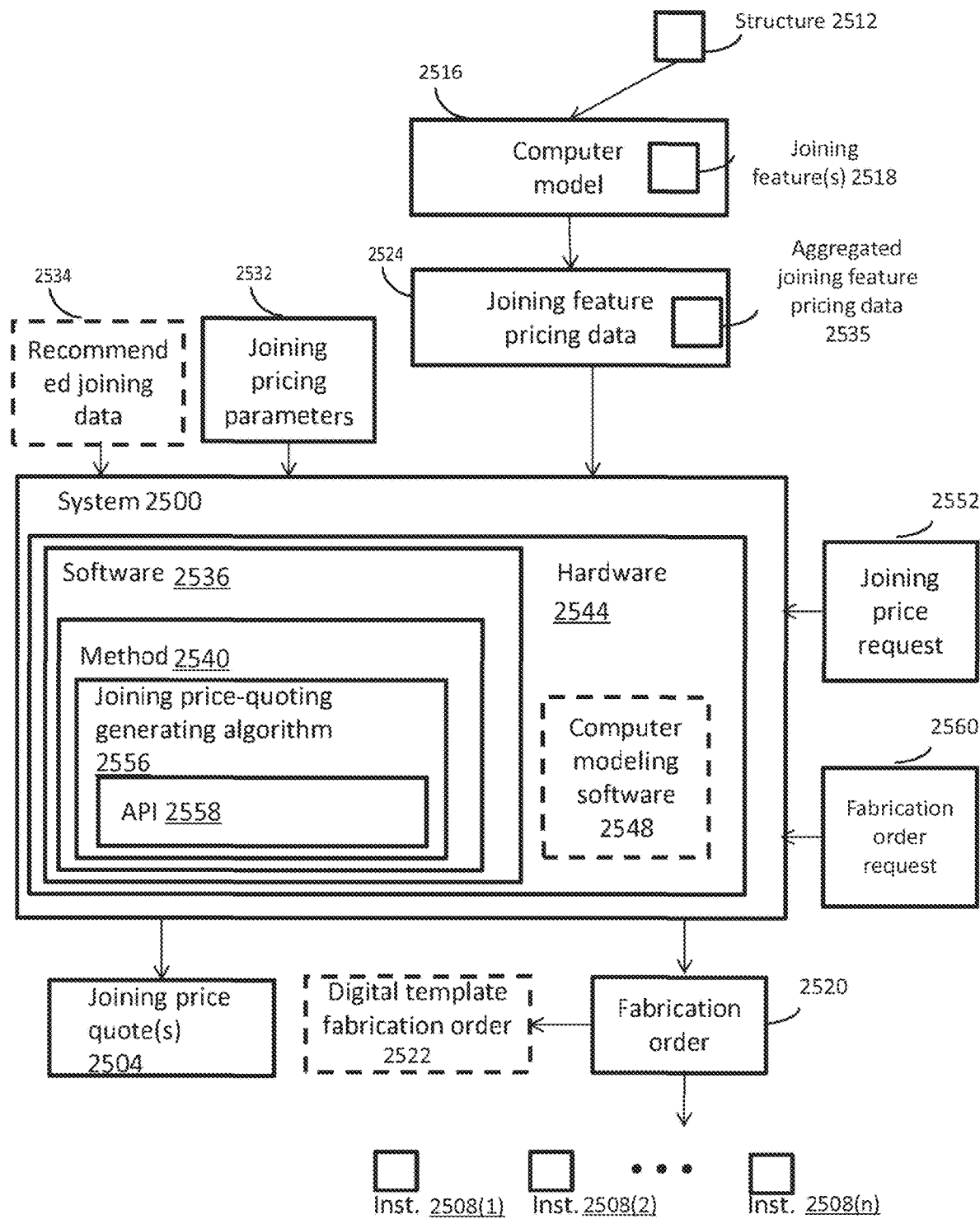
FIG. 25 is a high-level block diagram of a firm fabrication-price-quoting-and-ordering system made in accordance with the present disclosure.
Figure 26:
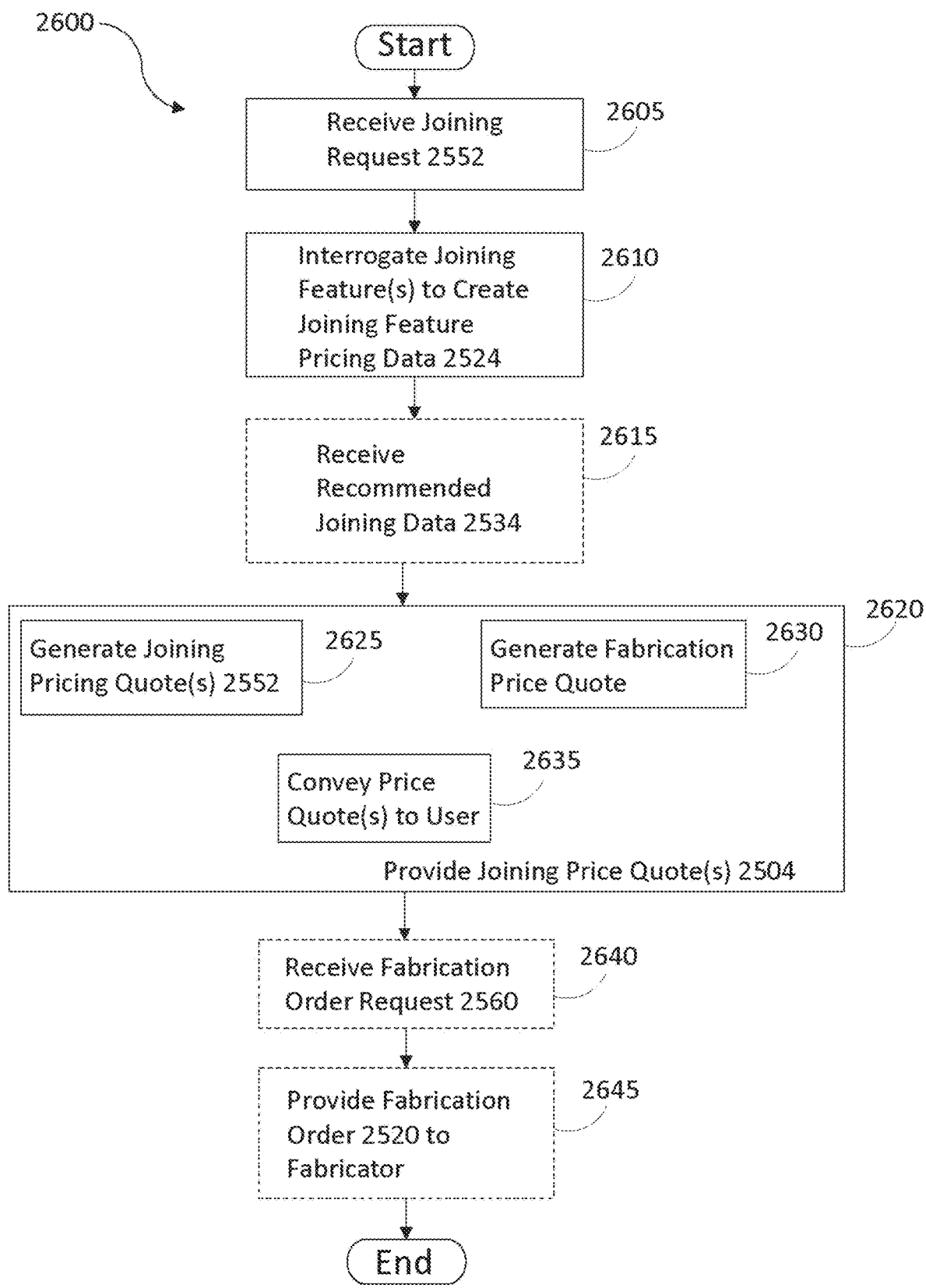
FIG. 26 is a flow diagram illustrating a method of quoting one or more firm fabrication prices to a user and allowing the user to place a fabrication order based on the quoted price(s) that can be implemented by the firm fabrication-price-quoting system of FIG. 1.

Referring now to FIG. 25, certain aspects and embodiments of systems and methods for automatic firm fabrication price quoting and fabrication ordering of computer-modeled joining features and related structures join-recommending system that may be incorporated in or combined with automated manufacturing system 200, automated manufacturing device 224 are illustrated. Aspects of the methods and systems include software tools and techniques for automatically generating one or more price quotations for fabricating one or more instantiations of a structure that is represented in a computer model and contains joining feature(s). Using various ones of these tools and techniques, precise joining features and other pricing data can be used to create highly precise and highly repeatable firm fabrication-price quotes. Other aspects of the present invention include software tools and techniques for allowing a user to place an order for fabricating one or more instantiations of a computer modeled structure, such as in conjunction with the generating of the price quotation. Still other aspects of the present invention include systems for generating such price quotes and permitting such ordering. These and other aspects of the present invention will become readily apparent upon reviewing this entire disclosure. Before proceeding with describing numerous aspects of the present invention in detail, a number of definitions of certain terms used throughout this disclosure, including the appended claims, are first presented. These terms shall have the following meanings throughout unless noted otherwise. Like terms, such as differing parts of speech, differing tenses, singulars, plurals, etc., for the same term (e.g., fabricating, fabricate, fabrication, fabrications, fabricated) shall have commensurate meanings.

Joining feature(s): A "joining feature" is a characteristic or attribute associated with a computer-modeled joining that influences the cost for a fabricator to fabricate the structure. Examples of "joining features" include, but are not limited to, geometry (such as size, shape, dimensions, areas, configurations, numbers of components and other features, such as openings, recesses, bosses, etc.), type(s) of material (in computer models wherein materials can be specified), connection type(s), and finish type(s) (in computer models wherein finishes can be specified), among others.

Joining Feature Pricing Data: "Joining feature pricing data" are input data to a system of the present disclosure that are extracted from a computer model and that influence the cost of joining one or more instantiations of the structure represented by the computer model. Examples of "joining feature pricing data" include, but are not limited to, geometry (such as size, shape, dimensions, areas, configurations, numbers of components and other features, such as openings, recesses, bosses, etc.), type(s) of material (in computer models wherein materials can be specified), connection type(s) and features (in computer models wherein such information can be specified), finish type(s) (in computer models wherein finishes can be specified), among others. Fundamentally, there is no limitation on the data that can constitute "joining feature pricing data," other than that they are present in a computer model and extractable therefrom and that they influence the cost of joining and, therefore, a joining price quote.

Figure 24:
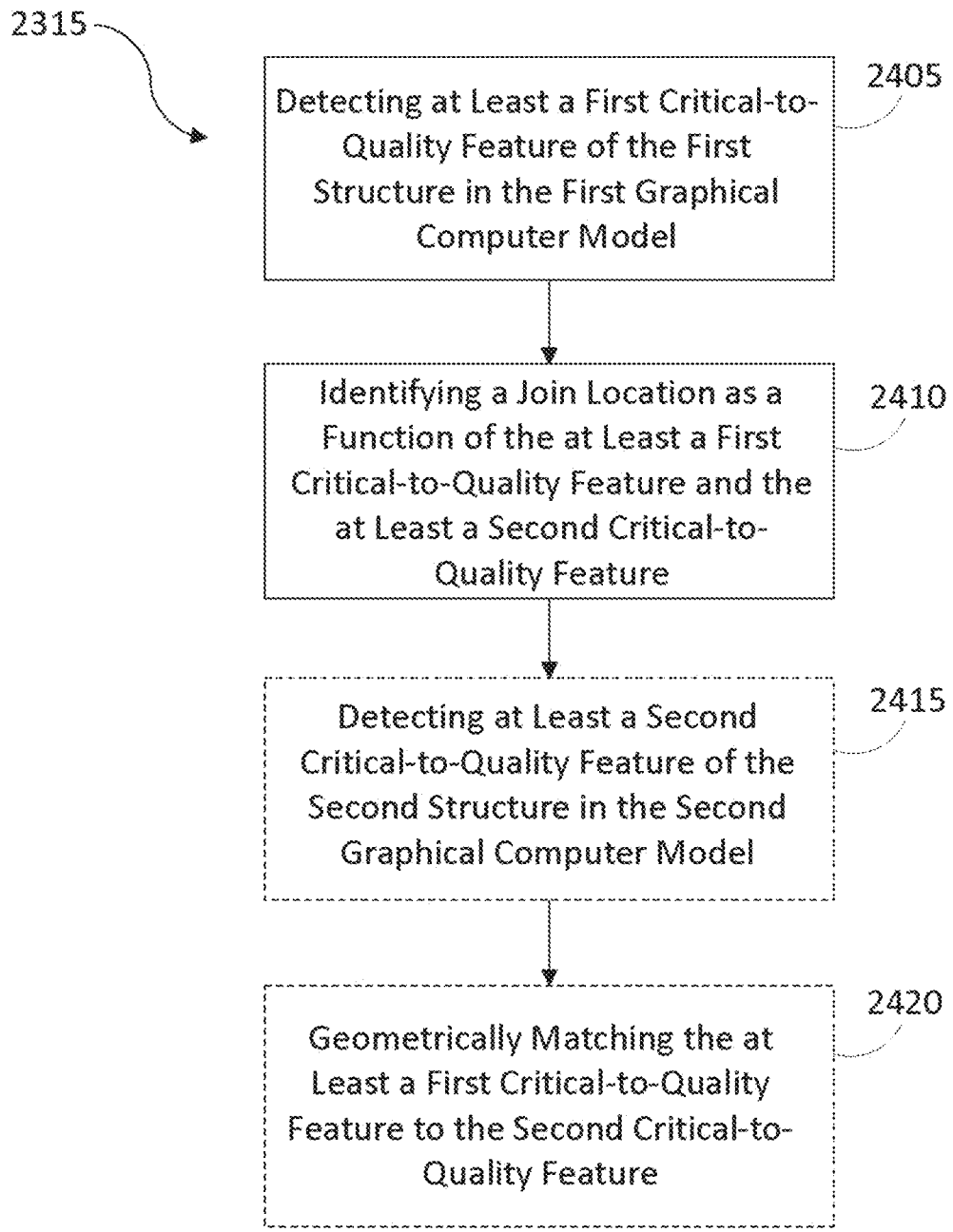
FIG. 24 is a flow diagram illustrating an exemplary embodiment of method steps for identifying a join location.

With the foregoing terms and meanings in mind, reference is now made to FIG. 24, which illustrates a system 2500 for providing one or more joining price quote(s) 2504 for joining one or more instantiations 2508(1) to 2508(N) of a structure 2512 represented by a computer model 2516 containing joining feature(s) 118. As will also be seen, system 2500 may optionally include features for allowing a user (not shown) to place a fabrication order 2520 and/or digital template fabrication order 122, each based on at least joining price quote(s) 2504. As described below in more detail, joining price quote(s) 2504 are based on joining feature pricing data 2524 and joining pricing parameters 2532. In some embodiments, joining price quote(s) 2504 may also be based on recommended joining data 134. In some embodiments, joining feature pricing data 2524 may include aggregate joining feature price data 135. Aggregated joining feature price data 135 may include feature pricing data from one or more manufacturers and be obtained from one or more third party sources (not shown). Aggregated joining feature price data 135 may allow system 2500 to provide one or more joining price quote(s) 2504 from a plurality of manufacturers or businesses such that the user can compare quote(s). As will become readily apparent from reading this entire disclosure, system 2500 includes software 2536 for performing a method 2540 of providing joining price quote(s) 2504; optionally, providing a firm fabrication-price quote (not shown) for fabricating the structure; optionally, allowing a user to place a fabrication order 2520; and optionally, allowing a user to output digital template fabrication order 122. Digital template fabrication order 122 is an optional output file that has all the information that fabrication order 2520 has, but can be inputted to a database, a spreadsheet, or other applicable sub-system (not shown in FIG. 24) for maintaining a repository of aggregate joining feature price data 135 that can optionally be utilized by method 2540. Digital template fabrication order 122 may be, for example, expressed in a comma separated variable format or any other format that can be inputted to a database or spreadsheet.

FIG. 25 illustrates a joining price quotation and ordering method 2600 that is suitable for use as method 2540 of FIG. 24. Method 2600 is described below in detail. However, before describing method 2600 and with continuing reference to FIG. 24, system 2500 also includes suitable hardware 2544 for executing software 2536. In this context, hardware 2544 includes all of the corresponding requisite functionality of the physical devices themselves. As those skilled in the art will readily appreciate from reading this entire disclosure, method 2540 can be implemented in any suitable computer-based environment, such as in a network of computing devices or in a single computing device. Thus, hardware 2544 can include a broad range of computing devices.

Examples of hardware 2544 that can be used to implement the various steps of method 2540 include, but are not limited to, web servers, desktop computers, laptop computers, tablet computers, smartphones, and Internet appliances, among others; such hardware may include or be included in any computing device or system as described below in reference to FIG. 28. A network of two or more of such devices can include any one or more types of networks, including, but not limited to, a global communications network (such as the Internet), a wide-area network, a local-area network, and a telecommunications network, among others. In this connection, those skilled in the art will also recognize the myriad of ways that the steps of method 2540 can be implemented across a network. For example, if any steps of method 2540 are implemented on one or more web-servers, they may be performed by suitable software residing on, provided by, and/or executed by such server(s). Such software can include a software application, a software module (such as a plugin to another software application, such as a computer modeling application, web browser, etc.), and/or a software code segment. In many cases, the same or similar software, or any portion thereof, can be implemented on a desktop computer, a laptop computer, and a tablet computer. As another example, various steps of method 2540 can be performed by one or more mobile apps running, on, for example, a smartphone or tablet computer, and provided the ability to communicate with one or more other computing devices running software that performs one or more other steps of the method.

In a particular embodiment, all steps of method 2540 can be performed by a single computing device, such as a desktop computer or a webserver accessible via a browser, running an integrated software application that performs all steps of method 2540 and that may also include computer-modeling functionality as well, such as a computer-modeling software application 2548. In another embodiment, some steps of method 2540 can be performed on a first computing device, whereas other steps of the method are performed on a second computing device located remotely from the first computing device across a network. Those skilled in the art will understand how to implement any variation reasonably conceivable using only known programming techniques and this disclosure as a guide. Consequently, it is not necessary to describe every potential variation for skilled artisans to practice the present invention to the fullest scope accorded by the appended claims. Regardless of the type of hardware 2544 used to implement firm fabrication-price-quotation and/or fabrication-ordering software 2536 made in accordance with the present invention, the hardware works in combination with and under the control of such software to form firm fabrication-price-quotation and/or fabrication-ordering system 2500, which provides functionality described herein.

Referring now to FIG. 25, and also to FIG. 24 for context and noting that 2500-series element numerals correspond to FIG. 24 and 2600-series numerals correspond to FIG. 25, at step 2605 of method 2600 a joining price request 2552 may be received by software 2536 from a user. As noted above, request 2552 is for one or more joining price quote(s) 2504 for joining one or more instantiations 2508(1) to 2508(N) of structure 2512, which is represented by computer model 2516 containing joining feature(s) 118. Software 2536 can receive request 2552 in any suitable manner, such as via a user interface (not shown) presented to a user on a computing device accessible to the user. In this example, software 2536 may present a user-selectable soft control (not shown), such as a soft button or checkbox, that a user can select to make the request. As those skilled in the art will readily appreciate, the selection of the soft control can be effected in any suitable manner, such as by clicking on or otherwise selecting the control using a pointing device (e.g., a mouse) or by touching a touchscreen at the appropriate location to make the selection. The manner of selection will depend on the particular hardware 2544 and configuration of software 2536 being used on the user's computing device. As alluded to above, the user interface containing the user-selectable control can be provided application-specific software running on the user's device or a web-browser or other remote-access means that allows the user to access price-quotation software functionality remotely from the user's device. As another example, request 2552 may be a more passive request, such as the user opening an application (not shown) of software 2536 that provide a user interface for price quoting and/or fabrication ordering tasks; once the user opens the application, software 2536 may initiate various ones of its price-quoting and/or ordering functionalities. For instance and without limitation, software 2536 may automatedly detect one or more joining locations in computer model, generate pricing request, and initiate method 2600 without prompting from user, such that fabrication price and/or joining method is available to user upon initiation of software 2536.

At step 2610, in conjunction with the user making joining price request 2552, software 2536 interrogates (i.e., obtains data from) joining feature(s) 118 from computer model 2516 to create joining feature pricing data 2524. As described above, joining feature pricing data 2524 can be any data that a joining price-quote-generating algorithm 2556 of software 2536 needs for generating joining price quote(s) 2504. An application programming interface (API) for joining price-quote generating algorithm 158 may enable third parties to connect, via software components, into the joining price quote generating algorithm 2556 to provide one or more joining price quote(s). In practice, an API is a library that usually includes specifications for routines, data structures, object classes, and variables and can take many forms, including an International Standard such as a portable operating system interface (e.g., based on the POSIX standards), vendor documentation such as the Microsoft Windows API, and/or the libraries of a programming language (e.g., Standard Template Library in C++ or Java API). 158. Joining feature pricing data 2524, or a subset thereof, may be found in and automatically extracted from joining feature(s) 118 present in computer model 2516. A benefit to this automatic extraction is that a human user is spared the task of determining this information manually or extracting such data semi-automatically and working with that data outside computer model 2516. Although the contents of the joining feature pricing data 2524 will vary depending on particular embodiments of the invention, data 2524 may include feature(s) that influence both joining set-up costs (e.g., number of joining segments in computer model 2516) and the joining run-time costs (e.g., total length of joining segments in computer model 2516).

Those skilled in the art will understand that software 2536 can interrogate joining feature(s) 118 in any of a variety of ways, depending on how data-interrogation code of software 2536 is configured. For example, if the data-interrogation code is built into computer-modeling software, such as computer-modeling software application 2548, the data-interrogation code may be preprogramed to recognize joining feature(s) 118 within computer model 2516 and utilize the internal protocols of that application to gather the that data. As another example, if the data-interrogation code is implemented as an external plugin module to computer-modeling software, the code might utilize the application's plugin module protocols. As yet another example, if the data-interrogation code is executed externally from the computer-modeling application but not as a plugin, the external code may utilize an application programming interface of the application. As yet another example, software 2536 may be configured to allow a user to input joining feature(s) 118 via a user interface (not shown) that includes one or more data-input features of one or more differing types, such as, but not necessarily limited to, keyed-input fields, drop-down menus, radio-control selectors, hyperlinks, and other selectors, among others. Regardless of how software 2536 and the data-interrogation code are configured, those skilled in the art will readily understand how to design the code.

At optional step 2615, software 2536 can further receive recommended joining data 134. As described above, in some embodiments, recommended joining data 134 may be used by method 2540 to provide joining price quote(s) for joining feature(s) that are not present in computer model 2516, but may be acceptable or more desirable alternatives to joining feature(s) 118. Those skilled in the art will readily understand that recommended joining data 134 can be received in any of a variety of ways, depending on how software 2536 is configured in a particular instantiation. For example, software 2536 may communicate with a joining recommendation algorithm (not shown in FIG. 24) that automatically provides a source of recommended joining data 134 based on one or more of the joining feature(s) 118 of computer model 2516. An example of such a configuration is described above in reference to FIGS. 1-18. In other embodiments, recommended joining data 134 may be specified by the user as alternatives to joining feature(s) 118.

Figure 27:
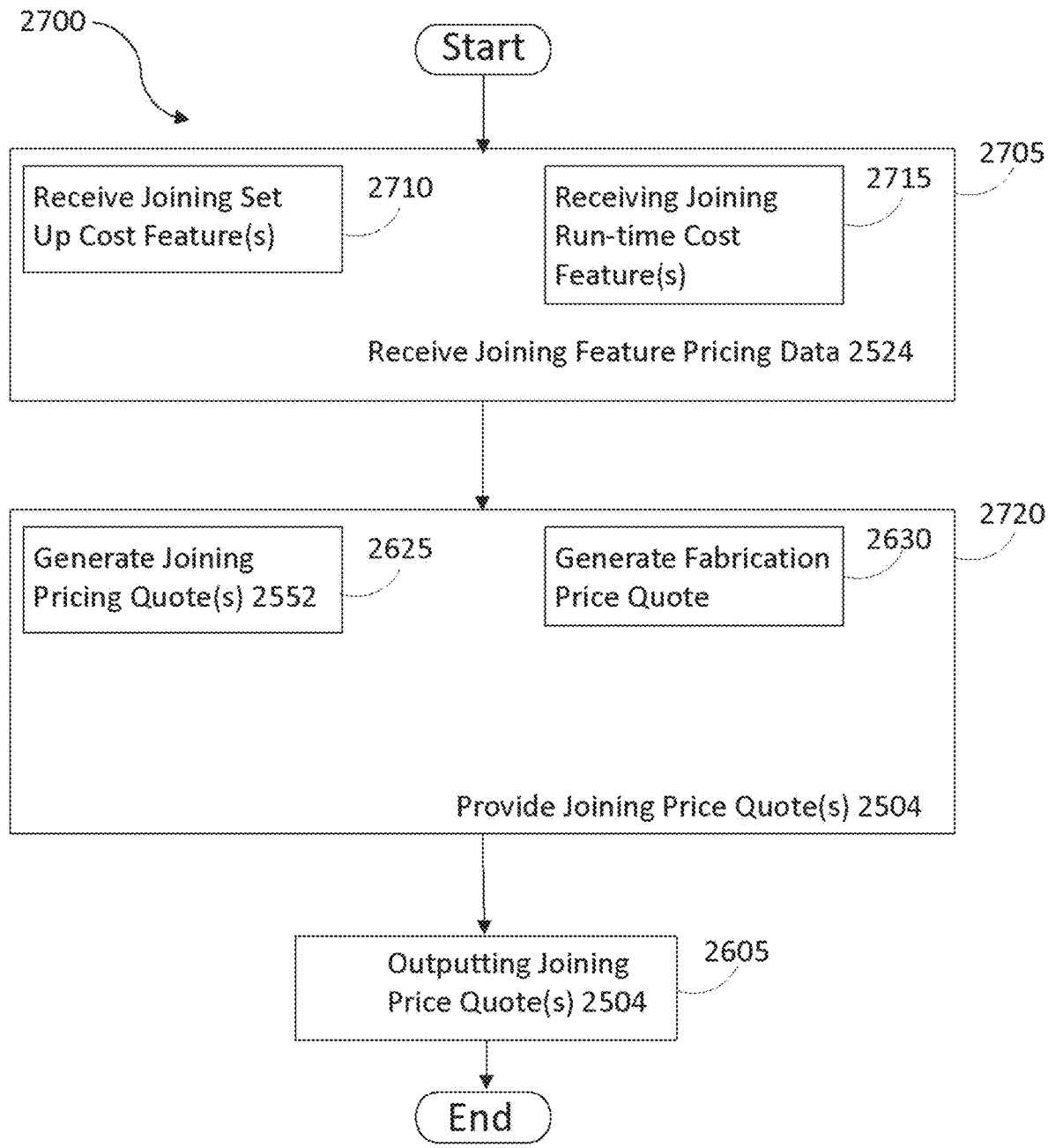
FIG. 27 is a flow diagram illustrating a joining price quote generating method that can be implemented by the firm fabrication-price-quoting system of FIG. 1.

At step 2620, software 2536 provides joining price quote(s) 2504 as a function of joining feature pricing data 2524 and joining pricing parameters 2532. In some embodiments, software 2536 may provide joining price quote(s) 2504 also as a function of recommended joining data 134. Depending on the configuration of software 2536 and where the various software components of the joining price generating portion of the software are physically executed, step 2620 will typically include several substeps. For example, at substep 2625, software 2536 may generate joining price quote(s) 2504 by, for example, applying various ones of joining pricing parameters 2532, such as joining rate per hour, material finish base run rate, material type modifiers, etc. to various ones of the joining feature pricing data 2524 and, in some embodiments, to recommended joining data 134. FIG. 27 illustrates a joining price quote generating method 2700 that is suitable for use as method step 2625 of FIG. 25. Method 2700 is described below in detail.

The precise joining pricing-quote-generating algorithms 2556 used in a particular embodiment will be highly dependent on, for example, the type(s) of structure(s) 2512 handled by software 2536, as well as the particularities of the fabricator(s) needed to fabricate the instantiation(s). However, algorithms 2556 will be readily implemented by those skilled in the art. It is noted that joining price quote(s) 2504 can include, for example, a joining price per instantiation and/or a total joining price for multiple instantiations.

Depending on where joining price-quote-generating algorithms 2556 are physically executed within system 2500 and where various ones of joining pricing parameters 2532 are stored within the system, one or more of the pricing parameters may need to be obtained by one computer from another computer within the system. For example, if joining price-quote-generating algorithms 2556 are executed on a user computer and joining pricing parameters 2532 are stored and updated on a server, such as a fabricator's server, before the pricing algorithms are executed, the portion of software 2536 running on the user computer may request the current pricing parameters from the server. In another example in which joining price-quote-generating algorithms 2556 are executed on a user computer, joining pricing parameters 2532 may be downloaded to the user computer as updates are available. In yet another example wherein joining price-quoting algorithms 2556 are executed on a server, such as fabricator's server or a software-as-a-service server, and substantially the entire price-quoting system 2500 is based on that server, joining price-quoting parameters 2532 would be locally available to joining price-quote-generating algorithms 2556 for execution. Of course, these are but a few examples of where joining pricing parameters 2532 can be stored and updated relative to where joining price-quote-generating algorithms 2556 can be stored and executed.

It is noted that in some embodiments in which at least some aspects of software 2536 are integrated with computer-modeling software, such as computer-modeling software application 2548, software 2536 may be configured to update joining price quote(s) 2504 every time a user makes a change to computer model 2516 in essentially real time. This can be accomplished, for example, by software 2536 monitoring model 2516 for any changes that create one or more new joining feature(s) 118 within model 2516 and modifying one or more pieces of the joining pricing data in the model. Then, when software 2536 detects any new and/or changed data, it can cause joining price-quote-generating algorithms 2556 to recalculate joining price quote(s) 2504 using the corresponding new and/or changed data. For example, as a user adds an additional joining feature 118 to existing structure 2512 within model 2516, software 2536 may update joining price quote(s) 2504 on the fly. In such exemplary embodiments, joining price-quote-generating algorithms 2556 may query for updated recommended joining data 134 that may also be generated based on the new and/or changed data. In some alternative embodiments, software 2536 may be configured to allow a user working with computer-modeling software, such as computer-modeling software application 2548, to select an update button or the like to cause joining price-quote-generating algorithms 2556 to update price quote(s) after making changes to structure 2512 within computer model 2516. Those skilled in the art will readily understand the wide variety of ways that updating of joining price quote(s) 2504 can be implemented.

Step 2620 may also include an optional substep 2630 at which software 2536 provides firm fabrication-price quote(s) as a function of the joining price quote(s) 2504. For example, software 2536 may generate firm fabrication-price quote(s) by combining the joining price quote(s) 2504 with other non-joining feature pricing data (not shown in FIG. 24) associated with the computer model 2516, such as part costs, non-joining fabrication costs, etc. Illustrative techniques for generating firm fabrication-price quote(s) are described in U.S. patent application Ser. No. 14/060,033, titled, "AUTOMATED FABRICATION PRICE QUOTING AND FABRICATION ORDERING FOR COMPUTER-MODELED STRUCTURES" and filed on Oct. 22, 2013, which is incorporated herein by reference for its teachings of techniques for and relating to generating firm fabrication-price quotes, including firm, good-faith quotes and pre-quotes.

Step 2620 may also include a substep 2635 at which software 2536 conveys joining price quote(s) 2504 and, in some embodiments, the firm fabrication-price quote to the user in any one or more of a variety of ways. For example, one or more of the quotes can be displayed on a display screen (not shown) of the user's computer, conveyed in an email, and/or provided in some other type of message, including regular mail, an instant message, a text message, etc. and/or as an attachment thereto, among others. Fundamentally, there are no limitations on how quotes can be conveyed to a user.

In embodiments in which joining price quote(s) 2504 are generated based on joining feature pricing data 2524 and recommended joining data 134, software 2536 may display multiple quotes, including a quote for joining and/or fabricating the computer model 2516 using the joining feature(s) 118 and at least one quote for joining and/or fabricating the computer model 2516 using the recommended joining data 134. Software 2536 may further display differences between these quotes so as to assist the user in deciding whether to select between the joining feature(s) 118 or the recommended joining data 134.

At optional step 2640, software 2536 may receive a fabrication order request 2560 in any suitable manner, such as via a user interface (not shown) presented to a user on a computing device accessible to the user. In this example, software 2536 may present a user-selectable soft control (not shown), such as a soft button or checkbox, that a user can select to make the request. As those skilled in the art will readily appreciate, the selection of the soft control can be effected in any suitable manner, such as by clicking on or otherwise selecting the control using a pointing device (e.g., a mouse) or by touching a touchscreen at the appropriate location to make the selection. The manner of selection will depend on the particular hardware 2544 and configuration of software 2536 being used on the user's computing device. As alluded to above, the user interface containing the user-selectable control can be provided application-specific software running on the user's device or a web-browser or other remote-access means that allows the user to access price-quotation software functionality remotely from the user's device.

At optional step 2645, in response to receiving fabrication order request 2560, software 2536 provides a fabrication order 2520 to the fabricator. Step 25550 may be accomplished in any suitable manner, such as sending an email to the fabricator, placing a work order in a queue of a fabricator's scheduling software, among others. Fundamentally, there is no limitation on the way that fabrication order 2520 may be made to the fabricator.

It is particularly emphasized that the order of performance of the foregoing steps of method 2600 need not be as shown. Rather, they may be implemented in any logical order that results in one or more price quotes and/or one or more fabrication orders.

Reference is now made to FIG. 27, which shows a joining price quote generating method 2700. As previously described, method 2700 may be suitable for use at method step 2625 of FIG. 25 and, in some embodiments, may be executed by joining pricing-quote-generating algorithm 2556.

At step 2705, joining feature pricing data 2524 may be received by joining pricing-quote-generating algorithm 2556. As noted above, joining feature pricing data 2524 influence the cost of joining one or more instantiations of the structure 2512 represented by the computer model 2516. Depending on the configuration of joining pricing-quote-generating algorithm 2556, step 2705 will typically include a step 2710 of receiving joining set up cost feature(s), such as the number of joining segments in computer model 2516. Step 2705 will also typically include a step 2715 of receiving joining run-time cost feature(s), such as (but not limited to) the total length of joinings, joining finish, material type, and/or size of joining.

At step 2720, joining pricing-quote-generating algorithm 2556 provides joining price quote(s) 2504 based on the joining feature pricing data 2524 and joining pricing parameters 2532. Depending on the configuration of joining pricing-quote-generating algorithm 2556, step 2720 will optionally include a step 2725 of computing set-up cost(s) as a function of the set-up cost feature(s) received at step 2710 and various joining pricing parameters 2532. For example, algorithm 2556 may generate the set-up cost(s) as a function of the number of joining segments, welding labor rate per hour, and time to set up the joining work center. The time to set up the joining work center may depend on the material type or other joining pricing parameters 2532.

Step 2720 will typically include a step 2730 of computing run-time cost(s) as a function of the joining run-time cost feature(s) received at step 2715 and various joining pricing parameters 2532. For example, algorithm 2556 may generate the run-time cost(s) by first generating a total run rate time per join segment (e.g., seam weld, spot weld, etc.) as a function of joining finish and material type feature(s), then applying the total run rate time per join segment to the total number of join segments in the computer model 2516 to generate run time(s). Labor costs may be applied to the run time(s) to generate the run-time costs(s).

At step 2735, the joining pricing-quote-generating algorithm 2556 outputs the joining price quote(s) 2504. For example, algorithm 2556 may add the set-up cost(s) to the run-time cost(s) to generate total cost(s). Total cost(s) may be provided per instantiation and/or for multiple instantiations. Total cost(s) may be provided based on fabricating structure 2512 using joining feature(s) 118 and/or recommended joining data 134.

Figure 28:
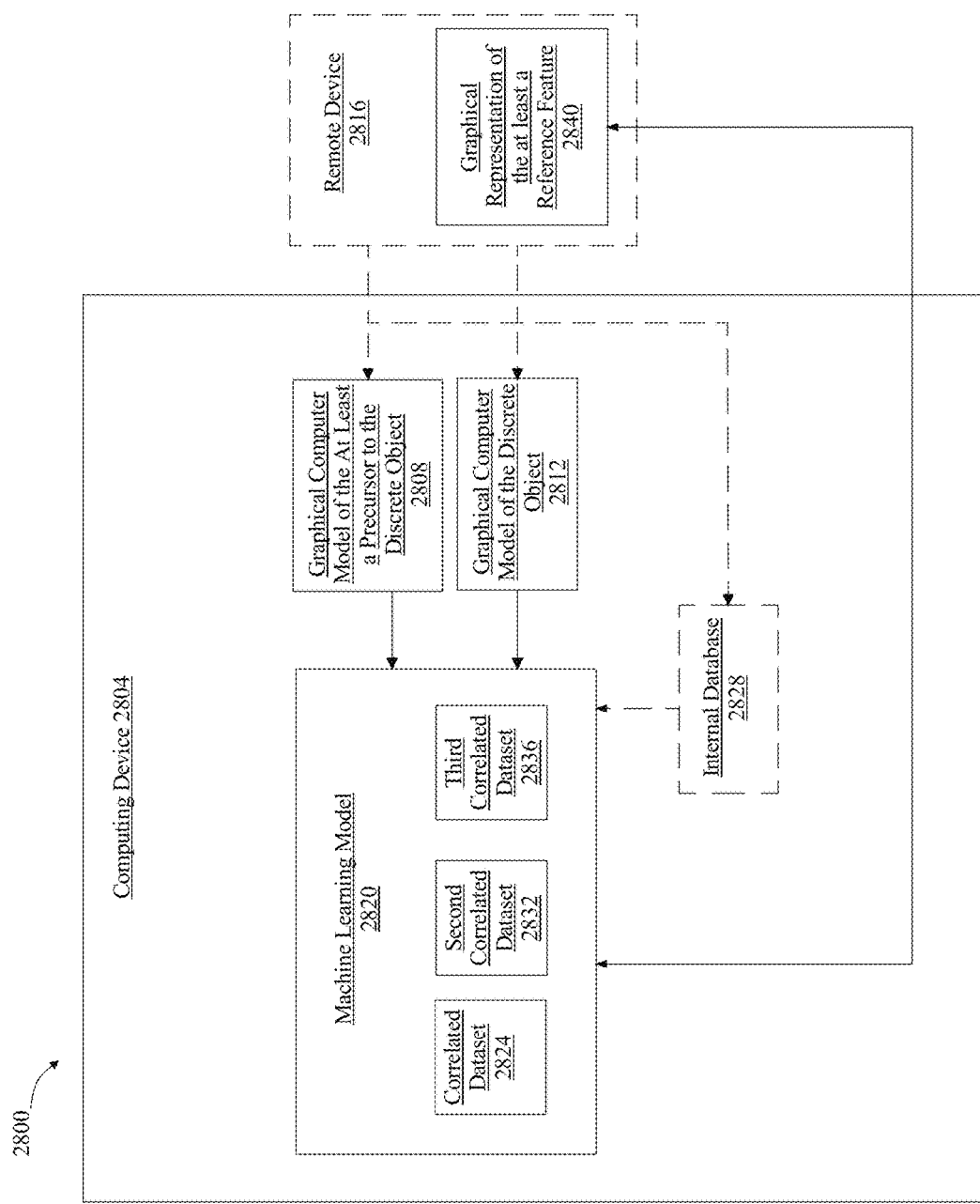
FIG. 28 is a block diagram illustrating a system for generating a graphical representation of a discrete object to be manufactured from an additively manufactured body of material.

Referring now to FIG. 28, a block diagram of automated manufacturing system 2800 for generating a graphical representation of a discrete object to be manufactured from an additively manufactured body of material is presented. In an embodiment, automated manufacturing system 2800 is configured to automatedly generate a graphical representation of the at least a reference feature on the graphical model of the at least a precursor to the discrete object as a function of the at least a critical-to-quality feature and can include computing device 2804, graphical computer model of the at least a precursor to a discrete object 2808, graphical computer model of the discrete object 2812, remote device 2816, machine learning model 2820, correlated dataset 2824, second correlated dataset 2832, third correlated dataset 2836, internal database 2828, graphical representation of the at least a reference feature 2840, and any combination thereof.

Still referring to FIG. 28, system 2800 is configured to include computing device 2804. Computing device 2804 may include any computing device as described herein, including without limitation a microcontroller, microprocessor, digital signal processor (DSP) and/or system on a chip (SoC) as described herein. Computing device 2804 may be housed with, may be incorporated in, or may incorporate one or more sensors of at least a sensor. Computing device may include, be included in, and/or communicate with a mobile device such as a mobile telephone or smartphone. Computing device 2804 may include a single computing device operating independently, or may include two or more computing device operating in concert, in parallel, sequentially or the like; two or more computing devices may be included together in a single computing device or in two or more computing devices. Computing device 2804 with one or more additional devices as described below in further detail via a network interface device. Network interface device may be utilized for connecting a computing device 2804 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 2804 may include but is not limited to, for example, a computing device 2804 or cluster of computing devices in a first location and a second computing device or cluster of computing devices in a second location. Computing device 2804 may include one or more computing devices dedicated to data storage, security, distribution of traffic for load balancing, and the like. Computing device 2804 may distribute one or more computing tasks as described below across a plurality of computing devices of computing device, which may operate in parallel, in series, redundantly, or in any other manner used for distribution of tasks or memory between computing devices. Computing device 2804 may be implemented using a "shared nothing" architecture in which data is cached at the worker, in an embodiment, this may enable scalability of system 2800 and/or computing device.

With continued reference to FIG. 28, system 2800 is configured to receive graphical computer model of the at least a precursor to the discrete object 2808 and graphical computer model of the discrete object 2812. Graphical computer model of the at least a precursor to the discrete object 2808 may include any graphical computer model of the at least a precursor to the discrete object as described in further detail above in reference to FIGS. 1-27. Graphical computer model of the discrete object 2812 may include any graphical computer model of the discrete object as described in further detail above in reference to FIGS. 1-27. The graphical computer model of the at least a precursor to the discrete object 2808 and graphical computer model of the discrete object 2812 may be received, in an embodiment and without limitation, from remote device 2816. Remote device 2816 may configured to, without limitation, transmit a communication to computing device 2804; transmission may include any methods and/or systems for transmission as described herein. Remote device 2816 may include an additional computing device, such as a mobile device, laptop, desktop computer, or the like; as a non-limiting example, remote device 2816 may be a computer and/or workstation operated by an engineering professional. Persons skilled in the art, upon reviewing the entirety of this disclosure, will be aware of various devices which may be suitable for use as user client device consistently with this disclosure.

Continuing to refer to FIG. 28, system 2800 is further configured to identify at least a first feature in a graphical computer model of the discrete object 2812. Identifying at least a first feature in graphical computer model of the discrete object 2812 may include any identification of a graphical computer model of the discrete object, as described above in further detail in reference to FIG. 1-27. Persons skilled in the art, upon reviewing the entirety of this disclosure, will be aware of various means of identification which may be suitable for use to identify at least a first feature consistently with this disclosure.

With continued reference to FIG. 28, system 2800 can include machine-learning model 2820. Machine-learning model 2820 may operate on computing device 2804 and/or any other server in communication with computing device 2804, which may include any hardware or software module. Computing device 2804 is configured to automatedly determine, at machine-learning model 2820, that the at least a first feature includes at least a critical-to-quality feature in graphical computer model of the discrete object 2812. Computing device 2804 is further configured to automatedly generate, at machine-learning model 2820, a graphical representation of the at least a reference feature on graphical model of the at least a precursor to the discrete object 2808 as a function of the at least a critical-to-quality feature. Machine-learning model 2820 may include an unsupervised machine-learning process. An unsupervised machine-learning process, as used herein, is a process that derives inferences in datasets without regard to labels; as a result, an unsupervised machine-learning process may be free to discover any structure, relationship, and/or correlation provided in the data. For instance, and without limitation, unsupervised machine learning module and/or server 104 may perform an unsupervised machine learning process on a first data set, which may cluster data of first data set according to detected relationships between elements of the first data set. Such detected relationships can include, without limitation, correlations of elements of mechanical part data to each other and correlations of compatible part elements to each other; such relations may then be combined with supervised machine learning results to add new criteria for a supervised machine-learning processes as described in more detail below. As a non-limiting, illustrative example, an unsupervised process may determine that a first geometric description of at least a stored critical-to-quality shape description correlates closely with a second geometric description of at least a stored critical-to-quality shape description. The first element can be linked via supervised learning processes to a given shape that requires manufacture to a first tolerance, but the second has not. For instance, the second geometric description of at least a stored critical-to-quality shape description may not have been defined as an input for the supervised learning process, or may pertain to a domain outside of a domain limitation for the supervised learning process. Continuing the example a close correlation between first geometric description of at least a stored critical-to-quality shape description and second geometric description of at least a stored critical-to-quality shape description may indicate that the second geometric description of at least a stored critical-to-quality shape description is also a good predictor for the shape that requires manufacture to a first tolerance; second geometric description of at least a stored critical-to-quality shape description may be included in a new supervised process to derive a relationship or may be used as a synonym or proxy for the first geometric description of at least a stored critical-to-quality shape description.

Still referring to FIG. 28, machine-learning model 2820 may include any method of cluster analysis which outputs a hierarchy of clusters. Cluster analysis, as used herein, includes any grouping of objects such as datasets in such a way that datasets in the same group or cluster are more similar to each other than to those in other clusters. Cluster analysis may include hard clustering and/or soft clustering. Hard clustering may include clustering where each dataset belongs to any particular cluster or not. Soft clustering may include clustering where each dataset may belong to a cluster to a certain degree such as a certain percentage of belonging to any given cluster or a likelihood of belonging to a given cluster. Hierarchical clustering may group and/or segment datasets with shared attributes to extrapolate algorithmic relationships. Machine-learning model 2820 may include generating various algorithms that may work to find clusters that may be generated based on parameter settings such as distance functions to use, density threshold, and optimal of clusters to generate. Machine-learning model 2820 may include models such as but not limited to connectivity models, centroid models, distribution models, density models, subspace models, group models, graph-based models, signed graph models, neural models, and the like.

Referring still to FIG. 28, machine-learning model 2820 may include agglomerative and/or divisive hierarchical clustering. Agglomerative hierarchical clustering may include a bottom-up approach whereby each observation may start in its own cluster, and pairs of clusters may be merged as one moves up the hierarchy. Divisive hierarchical clustering may include a top-down approach whereby all observations may start in one cluster and splits may be performed recursively moving down the hierarchy.

With continued reference to FIG. 28, machine-learning model 2820 may further include a hierarchical clustering model. The hierarchical clustering model may group and/or segment datasets into hierarchy clusters including both agglomerative and divisive clusters. Agglomerative clusters may include a bottom-up approach where each observation starts in its own cluster and pairs of clusters are merged as one moves up the hierarchy. Divisive clusters may include a top-down approach where all observations may start in one cluster and splits are performed recursively as one moves down the hierarchy. In an embodiment, the hierarchical clustering model may analyze datasets obtained from the internal database to find observations which may each initially form own cluster. The hierarchical clustering model may then then identify clusters that are closest together and merge the two most similar clusters and continue until all clusters are merged together. The hierarchical clustering model may output a dendrogram which may describe the hierarchical relationship between the clusters. Distance between clusters that are created may be measured using a suitable metric. Distance may be measured between for example the two most similar parts of a cluster known as single linkage, the two least similar bits of a cluster known as complete-linkage, the center of the clusters known as average-linkage or by some other criterion which may be obtained based on input received from the internal database, as an example.

With continued reference to FIG. 28, machine-learning model 2820 may perform other unsupervised machine learning models to output graphical representation of the at least a reference feature. Machine-learning model 2820 may include a data clustering model. The data clustering model may group and/or segment datasets with shared attributes to extrapolate algorithmic relationships. The data clustering model may group data that has been labelled, classified, and/or categorized. The data clustering model may identify commonalities in data and react based on the presence or absence of such commonalities. For instance and without limitation, the data clustering model may identify other data sets that contain the same or similar characteristics of the part for manufacture contained within graphical computer model of the discrete object 2812 or identify other datasets that contain parts with similar attributes and/or differentiations. In an embodiment, the data clustering model may cluster data and generate labels that may be utilized as training set data. The data clustering model may utilize other forms of data clustering algorithms including for example, hierarchical clustering, k-means, mixture models, OPTICS algorithm, and DBSCAN.

With continued reference to FIG. 28, machine-learning model 2820 may include an anomaly detection model. The anomaly detection model may include identification of rare items, events or observations that differ significant from the majority of the data. The anomaly detection model may function to observe and find outliers. For instance and without limitation, anomaly detection model may find and examine data outliers such as an at least a feature that is not compatible with any part elements or that is compatible with very few part elements. For example and without limitation, the anomaly detection model may include comparing each value to a threshold value, comparing the deviation from a predetermined value to a threshold, comparing a deviation from a mean, comparing a deviation from a median, comparing a deviation from a mode, comparing a deviation from a threshold, and the like.

Still referring to FIG. 28, machine-learning model 2820 may include other unsupervised machine-learning models. This may include for example, neural networks, autoencoders, deep belief nets, Hebbian learning, adversarial networks, self-organizing maps, expectation-maximization algorithm, method of moments, blind signal separation techniques, principal component analysis, independent component analysis, non-negative matrix factorization, singular value decomposition.

Still referring to FIG. 28, machine-learning model 2820 may further include a supervised machine-learning process. Supervised machine-learning processes may include, without limitation, models developed using linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Still referring to FIG. 28, supervised machine-learning algorithms and/or processes may include without limitation, linear discriminant analysis. Supervised machine-learning algorithm may include quadratic discriminate analysis, kernel ridge regression, and/or support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors' algorithms, Gaussian processes, such as Gaussian Process Regression, cross-decomposition algorithms, including partial least squares and/or canonical correlation analysis, and/or naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

With continued reference to FIG. 28, supervised machine-learning algorithms may include using alternatively or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using any training set as described herein; the trained network may then be used to apply detected relationships between elements of user input datums and antidotes.

With continuing reference to FIG. 28, training data, as used herein, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data. In an embodiment and without limitation, training data may include correlated database, second correlated database, third correlated database, as described in further detail below.

Alternatively or additionally, and still referring to FIG. 28, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like. Categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name and/or a description of a medical condition or therapy may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

Still referring to FIG. 28, machine-learning model 2820 may generate the graphical representation of the at least a reference feature by executing a lazy learning module. The lazy learning module is executed as a function of manufacturing request datum and the at least a part element. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover a "first guess" at a mechanical part element associated with at least a manufacturing request datum, using at least a training set. The lazy learning module may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate external price outputs as described in this disclosure, including without limitation lazy learning applications of machine-learning algorithms as described in further detail below.

Continuing to refer to FIG. 28, computing device 2804 and/or machine-learning module 2820 can include correlated dataset 2824. Each dataset of correlated dataset 2824 contains a geometric description of at least a stored critical-to-quality shape description and a correlated shape that requires manufacture to a first tolerance. Geometric descriptions may be provided in terms of mathematical formulas for planes, curves, lines, and the like; formulas may be stored according to two or three-dimensional Cartesian or polar coordinates, vector-based formulas, or the like, as described in further detail above in reference to FIGS. 1-27. As described above in further detail, a stored critical-to-quality (CTQ) feature is a feature having structural or functional characteristics that must be met for a manufactured article to satisfy its intended use. CTQ features may include features where a high tolerance is necessary to achieve an intended result. In an embodiment, a discrete object to be manufactured may have a small number of points that require high tolerances, including without limitation locations where joins are to be made, mating features, or the like. The correlated shape that requires manufacture to the first tolerance, as described in the entirety of this disclosure, is a shape that requires manufacturing to the first tolerance. In an embodiment, the geometric description of at least a stored critical-to-quality shape description is correlated with a compatible shape that requires manufacture to the first tolerance where the geometric description of at least a stored critical-to-quality shape description is located in the same data element and/or portion of data element as the correlated shape that requires manufacture to a first tolerance. For example and without limitation, a geometric description of at least a stores critical-to-quality shape description is correlated with a correlated shape that requires manufacture to a first tolerance where both the geometric description of at least a stores critical-to-quality shape description and the correlated shape that requires manufacture to a first tolerance are contained within the same correlated dataset 2824. For instance and without limitation, a geometric description of at least a stored critical-to-quality shape description showing a projection may be correlated to a correlated shape that requires manufacture to a first tolerance such as a permitted variance allowed to manufacture the projection, wherein the object and/or projection are properly functioning. In another example and without limitation, a geometric description of at least a stored critical-to-quality shape description showing a groove may be correlated to a correlated shape that requires manufacture to a first tolerance such as a permitted variance allowed to manufacture that groove. In yet another example and without limitation, a geometric description of at least a stored critical-to-quality shape description showing a cut may be correlated to a correlated shape that requires manufacture to a first tolerance such as a permitted variance allowed to manufacture that cut.

With continued reference to FIG. 28, dataset containing plurality of data entries wherein each dataset contains a geometric description of at least a stored critical-to-quality shape description and a correlated shape that requires manufacture to a first tolerance may be stored in internal database 2828. Internal database 2828 may be implemented, without limitation, as a relational database, a key-value retrieval datastore such as a NOSQL database, or any other format or structure for use as a datastore that a person skilled in the art would recognize as suitable upon review of the entirety of this disclosure. Dataset may be stored in any suitable data and/or data type. For instance and without limitation, dataset may include textual data, such as numerical, character, and/or string data. Textual data may include a standardized name and/or code for in-process and/or post-processing manufacturing, or the like; codes may include raw material codes, dimensional codes, calibration codes, mechanical and/or thermal testing codes, safety codes, and/or data formatting codes, which may include without limitation codes used in CAD 3D geometry, assembly and PMI standards such as STEP AP242 and ASME Y14.5 geometric dimensioning and tolerancing (GD&T) symbols. In general, there is no limitation on forms textual data or non-textual data used as dataset may take; persons skilled in the art, upon reviewing the entirety of this disclosure, will be aware of various forms which may be suitable for use as dataset consistently with this disclosure.

Continuing to refer to FIG. 28, internal database 128 may include data entries reflecting one or more graphical computer models. The graphical computer model may include any graphical computer model as described above. Graphical computer model may include models submitted according to any process, including without limitation by remote device 2816. System 2800 is further configured to store graphical computer model of the at least a precursor to the discrete object 2808 in internal database 128. Further, system 2800 is configured to store graphical computer model of the discrete object 2812 in internal database 128.

Still referring to FIG. 28, dataset may be stored as image data, such as for example an image of a particular CNC mechanical part, such as a computer model of a threaded bolt, a computer-aided design of a stainless-steel endcap, or a tool path of a hollow box. Image data may be stored in various forms including for example, joint photographic experts group (JPEG), exchangeable image file format (Exif), tagged image file format (TIFF), graphics interchange format (GIF), portable network graphics (PNG), netpbm format, portable bitmap (PBM), portable any map (PNM), high efficiency image file format (HEIF), still picture interchange file format (SPIFF), better portable graphics (BPG), drawn filed, enhanced compression wavelet (ECW), flexible image transport system (FITS), free lossless image format (FLIF), graphics environment manage (GEM), portable arbitrary map (PAM), personal computer exchange (PCX), progressive graphics file (PGF), gerber formats, 2 dimensional vector formats, 3 dimensional vector formats, compound formats including both pixel and vector data such as encapsulated postscript (EPS), portable document format (PDF), SolidWorks part file (.SLDPRT), several SolidWorks part files organized into a single assembly (.SLDASM), 3D assembly file supported by various mechanical design programs (.STP), graphics file saved in a 2D/3D vector format based on the Initial Graphics Exchange Specification (.IGS) and stereo formats.

Still referring to FIG. 28, computing device 2804 and/or machine-learning module 2820 can include second correlated dataset 2832. Each dataset of second correlated dataset 2832 contains a geometric description of the at least a first surface feature and at least a correlated second surface feature of a graphical representation of the second object. The geometric description of the at least a first surface feature may include any geometric representation of the at least a surface feature as described in further detail in the entirety of this disclosure. The correlated second surface feature of the graphical representation of the second object may include any geometric description of a surface feature as described in further detail above in reference to FIGS. 1-27. The second object, as described above in further detail, is a graphical computer model, wherein the graphical computer model depicts a second object mating with graphical representation of the at least a precursor to the discrete object 2808. In an embodiment, the geometric description of the at least a first surface feature is correlated with a compatible second surface feature of a graphical representation of the second object where the geometric description of the at least a first surface feature is located in the same data element and/or portion of data element as the correlated second surface feature of a graphical representation of the second object. For example and without limitation, a geometric description of the at least a first surface feature is correlated with a correlated second surface feature of a graphical representation of the second object where both the geometric description of the at least a first surface feature and the correlated second surface feature of a graphical representation of the second object are contained within the same second correlated dataset 2832. For instance and without limitation, a geometric description of the at least a first surface feature showing a mating location may be correlated to a correlated second surface feature of a graphical representation of the second object such as a surface feature that will properly mate and combine with the mating location, wherein the first object and/or second object are properly adjoined. In another example and without limitation, a geometric description of the at least a first surface feature showing a desired joint may be correlated to a correlated second surface feature of a graphical representation of the second object such as a surface feature that will properly mate and/or combine with the desired joint, wherein the first object and second object are properly adjoined.

With continued reference to FIG. 28, computing device 2804 and/or machine-learning module 2820 can include third correlated dataset 2836. Each dataset of third correlated dataset 2836 contains a geometric description of the at least a surface feature and a correlated geometric description of at least a fastening feature shape description. The geometric description of the at least a surface feature may include any geometric representation of the at least a surface feature as described in further detail in the entirety of this disclosure. The correlated geometric description of the at least a fastening feature shape description, as described in further detail above in reference to FIGS. 1-27, can include any geometric description of the at least a fastening feature shape. In an embodiment, the geometric description of the at least a surface feature is correlated with a compatible geometric description of at least a fastening feature shape description where the geometric description of the at least a surface feature is located in the same data element and/or portion of data element as the correlated geometric description of at least a fastening feature shape description. For example and without limitation, a geometric description of the at least a surface feature is correlated with a correlated geometric description of at least a fastening feature shape description where both the geometric description of the at least a surface feature and the correlated geometric description of at least a fastening feature shape description are contained within the same third correlated dataset 2836. For instance and without limitation, a geometric description of the at least a surface feature showing a threaded hole may be correlated to a correlated geometric description of at least a fastening feature shape description such as a feature that will properly mate and/or combine with the threaded hole, wherein the first object and second object are properly adjoined. In another example and without limitation, a geometric description of the at least a first surface feature showing a face containing one or more through holes may be correlated to a correlated geometric description of at least a fastening feature shape description such as a feature that will properly mate and/or combine with the face containing one or more through holes, wherein the first object and second object are properly adjoined.

Still referring to FIG. 28, automatedly determining the at least a critical-to-quality feature further includes extracting a geometric description of at least a surface feature depicted in the graphical computer model of the direct object. Extraction may include any means of extraction as described above in further detail in reference to FIGS. 1-27. The geometric description of the at least a surface feature includes any geometric description of the at least a surface feature as described in further detail in the entirety of this disclosure. Further, automatedly determining the at least a critical-to-quality feature includes selecting correlated dataset 2824. As described above in further detail, each dataset of correlated dataset 2824 includes the geometric description of the at least a stored critical-to-quality shape description and a correlated shape that requires manufacture to a first tolerance. The geometric description of the at least a stored critical-to-quality feature can include any geometric description of the at least a stored critical-to-quality feature as described above in further detail in reference to FIGS. 1-27. The correlated shape that requires manufacture to a first tolerance may include any shape requiring manufacture to a first tolerance as described in further detail in the entirety of this disclosure. Further, in an embodiment, automatedly determining the at least a critical-to-quality feature includes the at least a critical-to-quality feature further includes determining the geometric description of the at least a surface feature matches the geometric description of correlated dataset 2824 as a function of comparing the geometric description of the at least a surface feature to the correlated dataset. Determining the geometric description of the at least a surface feature matches the geometric description of correlated dataset 2824 may be performed at machine-learning model 2820 utilizing any machine-learning process as described above in further detail.

With continued reference to FIG. 28, automatedly determining that the at least a first feature includes the at least a critical-to-quality feature further comprises detecting at least a join locus. As described above in further detail in reference to FIGS. 1-27, the at least a join locus may be a location on a graphical computer model corresponding to a location on a represented discrete object where the discrete object is or will be joined to another discrete object, part, or component. For instance, and without limitation, a stored CTQ value may be associated with stored data indicating its likely use as a join location, for instance as a mating projection and/or mating recess as described above. Detecting the at least a join locus further includes extracting a first geometric description of at least a first surface feature depicted in the graphical computer model. Extraction may include any means of extraction as described above in further detail. The geometric description of the at least a first surface may include any geometric description as described above in further detail in reference to FIGS. 1-27. Further, detecting the at least a join locus further comprises selecting second correlated dataset 2832. Each dataset of second correlated dataset 2832 contains a geometric description of the at least a surface feature and at least a correlated second surface feature of a graphical representation of the second object. The second object, as described above in further detail, is a graphical computer model, wherein the graphical computer model depicts a second object mating with graphical representation of the at least a precursor to the discrete object 2808. The geometric description of the at least a surface feature may include any geometric description of a surface feature as described above in further detail in reference to FIGS. 1-27. Further, in an embodiment, detecting the at least a join locus further includes determining the at least a first surface feature and second correlated dataset 2832 are complementary forms as a function of comparing the first geometric description to second correlated dataset 2832.

Determining the at least a first surface feature and second correlated dataset 2832 are complementary forms may be performed at machine-learning model 2820 utilizing any machine-learning process as described above in further detail.

Continuing to refer to FIG. 28, detecting the at least a join locus further includes extracting a geometric description of at least a surface feature depicted in the graphical computer model of the discrete object 2812. Extraction may include any means of extraction as discussed in further detail above. The geometric description of the at least a surface feature can include any geometric description of the at least a surface feature as described in further detail above in reference to FIGS. 1-27. Further, detecting the at least a join locus includes selecting third correlated dataset 2836. Each dataset of third correlated dataset 2836 contains a geometric description of the at least a surface feature and a correlated geometric description of at least a fastening feature shape description. The correlated geometric description of the at least a fastening feature shape description may include any geometric description of the at least a fastening feature shape description as described in further detail above in reference to FIGS. 1-27. Further, in an embodiment, detecting the at least a join locus includes determining the geometric description of the at least a surface matches the geometric description of the at least a fastening feature shape description as a function of comparing the geometric description of the at least a surface feature to third correlated dataset 2836. Determining the geometric description of the at least a surface matches the geometric description of the at least a fastening feature shape description may be performed utilizing any machine-learning process as described above in further detail.

Figure 29:
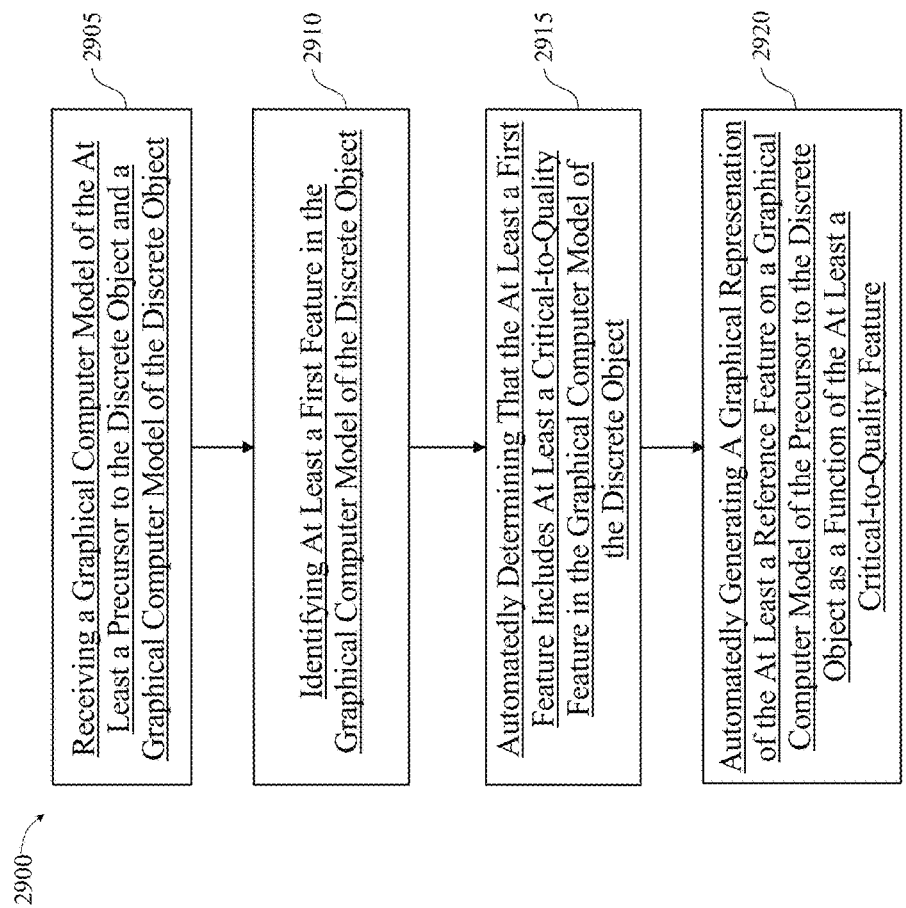
FIG. 29 is a flow diagram illustrating a method generating a graphical representation of a discrete object to be manufactured from an additively manufactured body of material.

Referring now to FIG. 29, an embodiment of a method 2900 for generating a graphical representation of a discrete object to be manufactured from an additively manufactured body of material is illustrated. At step 2905, system 2800 receives a graphical computer model of the at least a precursor to the discrete object 2808 and graphical computer model of the discrete object 2812. In an embodiment and without limitation, graphical computer model of the at least a precursor to the discrete object 2808 and graphical computer model of the discrete object 2812 may be received from remote device 2816. Graphical computer model of the at least a precursor to the discrete object 2808 and graphical computer model of the discrete object 2812 may be received by system 2800 utilizing any of the network methodologies as described herein. Graphical computer model of the at least a precursor to the discrete object 2808 may include any graphical computer model of the at least a precursor to a discrete object as described in further detail above in reference to FIGS. 1-28. Graphical computer model of the discrete object 2812 may include any graphical computer model of the discrete object as described in further detail in the entirety of this disclosure. Further, at step 2910, system 2800 identifies at least a first feature in graphical computer model of the discrete object 2812. The at least a first feature in graphical computer model of the discrete object 2812 can include any first feature as described above in further detail in reference to FIGS. 1-28. Identification may include any methodology of identification and/or interrogation as described in further detail in the entirety of this disclosure.

Still referring to FIG. 29, at step 2915, system 2800 automatedly determines that the at least a first feature includes at least a critical-to-quality feature in the graphical computer model of the discrete object 2812. The at least a critical-to-quality feature may include any critical-to-quality feature as described in further detail above in reference to FIGS. 1-28. System 2800 may automatically determine that the at least a first feature at computing device 2804 and/or machine-learning model 2820. In an embodiment, automatedly determining and/or detecting that the at least a first feature further includes extracting a geometric description of at least a surface feature depicted in the graphical computer model of the discrete object 2812. The geometric description of the at least a surface feature may include any geometric description of the at least a surface feature as described in further detail above in reference to FIGS. 1-28. Extraction may include any means of extraction as discussed in further detail above.

Continuing to refer to FIG. 29, automatedly determining and/or detecting that the at least a first feature further includes selecting correlated dataset 2824. Each correlated dataset of correlated dataset 2824 contains a geometric description of at least a stored critical-to-quality shape description and a correlated shape that requires manufacture to a first tolerance. Datasets may include any of the datasets as described herein. Datasets may be selected from internal database 2828. Further, automatedly determining the at least a first feature includes the at least a critical-to-quality feature further includes determining the geometric description of the at least a surface feature matches the geometric description of correlated dataset 2824 as a function of comparing the geometric description of the at least a surface feature to correlated dataset 2824. Determining the geometric description of the at least a surface feature matches the geometric description of correlated dataset 2824 may be performed at machine-learning model 2820 utilizing any machine-learning process and/or algorithm as discussed above in further detail in the entirety of this disclosure.

Still referring to FIG. 29, automatedly determining that the at least a first feature includes the at least a critical-to-quality feature further comprises detecting at least a join locus. The at least a join locus may include any join locus as described in further detail in the entirety of this disclosure. Detecting the at least a join locus may include any means of detection as described above in reference to FIGS. 1-28. In an embodiment, detecting the at least a join locus includes extracting a first geometric description of at least a first surface feature depicted in the graphical computer model of the discrete object 2812. The first geometric description of the at least a first surface feature may include any geometric description of the at least a first surface as described in further detail above in reference to FIGS. 1-28. Extraction may include any means of extraction as discussed in further detail above. In an embodiment, detecting the at least a join locus further includes selecting second correlated dataset 2832. Each dataset of second correlated dataset 2832 contains a geometric description of the at least a surface feature and at least a correlated second surface feature of a graphical representation of the second object. The correlated second surface feature of a graphical representation of the second object may include any second surface feature of a graphical representation of the second object as described in further detail in the entirety of this disclosure. Datasets may include any of the datasets as described herein. Datasets may be selected from internal database 2828. Further, detecting the at least a join locus may include determining the at least a first surface feature and second correlated dataset 2832 are complementary forms as a function of comparing the first geometric description to second correlated dataset 2832. Determining the at least a first surface feature and second correlated dataset 2832 are complementary forms may be performed at machine-learning model 2820 utilizing any machine-learning process and/or algorithm as discussed above in further detail in the entirety of this disclosure.

With continued reference to FIG. 29, detecting the at least a join locus further includes extracting a geometric description of at least a surface feature depicted in graphical computer model of the discrete object 2812. The geometric description of the at least a surface feature may include any geometric description of the at least a surface feature as described in further detail above in reference to FIGS. 1-28. Extraction may include any means of extraction as discussed in further detail above. In an embodiment, detecting the at least a join locus further includes selecting third correlated dataset 2836. Each dataset of third correlated dataset 2836 contains a geometric description of the at least a surface feature and a correlated geometric description of at least a fastening feature shape description. The correlated geometric description of at least a fastening feature shape description may include any geometric description of at least a fastening feature shape description as described in further detail above in reference to FIGS. 1-28. Datasets may include any of the datasets as described herein. Datasets may be selected from internal database 2828. Further, detecting the at least a join locus may include determining the geometric description of the at least a surface matches the geometric description of the at least a fastening feature shape description as a function of comparing the geometric description of the at least a surface feature to third correlated dataset 2836. Determining the geometric description of the at least a surface matches the geometric description of the at least a fastening feature shape description may be performed at machine-learning model 2820 utilizing any machine-learning process and/or algorithm as discussed above in further detail in the entirety of this disclosure.

Continuing to refer to FIG. 29, at step 2920, system 2800 automatedly generates graphical representation of the at least a reference feature 2840 on graphical computer model of the precursor to the discrete object 2808 as a function of the at least a critical-to-quality feature. Graphical representation of the at least a reference feature 2840 can include any graphical representation of the at least a reference feature, as described above in further detail in reference to FIGS. 1-28. In an embodiment, and without limitation, system 2800 may determine an orientation for discrete object based on the identified critical-to-quality feature, wherein determination of orientation may be performed as described above in reference to FIGS. 1-28. For instance, and without limitation, an optimal, necessary, or efficient direction from which to machine at least a CTQ feature may be determined, and graphical representation of the at least a reference feature 2840 may be generated to place precursor in that orientation when located using at least a reference feature at subtractive device, as described in further detail in the entirety of this disclosure. Multiple orientations may be determined, and multiple reference features corresponding to the multiple orientations may be generated, as described above in reference to FIGS. 1-28. Automated generation of graphical representation of the at least a reference feature 2840 may be performed at machine-learning module 2820 utilizing any machine-learning process and/or algorithm as discussed above in further detail in the entirety of this disclosure.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 30:
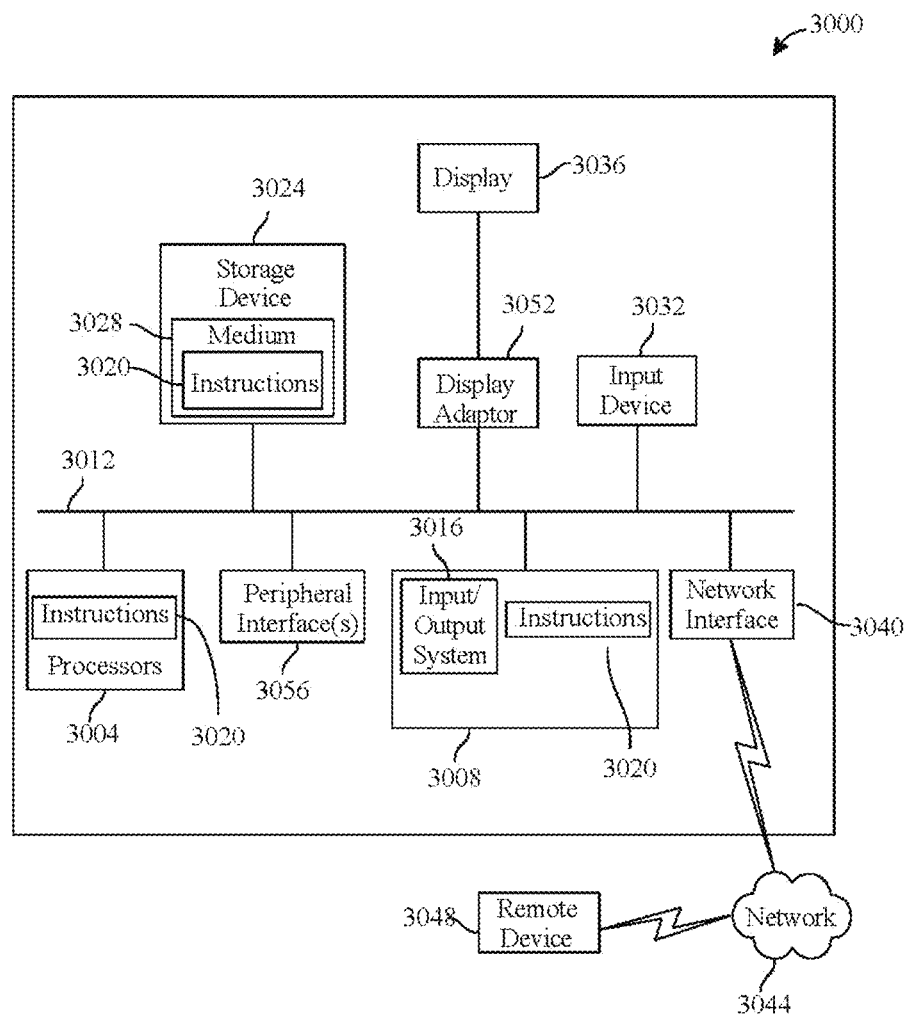
FIG. 30 is a block diagram of a computing system that can be used to implement any one or more of the methodologies disclosed herein and any one or more portions thereof.

FIG. 30 shows a diagrammatic representation of one embodiment of a computing device in the exemplary form of a computer system 3000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 3000 includes a processor 3004 and a memory 3008 that communicate with each other, and with other components, via a bus 3012. Bus 3012 may include any of several types of bus structures including, but not limited to, a memory bus, a memory controller, a peripheral bus, a local bus, and any combinations thereof, using any of a variety of bus architectures.

Memory 3008 may include various components (e.g., machine-readable media) including, but not limited to, a random access memory component, a read only component, and any combinations thereof. In one example, a basic input/output system 3016 (BIOS), including basic routines that help to transfer information between elements within computer system 3000, such as during start-up, may be stored in memory 3008. Memory 3008 may also include (e.g., stored on one or more machine-readable media) instructions (e.g., software) 2820 embodying any one or more of the aspects and/or methodologies of the present disclosure. In another example, memory 3008 may further include any number of program modules including, but not limited to, an operating system, one or more application programs, other program modules, program data, and any combinations thereof.

Computer system 3000 may also include a storage device 3024. Examples of a storage device (e.g., storage device 3024) include, but are not limited to, a hard disk drive, a magnetic disk drive, an optical disc drive in combination with an optical medium, a solid-state memory device, and any combinations thereof. Storage device 3024 may be connected to bus 3012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 3024 (or one or more components thereof) may be removably interfaced with computer system 3000 (e.g., via an external port connector (not shown)). Particularly, storage device 3024 and an associated machine-readable medium 3028 may provide nonvolatile and/or volatile storage of machine-readable instructions, data structures, program modules, and/or other data for computer system 3000. In one example, software 3020 may reside, completely or partially, within machine-readable medium 3028. In another example, software 3020 may reside, completely or partially, within processor 3004.

Computer system 3000 may also include an input device 3032. In one example, a user of computer system 3000 may enter commands and/or other information into computer system 3000 via input device 3032. Examples of an input device 3032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 3032 may be interfaced to bus 3012 via any of a variety of interfaces (not shown) including, but not limited to, a serial interface, a parallel interface, a game port, a USB interface, a FIREWIRE interface, a direct interface to bus 3012, and any combinations thereof. Input device 3032 may include a touch screen interface that may be a part of or separate from display 3036, discussed further below. Input device 3032 may be utilized as a user selection device for selecting one or more graphical representations in a graphical interface as described above.

A user may also input commands and/or other information to computer system 3000 via storage device 3024 (e.g., a removable disk drive, a flash drive, etc.) and/or network interface device 3040. A network interface device, such as network interface device 3040, may be utilized for connecting computer system 3000 to one or more of a variety of networks, such as network 3044, and one or more remote devices 3048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 3044, may employ a wired and/or a wireless mode of communication. In general, any network topology may be used. Information (e.g., data, software 3020, etc.) may be communicated to and/or from computer system 3000 via network interface device 3040.

Computer system 3000 may further include a video display adapter 3052 for communicating a displayable image to a display device, such as display device 3036. Examples of a display device include, but are not limited to, a liquid crystal display (LCD), a cathode ray tube (CRT), a plasma display, a light emitting diode (LED) display, and any combinations thereof. Display adapter 3052 and display device 3036 may be utilized in combination with processor 3004 to provide graphical representations of aspects of the present disclosure. In addition to a display device, computer system 3000 may include one or more other peripheral output devices including, but not limited to, an audio speaker, a printer, and any combinations thereof. Such peripheral output devices may be connected to bus 3012 via a peripheral interface 3056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve method, systems and/or software as described in this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An automated manufacturing system for generating a graphical representation of a discrete object to be manufactured from an additively manufactured body of material, including a precursor to a discrete object and at least a reference feature, at a computing device, the automated manufacturing system is designed and configured to:
  receive a graphical computer model of the at least a precursor to the discrete object and a graphical computer model of the discrete object;

identify at least a first feature in the graphical computer model of the discrete object, and recommended joining data;
selecting a correlated dataset containing a plurality of data entries wherein each dataset contains a geometric description of at least a stored critical-to-quality shape description and a correlated shape that requires manufacture to the first tolerance;
training a machine-learning model with the correlated dataset; and
automatedly determine, at the machine-learning model, that the at least a first feature includes at least a critical-to-quality feature in the graphical computer model of the discrete object, wherein automatedly determining at the machine-learning model comprises:
determining, at the machine-learning model, the geometric description of the at least a surface feature matches the geometric description of the correlated dataset as a function of comparing the geometric description of the at least a surface feature to the correlated dataset, wherein the machine-learning model is trained by the correlated dataset;
automatedly generate, at the machine-learning model, a graphical representation of the at least a reference feature on the graphical model of the at least a precursor to the discrete object as a function of the at least a critical-to-quality feature, at least a locating feature in a support, and the recommended joining data, wherein the at least a critical-to-quality feature corresponds to a shape that requires manufacture to a first tolerance based on the correlated dataset, and wherein the support comprises a substrate for deposition of layers in an additive process; and
automatedly determine a second feature as a non-critical to quality feature to be manufactured to a second tolerance which is lower than the first tolerance, wherein the non-critical to quality feature comprises surface finish or fit.

2. The system of claim 1, wherein automatedly determining the at least a first feature includes the at least a critical-to-quality feature further comprises extracting a geometric description of at least a surface feature depicted in the graphical computer model.

3. The system of claim 1, wherein automatedly determining that the at least a first feature includes the at least a critical-to-quality feature further comprises detecting at least a join locus.

4. The system of claim 3, wherein:
the graphical computer model depicts a second object mating with the graphical representation of the at least a precursor part; and
detecting the at least a join locus further comprises identifying a graphical depiction of a surface feature mating with the second object.

5. The system of claim 3, wherein detecting the at least a join locus further comprises:
extracting a first geometric description of at least a first surface feature depicted in the graphical computer model;
selecting a second correlated dataset containing a plurality of data entries wherein each dataset contains a geometric description of the at least a surface feature and at least a correlated second surface feature of a graphical representation of the second object; and
determining, at the machine-learning model, the at least a first surface feature and the correlated dataset are complementary forms as a function of comparing the first geometric description to the second correlated dataset, wherein the machine-learning model is trained by the second correlated dataset.

6. The system of claim 3, wherein detecting the at least a join locus further comprises:
extracting a geometric description of at least a surface feature depicted in the graphical computer model;
selecting a third correlated dataset containing a plurality of data entries wherein each dataset contains a geometric description of the at least a surface feature and a correlated geometric description of at least a fastening feature shape description; and
determining, at the machine-learning model, the geometric description of the at least a surface matches the geometric description of the at least a fastening feature shape description as a function of comparing the geometric description of the at least a surface feature to the third correlated dataset, wherein the machine-learning model is trained by the third correlated dataset.

7. The system of claim 1, wherein the at least a critical-to-quality feature includes a plurality of critical-to-quality features, and further comprising:
presenting the plurality of critical-to-quality features to a user via a user interface; and
receiving, via the user interface, a user selection of a critical-to-quality feature from the plurality of critical-to-quality features.

8. The system of claim 1, wherein receiving the graphical representation of the at least a reference feature further comprises generating the graphical representation of the at least a reference feature as a function of at least a locating feature at a subtractive manufacturing device.

9. The system of claim 1, wherein the automated manufacturing system is further designed and configured to transmit the graphical representation of the at least a reference feature on the graphical model of the at least a precursor to the discrete object to a remote device.

10. A method of generating a graphical representation of a discrete object to be manufactured from an additively manufactured body of material including a precursor to a discrete object and at least a reference feature, the method comprising:
receiving, at a computing device, a graphical computer model of the at least a precursor to the discrete object and a graphical computer model of the discrete object;
identifying, at the computing device, at least a first feature in the graphical computer model of the discrete object and recommended joining data;
selecting a correlated dataset containing a plurality of data entries wherein each dataset contains a geometric description of at least a stored critical-to-quality shape description and a correlated shape that requires manufacture to the first tolerance;
training a machine-learning model with the correlated dataset; and
automatedly determining, at the machine-learning model operating on the computing device, that the at least a first feature includes at least a critical-to-quality feature in the graphical computer model of the discrete object, wherein automatedly determining at the machine-learning model comprises:
determining, at the machine-learning model, the geometric description of the at least a surface feature matches the geometric description of the correlated dataset as a function of comparing the geometric description of the at least a surface feature to the correlated dataset, wherein the machine-learning model is trained by the correlated dataset;

automatedly generating, at the machine-learning model, a graphical representation of the at least a reference feature on the graphical model of the at least a precursor to the discrete object as a function of the at least a critical-to-quality feature, at least a locating feature in a support, and the recommended joining data, wherein the at least a critical-to-quality feature corresponds to a shape that requires manufacture to a first tolerance based on the correlated dataset, and wherein the support comprises a substrate for deposition of layers in an additive process; and automatedly determining a second feature as a non-critical to quality feature to be manufactured to a second tolerance which is lower than the first tolerance, wherein the non-critical to quality feature comprises surface finish or fit.

11. The method of claim 10, wherein automatedly determining the at least a critical-to-quality feature further comprises extracting a geometric description of at least a surface feature depicted in the graphical computer model.

12. The method of claim 11, wherein automatedly determining that the at least a first feature includes the at least a critical-to-quality feature further comprises detecting at least a join locus.

13. The method of claim 12, wherein:
the graphical computer model depicts a second object mating with the graphical representation of the at least a precursor part; and
detecting the at least a join locus further comprises identifying a graphical depiction of a surface feature mating with the second object.

14. The method of claim 12, wherein detecting the at least a join locus further comprises:
extracting a first geometric description of at least a first surface feature depicted in the graphical computer model;
selecting a second correlated dataset containing a plurality of data entries wherein each dataset contains a geometric description of the at least a surface feature and at least a correlated second surface feature of a graphical representation of the second object; and
determining, at the machine-learning model, the at least a first surface feature and the second correlated dataset are complementary forms as a function of comparing the first geometric description to the second correlated dataset, wherein the machine-learning model is trained by the second correlated dataset.

15. The method of claim 12, wherein detecting the at least a join locus further comprises:
extracting a geometric description of at least a surface feature depicted in the graphical computer model;
selecting a third correlated dataset containing a plurality of data entries wherein each dataset contains a geometric description of the at least a surface feature and a correlated geometric description of at least a fastening feature shape description; and
determining, at the machine-learning model, the geometric description of the at least a surface matches the geometric description of the at least a fastening feature shape description as a function of comparing the geometric description of the at least a surface feature to the third correlated dataset, wherein the machine-learning model is trained by the third correlated dataset.

16. The method of claim 10, wherein the at least a critical-to-quality feature includes a plurality of critical-to-quality features, and further comprising:
presenting the plurality of critical-to-quality features to a user via a user interface; and
receiving, via the user interface, a user selection of a critical-to-quality feature from the plurality of critical-to-quality features.

17. The method of claim 10, wherein receiving the graphical representation of the at least a reference feature further comprises generating the graphical representation of the at least a reference feature as a function of at least a locating feature at a subtractive manufacturing device.

18. The method of claim 10, wherein the method further comprises transmitting, by the computing device, the graphical representation of the at least a reference feature on the graphical model of the at least a precursor to the discrete object to a remote device.

* * * * *